(12) United States Patent
Byrraju

(10) Patent No.: US 12,039,279 B2
(45) Date of Patent: Jul. 16, 2024

(54) NATURAL SOLUTION LANGUAGE

(71) Applicant: BRANE COGNITIVES PTE. LTD., Singapore (SG)

(72) Inventor: Ramalinga Raju Byrraju, Hyderabad (IN)

(73) Assignee: BRANE COGNITIVES PTE. LTD., Singapore (SG)

( * ) Notice: Subject to any disclaimer, the term of this patent is extended or adjusted under 35 U.S.C. 154(b) by 518 days.

(21) Appl. No.: 17/393,331

(22) Filed: Aug. 3, 2021

(65) Prior Publication Data

US 2021/0365637 A1 Nov. 25, 2021

Related U.S. Application Data

(63) Continuation-in-part of application No. 17/420,587, filed as application No. PCT/SG2020/050004 on Jan. 3, 2020.

(30) Foreign Application Priority Data

Jan. 10, 2019 (IN) .............................. 201941001135
Jul. 16, 2019 (IN) .............................. 201941028675

(Continued)

(51) Int. Cl.
 *G06F 8/30* (2018.01)
 *G06F 40/205* (2020.01)
 (Continued)

(52) U.S. Cl.
 CPC ............ *G06F 40/30* (2020.01); *G06F 40/205* (2020.01); *G06F 40/295* (2020.01)

(58) Field of Classification Search
 CPC ....................................................... G06F 8/30
 See application file for complete search history.

(56) References Cited

U.S. PATENT DOCUMENTS

2001/0051938 A1* 12/2001 Hart ...................... G06N 5/02
 706/60
2003/0130918 A1* 7/2003 Polk ...................... G06Q 30/02
 705/1.1

(Continued)

FOREIGN PATENT DOCUMENTS

AU 2020205593 B2 7/2023
CA 3125015 A1 1/2014

(Continued)

OTHER PUBLICATIONS

Communication pursuant to Article 94(3) EPC for European Application No. 20 700 857.4-1203, dated Jun. 9, 2022, 7 pages.

(Continued)

*Primary Examiner* — Jae U Jeon
(74) *Attorney, Agent, or Firm* — Klarquist Sparkman, LLP

(57) ABSTRACT

A computer-implemented method that effectively replaces 'programming code' in conveying application or solution logic to the computer using a natural language-based design. Without taking any reference to alien symbols or keywords, NSL uses standard and familiar natural-language-like constructs (any natural language, not just English) using a computer-implemented method to technically convey complex operating, application, and solution logic to the machine agents (computers) in a user-friendly way. Using the same computer-implemented methodologies, it has the power to translate or reverse engineer all existing programming code into NSL. Fundamentally, NSL requires no 'programming code' expertise. Users can quickly and easily convey the logic directly to the computer or recruit available solution components with ease. In addition, the elimination of artificial barriers between information and processes, and merging them, solution logic embedded in computer pro- (Continued)

grams and applications is brought into the purview of information search principles.

31 Claims, 29 Drawing Sheets

(30) Foreign Application Priority Data

| Aug. 3, 2020 | (IN) | ............................ | 202041033248 |
| Sep. 29, 2020 | (IN) | ............................ | 202041042410 |
| Jun. 28, 2021 | (IN) | ............................ | 202141028967 |

(51) Int. Cl.
*G06F 40/295* (2020.01)
*G06F 40/30* (2020.01)

(56) References Cited

U.S. PATENT DOCUMENTS

| 2005/0119876 | A1* | 6/2005 | Ferrieux | ............... | G10L 15/142 |
| | | | | | 704/E15.048 |
| 2013/0152092 | A1 | 6/2013 | Yadgar | | |
| 2015/0286747 | A1 | 10/2015 | Anastasakos | | |
| 2016/0203007 | A1* | 7/2016 | Ueno | ................ | G06F 9/44505 |
| | | | | | 713/100 |
| 2016/0357519 | A1 | 12/2016 | Vargas | | |
| 2017/0239576 | A1 | 8/2017 | Hsiao | | |
| 2018/0129956 | A1 | 5/2018 | Saxena | | |
| 2020/0389472 | A1* | 12/2020 | Drapeau | ............. | H04L 63/1416 |

FOREIGN PATENT DOCUMENTS

| JP | 2016512367 | A | 4/2016 |
| JP | 6279066 | B2 | 2/2018 |
| KR | 20120137424 | A | 12/2012 |
| KR | 101511823 | B1 | 4/2015 |
| WO | 2011088053 | A2 | 7/2011 |
| WO | 2014152069 | A2 | 9/2014 |
| WO | 2018218371 | A1 | 12/2018 |
| WO | 2020/145892 | A1 | 7/2020 |
| WO | 2022/031227 | A1 | 2/2022 |

OTHER PUBLICATIONS

Communication pursuant to Article 94(3) EPC for European Application No. 20 700 857.4-1203, dated Dec. 22, 2022, 4 pages.
Communication under Rule 71(3) EPC for Europen Application No. 20 700 857.4-1203, dated Jun. 23, 2023, 216 pages.
Response to communication pursuant to Rules 161(1) and 162 EPC for EP Application No. 20 700 857.4 (EP 3 903 182), filed Feb. 15, 2022, 71 pages.
Response to communication pursuant to Article 94(3) EPC for EP Application No. 20 700 857.4 (EP 3 903 182), filed Oct. 18, 2022, 54 pages.
Response to communication pursuant to Article 94(3) EPC for EP Application No. 20 700 857.4 (EP 3 903 182), filed Mar. 23, 2023, 79 pages.
Examination report No. 1 for Australian Application No. 2020205593, dated Jun. 20, 2022, 6 pages.
Examination report No. 2 for Australian Application No. 2020205593, dated Jun. 14, 2023, 2 pages.
First Statement of Proposed Amendments for Australian Patent Application No. 2020205593, dated Jun. 7, 2023, 1 page.
Second Statement of Proposed Amendments for Australian Patent Application No. 2020205593, dated Jun. 16, 2023, 1 page.
Request to Amend a Complete Specification for Australian Patent Application No. 2020205593, dated Jun. 7, 2023, 7 pages.
Request to Amend a Complete Specification for Australian Patent Application No. 2020205593, dated Jun. 16, 2023, 2 pages.
Response Summary for Australian Application No. 2020205593, submitted Jun. 7, 2023, 2 pages.
Claim as Accepted for Application No. 2020205593, dated Jun. 16, 2023, 16 pages.
Notice of Acceptance for Australian Application No. 2020205593, dated Jun. 22, 2023, 3 pages.
Specification, amended first SOA, claims, dated Jun. 28, 2023, 3 pages.
Specification, amended first SOA, marked up, dated Jun. 28, 2023, 208 pages.
Specification, amended second SOA, claims, clean, dated Jun. 16, 2023, 16 pages.
Specification, amended second SOA, marked up, dated Jun. 16, 2023, 140 pages.
Specification, clean claims, dated Jun. 7, 2023, 16 pages.
Specification, clean description, Jun. 7, 2023, 124 pages.
Specification, marked up, dated Jun. 7, 2023, 192 pages.
First Statement of Proposed Amendments for Australian Patent Application No. 2023203892 (Divisional of AU 2020205593), dated Jun. 28, 2023, 1 page.
Written Opinion for PCT International Application PCT/SG2021/050446, dated Nov. 12, 2021, 8 pages.
Official Action for Russian Application No. 2021119227/28(040461), dated Jun. 2, 2023, with translation, 41 pages.
First Examination Report for Indian Application No. 201941001135, dated Jan. 30, 2023, 9 pages.
International Search Report for PCT International Application No. PCT/SG2020/050004, dated Mar. 27, 2020, 3 pages.
International Search Report for PCT International Application No. PCT/SG2021/050446, dated Nov. 12, 2021, 3 pages.
International Preliminary Report for Patentability for PCT International Application PCT/SG2021/050446, dated Feb. 7, 2023, 9 pages.
Mohammad Raza, et al., "Compositional Program Synthesis from Natural Language and Examples," Proceedings of the Twenty-Fourth International Joint Conference on Artificial Intelligence (IJCAI 2015), Jul. 25 to Jul. 31, 2015, Buenos Aires, Argentina, Jul. 1, 2015 (Jul. 1, 2015), pp. 792-800, XP055349560, Retrieved from Internet: URL:https://www.ijcai.org/Proceedings/15/Papers/117.pdf.
Aditya Desai, et al., "Program synthesis using natural language," Software Engineering, ACM, 2 Penn Plaza, Suite 701 New York, NY 10121-0701 USA, May 14, 2016 (May 14, 2016), pp. 345-356, XP058257825, DOI: 10.1145/2884781.2884786 ISBN: 978-1-4503-3900-1.
The International Search Report and Written Opinion for counterpart PCT Application No. PCT/SG2020/050004 dated Mar. 27, 2020, 8 pages.
Raza et al., "Compositional Program Synthesis from Natural Language and Examples", AAAI Publications, Jun. 23, 2015, 9 pages.
Desai et al., "Program synthesis using natural language", arXiv, May 14, 2016, 15 pages.
The International Preliminary Report on Patentability for counterpart PCT Application No. PCT/SG2020/050004, dated Jun. 16, 2021, 6 pages.

\* cited by examiner

CU 3 is two steps away from the global intent, i.e., CU 5

| Solution Class | Customer Name | Customer Mobile No. | Customer Address | Customer ID | Product Name |
|---|---|---|---|---|---|
| Transactional Reality | Sashi | 998956**** | Customer Address | xxxx1 | Product Name |

Dynamic switch between potentiality and reality

In NSL, both transactions and logic are searchable

Positive Correlation

No Correlation

Negative Correlation

|         | Pen          | Paper         |
|---------|--------------|---------------|
| State 1 | Potentiality | Potentiality  | Null event
| State 2 | Potentiality | Reality       | Null event
| State 3 | Reality      | Potentiality  | Null event
| State 4 | Reality      | Reality       | → Desired event-written letter
FIG. 36
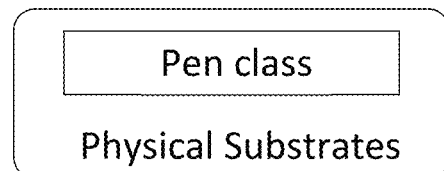
Class within a class
FIG. 37
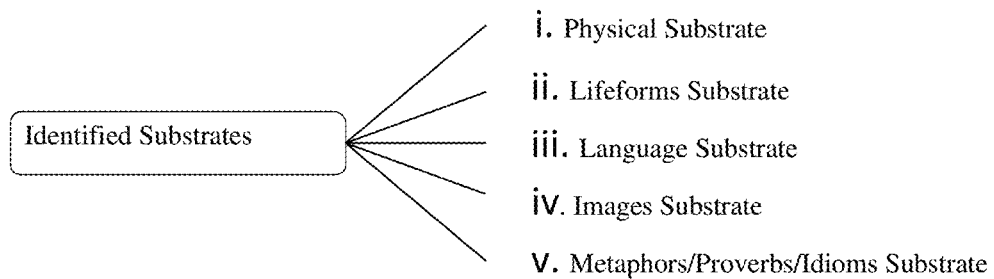
i. Physical Substrate
ii. Lifeforms Substrate
iii. Language Substrate
iv. Images Substrate
v. Metaphors/Proverbs/Idioms Substrate
FIG. 38

| Entity 1 | Entity 2 |
|---|---|
| Reality | Reality |
| Reality | Potentiality |
| Potentiality | Reality |
| Potentiality | Potentiality |

Rows: {Reality, Reality} → CEC; {Reality, Potentiality}, {Potentiality, Reality}, {Potentiality, Potentiality} → Shades of potentiality Main CU segment: 'CU1 – CU2 – CU3 – CU4 - CU5 – CU6'

A parallel CU:   CU1 – PCU1 - PCU2 – CU4 – CU5 .......

NATURAL SOLUTION LANGUAGE

CROSS-REFERENCE TO RELATED APPLICATIONS

This application (1) is a continuation-in-part of U.S. patent application Ser. No. 17/420,587, filed Jul. 2, 2021, which is a US National Phase Application under 35 USC § 371 of International Application No. PCT/SG2020/050004, filed Jan. 3, 2020, which claims the benefit of priority of India Patent Application No. 201941001135, filed Jan. 10, 2019, and India Patent Application No. 201941028675, filed Jul. 16, 2019, the content of which was incorporated by reference in its entirety, and (2) claims priority to and the benefit of India Patent Application No. 202041033248, filed Aug. 3, 2020, India Patent Application No. 202041042410, filed Sep. 29, 2020, and India Patent Application No. 202141028967, filed on Jun. 28, 2021, the contents of which are incorporated by reference in their entireties.

TECHNICAL FIELD

The present disclosure relates to the field of Information Technology. More particularly, the present disclosure relates to computer-implemented methods, systems, and computer-readable media for designing and deploying solutions.

BACKGROUND

Software engineering, design, and architecture practices have changed and evolved quite significantly over the last 60 years. For the sake of simplicity, many levels of abstraction in communicating the logic of operations to the computer can be grouped into two groups: (1) high-level application logic being imparted through programming languages; and (2) operating-systems-and-below that mediate or deal with the computers and their operations more directly.

There are primarily three popular operating systems: Microsoft Windows, Apple Mac OS X, and Linux. However, there are hundreds of programming languages. Generally speaking, all programming languages are extensively driven by code (symbols that have specific meanings and functions removed from natural language and arithmetic). It takes several weeks to several months for software specialists and engineers to master any of the programming languages and participate in creation or maintenance of solutions. As a consequence, the users of the solutions are generally incapable of creating or modifying the solutions as the situations warrant without the interventions of technology specialists.

Over the years, the computing and communication power behind information technology has grown quite enormously. In general, software design and management techniques have improved with movement towards component-based design, service-oriented architecture, web services, business process management, and agile project management methodologies. At the same time, the landscape of technology has become more complex as the number of moving parts has proliferated. The common user was alienated from the computer as was not able to directly participate in the solution design or influence it on an on-going basis as compared to what is possible. This overdependence of the user on the technology experts and mediators is due to the programming languages being very different from the natural languages. The technology systems have failed to realize a technical, creative, and innovative opportunity for computer language being nearly the same as the natural language.

Natural Solution Language (NSL) generates a transformative effect by eliminating the need to convey solution or application logic to the computers through programming code. NSL permits users to convey the solution logic to the computer directly, just as they would convey their user requirements to the technology specialist, through use of natural language constructs that are almost the same as the natural language itself.

NSL relies on a layer of 'technology framework,' called NSL-TF, that sits on top of operating systems, functioning as though it is an integral part of those operating systems. NSL is driven by a simple, but powerful, method called 'differentiation principles,' whereby traditional functions and processes get converted to information. NSL is fundamentally influenced by the fact that all solution logic pertains to entities and their relationships.

NSL democratizes solution design, maintenance, and related operations by empowering the users and bringing all the relevant entities to the user interface levels.

The features, terms, concepts and application of NSL have been elaborated in greater detail in the Indian Patent Application Number 201941001135 and in the corresponding PCT Application Number PCT/SG2020/050004. The descriptions of the Indian Patent Application Number 201941001135 and the corresponding PCT Application Number PCT/SG2020/050004 are incorporated herein by reference.

SUMMARY

The present disclosure is about additional features and concepts that are integrated with NSL Technology Framework (NSL-TF) that establishes the equivalence principles of NSL with that of any established existing solution frameworks in use currently. By quantifying solutions in Binary Entities (BETs) and allowing BETs to be present in multiple substrates, NSL allows substrate Crossover and substrate tagging that can potentially have a powerful impact on building the most efficient solutions that the existing systems lack.

NSL aims to eliminate the information asymmetries and functional asymmetries between human agents and machine agents. The Analytical Engine and Inference Engine help to unleash the machines' true potential by replicating human behaviour or, in some cases, exceeding human intelligence by their ability to process large amounts of data, make quick decisions and act without the help of human interventions.

BRIEF DESCRIPTION OF DRAWINGS

Features, aspects, and advantages of the present disclosure will be better understood when the following detailed description is read with reference to the accompanying drawings (sometimes called "figures").

FIG. 36 represents an example of a desired event and null events using pen and paper entities.

FIG. 37 represents an example of class within a class.

FIG. 38 represents an example of five identified substrates in the substrate library.

DETAILED DESCRIPTION

Figure 1:
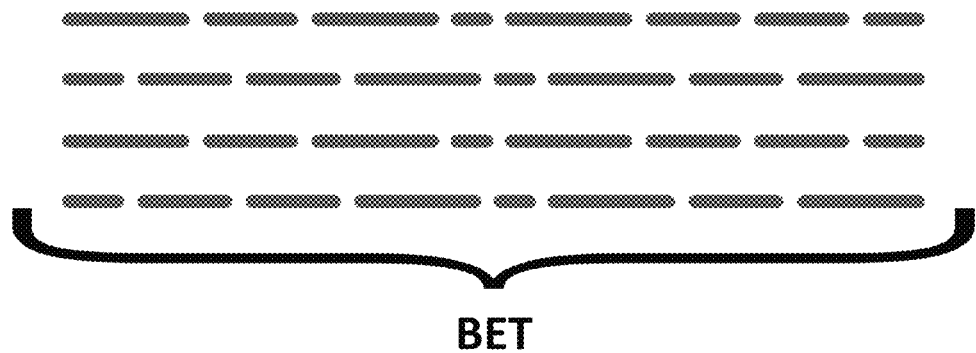
FIG. 1 represents an example of BET.

While system, device or apparatus, and method are described herein by way of examples and embodiments, those skilled in the art recognize that system and method for providing solutions are not limited to the embodiments or figures described.

It should be understood that the figures and description are not intended to be limiting to the particular form disclosed. Rather, the intention is to cover all modifications, equivalents, and alternatives falling within the spirit and scope of the appended claims. Any headings used herein are for organizational purposes only and are not meant to limit the scope of the description or the claims. As used herein, the word "may" is used in a permissive sense (e.g., meaning having the potential to) rather than the mandatory sense (e.g., meaning must). Similarly, the words "include", "including", and "includes" mean including, but not limited to.

The following description is a full and informative description of the best method and system, device, or apparatus presently contemplated for carrying out the present disclosure which is known to the inventor at the time of filing the patent application. Of course, many modifications and adaptations will be apparent to those skilled in the relevant arts in view of the following description, accompanying figures, and the appended claims. While the system, device or apparatus, and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique, and not in limitation thereof since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself, and any combination thereof, such as "AB" and/or "BA." It is worth noting that the present discussion relates to exemplary embodiments, and the appended claims should not be limited to the embodiments discussed herein.

For the purpose of description herein, a processor may be implemented as microprocessors, microcomputers, microcontrollers, digital signal processors, central processing units, state machines, logic circuitries, and/or any devices that manipulate signals based on operational instructions.

Among other capabilities, the processor may fetch and execute computer-readable instructions stored in a non-transitory computer readable storage medium coupled to the processor. The non-transitory computer-readable storage medium may include, for example, volatile memory (e.g., RAM), and/or non-volatile memory (e.g., EPROM, flash memory, NVRAM, memristor, etc.).

For the purpose of description herein, a memory may be a memory of a computing device and may include any non-transitory computer-readable storage medium including, for example, volatile memory (e.g., RAM), and/or non-volatile memory (e.g., EPROM, flash memory, NVRAM, memristor, etc.).

For the purpose of description herein, a module, amongst other things, include routines, programs, objects, components, data structures, and the like, which perform particular tasks or implement particular data types. The module further includes modules that supplement applications on a computing device, for example, modules of an operating system. The operating system comprises at least one of Batch Operating System, Time-Sharing Operating Systems, Distributed Operating System, Network Operating System, and Realtime Operating System.

Each of the terms listed below have specific roles and applications with respect to computer implemented NSL methodology. These individual technological and methodological elements have their roles explained with respect to NSL.

It is claimed that Natural Solution Language (NSL) will effectively replace programming languages by communicating with the machine in a natural-language-like fashion. For Natural Solution Language (NSL) to cause a transformative technical effect, a computer-implemented method is required to be applied. This method requires a sensitive approach to entities and their relationships as the situations warrant. Entities and their relationships come in different variations and each one of those variations has to be properly defined and treated Central Dogma of NSL: All solutions are about entities and their relationships, in the context of the agent's intentionality. All solutions are about getting from one desired state to another more desired state. Most solutions are about getting to the desired state through a series of connected solution states.

Entities: Anything that is distinct is an entity. That is, anything that has a standing of its own and can be represented in terms of information is an entity. In language, entities are represented by words, symbols, or numbers. Example: A sand grain also qualifies to be an entity, just as a car is qualified to be an entity.

Differentiated Entities: Anything that is distinct and at the same time different from other entities is a differentiated entity. That is, as compared to some other entity, it is different. In natural language, these are represented by words. Example: A 'pen' is different from a 'paper'.

Un-Differentiated Entities: Anything that is distinct, and same-as-some other entity or entities is considered un-differentiated from the other entity or entities. Such 'recurrences' happen in space and time. These recurrences fall in the domain of mathematics and are represented by numbers. From a solution design perspective, if one entity can be effectively replaced by some other entity without affecting the outcome, such entity is considered recurrent in either space or time. Example: If there is a pen and a paper on the table, one can say, 'there is a pen and a paper' on the table. But, if there is one pen and 'another pen' on the table, one can say, 'there are two pens on the table.'

Way World Works (WWW) Principles: Rather than just the traditional technology, NSL is a blend of understanding from science and technology creating a new paradigm in solution architecture. WWW are the principles that guide the way universe or nature functions as understood and appreciated by current day science. NSL logic takes advantage of all the scientific insights with respect to the way the world works and brings to bear certain innovative methodologies with respect to solutions that human agents-seeks through the use of computers. Example: That all things are made up of particles, that when particles combine, they give rise to emergent properties, that all things happen in space and time, that all events are driven by energy, so on and so forth are way world-works principles. These in turn have a bearing on what agents do and how they cause movements from one desired state to another through directed changes.

Potential Entities Vs Non-Potential Entities: Solution design involves entities and their relationships. These entities are chosen from the real world in the context of solution design. Those that are chosen for the potential they hold with respect to the solution are declared as 'potential-entities'. Those that are not made part of the solution related 'potentiality set' are left out and would have no relevance from the perspective of the solution ecosystem.

Solution Ecosystem: The solution designers choose and use potential entities from the 'real world' to establish relationships between them. The relationships between potential entities are such that they combine and interact in ways that solutions could be had along the established pathways of change.

Independent Entities: These are entities at the level of which binary events happen—that is, switching between potentiality and reality happen resulting in changes in combinatorial-entity-states in which they participate. Example: A pen may move into existence or disappear from existence. As an independent entity event happens, it could change the state of the combinatorial ecosystem it is a part of. If it exists along with paper as a potential entity, together they can give rise to $2^2$, 4, potential combinatorial states.

Implied Entities: Many times, entities connected to other entities are implied and ignored. Example: If a person enters a street, it is implied that he is there in association with the clothes he wears. Clothes here are implied. Similarly, it is implied that there is air for the human agents to breathe. In case of room reservation, the presence of an 'agent' for inputting the information may be implied. The designer of the solution takes such implied entities as a given. Even attributes are implied most of the time. All change happens within the 'change units' (SIs). Change happens only when physical interactions take place in space and time. If the space and time of one independent entity is known, the space and time attributes of other entity may be implied. Even otherwise, it may even be the case that for the solution designer, not specifying those attributes may not alter the essence of the design making the designer not specify the same.

Shared Entities: A shared entity is one that is common across many local or global statements of intent. There are many independent entities that are part of a trigger state for a given statement of intent. When a statement of intent is in a trigger state, during the lapse time associated with the trigger, that entity would not be available for participation with respect to any other statement of intent. But once the triggered change is completed, the participating entity becomes available again as a shared entity across all the related statements of intent.

Attributes: An attribute is also an entity but one that is dependent on some other entity for its existence. Such dependent entities are explicitly referred to as attributes. Dependence is defined as presence of one entity being owed to the presence of another independent entity. Example: A pen may exist in space and time. Here, space and time are considered attributes or dependent entities. Note that a 'spatial unit' or a 'temporal unit' qualify to be called entities in their own right. As they are dependent on the higher-level entity, NSL refers to them as attributes. When the pen is deleted, the attributes are automatically deleted. To explain it further, entities contain a lot of implied information. Some implied information is recognized but yet ignored as it may not be central to the solutions. Example: One may care for someone being dressed well or not. But one may not care about the colour of a shirt. Sometimes implied information may not be known or accessible. Example: One may not know the number of cells there are in one's body or, for that matter, most people may not know that the body has an organ called 'Spleen'. An attribute arises out of surfacing such implied and associated information relating to an entity as the context demands.

Levels of Attributes: There is no limit to number of levels at which attributes can exist. The first level is called the 'primary attribute', the second level is called the 'secondary attribute', the third level is called the 'tertiary attribute', so on and so forth. Example: If at the first level, space is defined as India, each state would exist at the secondary level, and each city at the tertiary level.

Natural Attribute Values: Any information that is attached as an attribute value in a given solution belongs to this category. Spatial coordinates and time will therefore naturally belong to this category, as they are standard essential attributes. All the attribute values extracted from any entity such as its weight, volume, colour, and the like shall also belong to this category.

Derived Attribute Values: As the name suggests, all the derived attribute values shall belong to this category. To put it simply, all the values derived by applying different kinds of established statistical techniques shall belong to this category. Example: Probabilities, correlations, variability, averages, ratios, measurements of various kinds, regression analysis, and the like. These values can either be derived in real time or through a batch mode, as the situation may warrant. NSL provides these options that gives the flexibility to the solution designer or the user to specify what they are looking for.

Informational Entities: Informational entities are entities artificially created by human agents for the purpose of communicating the representational entities they are in possession to other agents in the ecosystem.

Truth Values: Though the representational entities purportedly represent 'real entities' or 'other representational entities', the truth values may vary due to many factors including the uncertainty inherent in nature or the understanding, motivation, or intentions of human agents. Example: It may be represented that 'X' is at place 'Y' but that may or may not be a correct statement. If it is correct, the statement is considered to be 'true' and if it is incorrect, the statement is considered to be 'false'.

Physical Reality: All entities—real, perceptual, and informational entities—exist 'physically' in the physical world. While it is intuitive to come to that conclusion with respect to real entities, it should be explicitly noted that even perceptual and informational entities exist in physical reality—space and time. The fact that they derive their value from being representational entities does not change the character of those also being physical.

Change Drivers: The entities along with its attributes which bring about the change in the change unit are known as change drivers. Attributes are also entities, but they are dependent on independent entities. There can be any number of layers of attributes that differentiate independent entities even further. Every change driver has a slot and every slot is connected to a transformational pathway. Each slot is called as a change component. Each driver has their own unique and distinct identity and intrinsic information.

Change Units (CUs): A change unit is one that is described by a statement-of-intent from the natural language point of view. Value of any kind happens only through controlled changes and that happens only inside the change units. It is by knitting together the local change units (making paragraphs by combining sentences) that one can get to the global change units that human agents desire or intend. In the interest of simplicity, NSL treats these change units as synonymous with statements-of-intent (SIs). Therefore, CUs and SIs are used interchangeably in this document. Local Statements of Intent are local 'change units' expressed as statements of intent (sentences) in terms of natural language. Global Statement of Intent are 'global change units' expressed as global statements of intent (paragraphs) in terms of natural language.

Events: All events arrive into one local-statement-of-intent or the other. And all events are about an individual entity being turned from one state to another—a state of potentiality to reality or vice versa. The occurrence of an event by way of arrival or departure of an individual entity into or from an LSI results in the state of the combinatorial set as a whole changing. If there are 6 variable entities in the LSI, there could be 64 different states in which the combinatorial entities could exist. A binary state change at the individual entity level can lead to any one of the 64 different states in LSI. While 63 other states may be in non-trigger combinatorial-entity-states, the 64th one would be in a trigger state influencing other LSI states or itself Binary States: In NSL solution design, all entity states are expressed as existing only in binary states. That is, they either exist in potentiality or reality states. Every state is discrete and there is no intermediary state. In this view of things, each word operates in a binary state, and even sentences and paragraphs exist in binary states. Agents only keep changing the vantage points from which they view the entities. As one zooms in or zooms out, the vantage points change. But each vantage point is in a binary state! The choice of binary states in NSL solution design is a choice for discrete states as versus continuous—akin to a choice of the digital as versus analogue. When events happen, there are state transitions with the excluded middle. In theory, these binary states can also be represented by assigning values of being 'true or false'.

Lapse Times: As explained, when a trigger state is attained in a statement of intent, it precipitates one or more changes in one or more statements of intent including its own statement of intent. All changes take time. Such period is called the 'lapse time'. Whether the change is driven by human agents or machine agents, the lapse time is always involved. In some instances, such changes can happen in fractions of seconds and in other instances the length of time can be as high as hours or even days. All the entities involved in interactions producing the required change would be occupied during the lapse time and will become available for being involved in any other trigger only after the completion of the previous action.

Natural Solution Language (NSL): This is a slightly modified version of natural language, a computer implemented method, where things are recast in the form of capturing only statements of intent and making all descriptive statements subservient to the statements of intent. These statements of intent exist in two states: i) Static Statements of Intent: These only express the intent but lack the ability to transform them into reality. Static entity states are those entity states that have no properties of being able to trigger changes in other states. If there are 6 variables in a system (independent entities and their attributes), they could potentially exist in 64 different states. But only the 64th state is capable of triggering change when all the variables are present in the 'reality' state. All the other entity states are called 'static entity' states. A point to be noted in this respect is that statement of intent (SI) is just another independent entity that describes the nature of desired change, participating in the 'change unit'. The existence of an SI is based on the fact that for any action to follow, it has to be backed up by an agent's intention. ii) Dynamic Statements of Intent: These are the underlying, transformation causing entities behind the statements of intent that collectively trigger on attaining a certain desired state, called Trigger Combinatorial-Entity-States, as influenced by events at independent entity level. Dynamic entities states are those entity states that have the ability to cause further changes in one or more entity states, including themselves. In the previous example, the 64th state is the 'dynamic entity' state. In other words, for a static statement of intent to become dynamic and fulfil a statement of intent, it needs to be powered by a trigger CES.

Vantage Points: Each basic entity exists in a binary state at an individual level. Entities also combine to form combinatorial entities. Vantage points refer to the relative positions from which one may view entities. If one views an entity holistically from a higher vantage point—a higher rung of the differentiating ladder that consists of all its sub-sets—the connected entity count would be quite high. On the contrary, if one views an entity that is at a lower vantage point—a lower rung of the differentiating ladder— the connected entity count would be much lower. Example: Imagine a higher vantage point 'A' from which one can view in the direction of differentiation. 'A' could have a differentiated subset 'A-B'. If that combines with 'C', one can have a second level more differentiated subset 'A-B-C'. 'A-B' encompasses only subset 'A-B-C'. 'A-B' has fewer connected entities in the direction of differentiation as compared to 'A'. Another way of putting it is that higher vantage point entities carry more information with them as compared to lower vantage point entities.

Figure 18A:
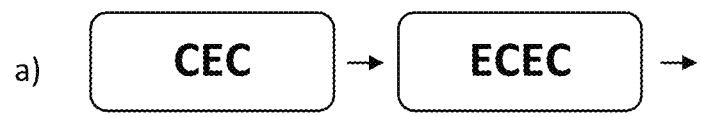
FIG. 18a and 18b represent an example of Vantage Point Switching.
Figure 18B:
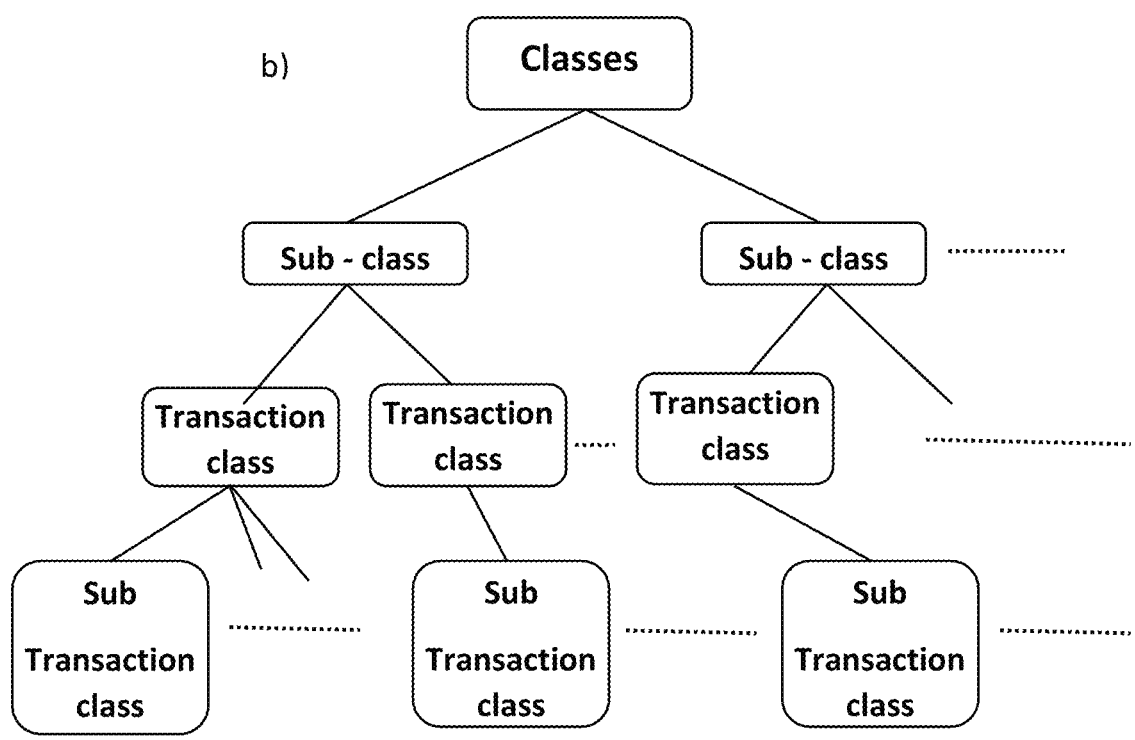

Vantage Point Switching: Differentiations proceed horizontally through connected CES and ECES. An example of the horizontal differentiation is represented in FIG. 18a. Differentiations can also happen vertically through creation of classes, sub-classes, and any number of sub-sub classes all the way down to transactional classes or even sub-transactional classes. An example of the vertical differentiation is represented in FIG. 18b. When one descends down the vertical differentiation tree, the extent of differentiations keeps increasing. For the purpose of 'adjudication' or 'optimal differentiations', the solution designer may leave room for the transaction classes to switch between higher level or lower level differentiations to apply as the situation warrants. As one subtracts or ignores more information, one moves to higher vantage point. For example: An application for pizza delivery is created, if the information called "Pizza" is ignored, then it becomes food delivery. If the information called "Food" is ignored, then it becomes delivery. Here, the information exists, but at higher vantage points, the information is ignored.

Figure 43:
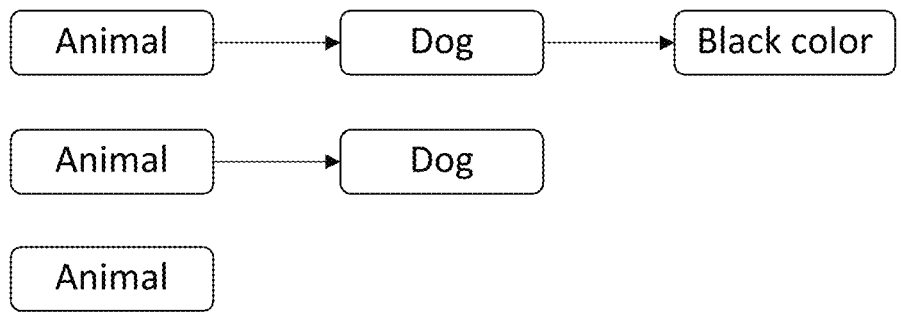
FIG. 43 represents an example of Vantage Point Switching.

Further, in NSL, all entities exist in binary states. A node represents the presence of an entity. A transformational line represents a relationship between entities. Arrows between nodes represent the direction of differentiations. Vantage point represents sitting at any node and looking in the direction of differentiation. The far end of the differentiating nodes signifies the most differentiation end of the differentiated nodal set. One can take a nodal set and differentiate the same by attaching entity specific information to each node. When one can deliberately switch off all the entity specific information with respect to each node, only the undifferentiated nodes or entities remain. Undifferentiated entities are same as identical entities. This is how one can take an entity or 'BET' count in a system. One can observe at the system from the perspective of making predictions or recommendations. There will be situations where the confidence in the predictions would be high at a more differentiated level. Example: One is sure that it is an animal, and that it is a dog and that it is black. If one is sure that it is an animal and that it is a dog, but one is unsure about its colour, the safe route to take for making a prediction or recommendation would be to switch to the vantage point of the dog. If one is even unclear whether it is dog or some other animal, one would be better off making a recommendation at the vantage point of the 'animal'. This example is represented in FIG. 43. Switching between different levels or vantage points to correctly suit the level of information or knowledge is what one refers to as vantage point switching. This is akin to principles of adjudication that NSL deals with.

Directionality: This is about moving up or down the differentiation tree based either on addition of entity values or on deletion of entity values. As one can add new entity values, one would be moving in the positive direction of differentiation. By deleting values, one would be moving in the negative direction of differentiation—that is, in the direction of 'un-differentiation' or 'generalization' or 'integration'.

Combinatorial-Entity-States (CES): When independent entities (dragging with them their attributes) combine with other independent entities, those give rise to combinatorial states that are differentiated and have emergent properties of their own. CES are housed in local statements of intent (LSI) each representing a unit of change—which is equivalent of a sentence. A collection of such LSI leading to a bigger desired change are referred to as Global Statements of Intent (GSI)—which is equivalent of a paragraph. The size of CES in an LSI is proportionate to the number of independent entities participating. Each LSI will entertain $2^n$ states, where 'n' is the number of independent entities, as each independent entity could exist either in a state of 'potentiality' or 'reality'. Fundamentally there are two kinds of Combinatorial-Entity-States in each Local statements of intent: i) Non-Trigger CES: These are entity combinations that do not cause alteration in the combinatorial-entity-states in other local-statements-of-intent or within the same LSI to which they belong. Example: If there are four independent entities, as binary variables, they give rise to $2^4$ entity states—that is, 16 CES. Of these states, 15 states are non-trigger CES as they do not trigger any change. ii) Trigger CES: These combinatorial-entity-states trigger changes in one or more other LSI or within the same LSI. Trigger CES are those where all the independent entities and their attributes are in a state of reality. When a CES in one LSI influences CES in other LSIs, those sentences get connected. LSIs are grouped together based on their involvement in the realization of GSI, making a paragraph. Example: Going by the previous example, the 16th state is the trigger state as all the four independent entities are present in a state of reality in that state.

Agents: Agents are also entities. Agents are both creators of solutions and consumers of solutions. Agents are differentiated from 'nature' as they are driven by 'purpose. In other words, they seek favourable changes and avoid unfavourable ones. As every solution deal with controlled change, it is presupposed that all change units are influenced by agents—whether human agents or machine agents. As all change requires energy, agents use the energy inherent in them, or borrow it from one or more combinatorial entities, and provide directionality to change by following predetermined pathways or through application of free will.

Human Agents: Also referred to as 'stakeholders', human agents play multiple roles depending on the requirements the solution environment imposes on them. Some change units are driven by human agents of necessity. Example: A physical delivery of some 'hard asset' will require human agents to be involved.

Agent Functions: The agent functions that take place within statements-of-intent can be divided into three layers of statements of intent: i) Physical Functions: Physical functions relate to participation of independent entities resulting in combinatorial-entity-states (CES) that form the backbone of statements-of-intent. Physical functions serve the principal function of facilitating solutions, while the other two categories either directly or indirectly support physical functions. ii) Information Functions: Information functions relate to entities that are connected to combinatorial-entity-states and serve only the function of providing information, but not involved in the physical function. By extension, these information functions are connected to statements-of-intent and the agents who drive them. Information functions keep the agents well informed and play a role in dynamic solution re-design and other value adding functions like analytics, machine learning and artificial intelligence. iii) Mind Functions: Mind functions, from the computer-implemented-NSL perspective, emulate the functions of human mind in the real world. These functions 'anticipate' entity states and guide the physical functions in the process of bringing about desired transformations. Anticipation generally applies to 'temporal aspects' that concern the future. But anticipation can apply to all situations where there is uncertainty. In theory, uncertainty can pertain to things in the past or present also. Example: One may not fully know about, but could attempt to anticipate, what happened yesterday or what is happening in the other room at the present. A revision in 'estimates' or 'anticipation' could happen at the instance of every event. If such an anticipation has a bearing on the physical function at the present, those are feedback into physical function as entities that influence. Apart from playing a similar role such as information function, mind function also helps in advance planning and optimization matters.

Information Rights: These are the rights of the human agents for information with respect to specific independent or combinatorial entities and statements-of-intent connected thereto.

Decision Rights: These are the rights of the human agents to change the potentiality or reality states of individual or combinatorial entities and statements of intent connected thereto.

Machine Agents: These are synonymous with 'computers' where the units of change are driven by the machine agents—as designed by human agents or other machine agents—so that proper outputs are generated in response to inputs. Machine agents essentially emulate human agents in their ability to consume inputs, bring about a controlled change among them (process those inputs) and generate outputs. In one sense, human agents impart qualities of being purpose driven into machine agents.

User Interfaces (UI): Entities can exist at different levels of abstraction either in the databases or at the user interface levels. It is at the level of user interfaces that the human agents exercise their 'information rights' or 'decision rights'. UI plays quite a prominent role in NSL as the 'users' are in charge of creation or use of solutions—so all things happen over the hood rather than under the hood, so to say. NSL drives the behaviour of entities at the UI level by making UI an 'essential attribute'. These attributes specify how an entity should appear at the UI level, what its address is (which screen, and place on the screen), and whether it is sensitized for navigation or inputting of information, and the like.

NSL Technology Framework: An innovative technical effect that NSL brings about is due to a combination of a unique method and a technology framework. NSL rides over a standardized technology framework that caters to a wide range of application requirements where the 'users' are the primary drivers of solutions. The Technology framework, encapsulating all the innovative methods described in this document, sits on top of the operating systems to cater to any kind of application logic to be conveyed to the computers. Effectively, the user remains agnostic to this underlying technology framework, and is empowered to use NSL in a natural language like fashion. In summary, NSL technology framework is a thin additional layer on top of existing operating systems which gives life to principles and methods behind NSL that is based on differentiation principles. In addition, it also helps automate most of the otherwise human agent functions. But for enhancements from time to time, the NSL technology framework will remain a constant. Just like an operating system, it conveys NSL logic to the computer without use of any code and through natural-language-constructs.

Technology Translation Framework (TTF): One of the most significant things that NSL has is the ability to convert any programming code into natural language like NSL format based on the same principles that deal with controlled differentiations using NSL methods and NSL Technology Framework (NSL-TF), thereby surfacing the logic for direct use and influence of the users or stakeholders. TTF rides over the matrix-based/tile-based approach which encapsulates the keywords, operators, symbols and functions of each programming language and its representation in NSL. The TTF analyses the construct of the code, identifies the programming language it is written in and using the matrix picks up the matching NSL equivalent of every keyword, operator, symbol, function or combinations thereof.

Technology Re-translation Framework (TRF): An innovative framework that NSL brings about is the ability to convert any solution constructed in NSL into any programming language. TRF is based on the same matrix-based approach on which TTF is based upon. The TRF understands the NSL construct and identifies the matching keyword and functions in the programming languages thereby constructing the code in any programming language selected by the user.

a. Translation 360° Any To Any (A2A): The TRF, together with TTF, completes a full life cycle of the regime called 360° Any to Any ("A2A"), using which one has the ability to convert the solution in any programming language or any natural language to any other programming language or natural language. Just like meaning is constant and can be expressed across various natural languages, the solution logic can be expressed in any programming or natural language substrate. In NSL, solutions are a special class of information known as prescriptive information. The Prescriptive information expressed in a potentiality state, when acted upon becomes a reality and that prescription is done at a class level and when their members arrive, the reality happens at a transaction level. Any member arriving at the defined classes will behave the same way as the class. These are replacing the traditional processes. The events that arrive select from the potentiality text and when that happens, the whole thing becomes capable of being expressed in natural language format. In other words, there is a certain differentiation cycle NSL adheres to, where differentiations are expressed appropriately and contextually, and such differentiations as per NSL are expressible in any substrate. The NSL, through TTF and TRF is capable of extracting the solution logic embedded in each of the substrate and treating them the same way as it is treated in the original substrate. This A2A has been tested with the principle that the inputs being the same, the outputs were same in every solution built in various programming or natural languages. In short, the NSL construct acts as a Hub and other programming languages are like spokes. For example: If a programming language has to be translated to another programming language, the programming languages have to touch the HUB called NSL and then branch out as another programming language.

Stakeholder Engagement Centre (SEC): This is synonymous with user interfaces. SEC has the ability to recognize all entities that hold potentiality with respect to any agent and present the same at the user interface levels in a structured fashion. NSL recognizes relevant entities based on the fact that all change-units are driven by one agent or the other clearly establishing ownership. The additional fact that all entities have the decision and information rights over them clearly specified, makes entity distribution across agents and navigation easy. SEC provides a highly customized interfaces to stakeholders that is contextually driven. It provides a distributed and secure environment to each stakeholder. It adjusts itself to users in a personalized way.

Mission Control Centre (MCC): A MCC pulls together those entities that are of importance in the regular course of human agents performing their responsibilities or fulfilling their needs. These entities of importance are pulled together from among the entities that pertain to agents—that is where they have either information rights or decision rights. Distributed MCC is about the ability of the system to first automatically recognize the entities that pertain to specific agent or agents; then pick up entities of importance for the agent(s)' functions. MCC takes the contextuality of Stakeholder Engagement Centre (SEC) to yet another level. It adjusts itself contextually to 'time' or 'events'. It brings to the fore all the relevant 'BETS' that drive the pertinent SSA cycles better. Among other things, informational or actionable measures are also made available contextually.

Quantification of Solutions: Just as Information is quantified in Information theory in 'bits'; NSL quantifies solutions through identification of distance between entity relationships. (a) Binary events: Distance between entity relationships can be measured in terms of minimum number of binary events it takes to get from one CES to another. For example: If entity 1 is 'A', entity 2 is 'AB' and entity 3 is 'ABC', the minimum number of binary events required to happen to get from entity '1' to entity '3' is '2'. The principle is those differentiation that when ignored or recognized, they either result in a merger or result in 2 entities becoming identical. NSL eliminates the difference between structure and process and what counts is only the directionality of the differentiation. (b) Space: Because each CES is either explicitly stated or implied, and operates in space, how much distance has been covered can be gleaned. (c) Time: Since there is stated or unstated time associated with each CES, the time could potentially be assessed and hence the distance can be measured in time.

Basic Change Units: Basic Change Units are the fundamental units where all the transactional interactions between entities and the resultant trigger states happen. Basic Change Units exist and operate the same way irrespective of the vantage points at which they exist. At higher vantage points, the information layer tends to carry lot more information.

Sequential Change Units: These are the CUs that, the Basic CU is capable of influencing through one or more events when triggered. Sequential CU utilizes 'AND' operator principles. CES states are maintained within basic CU as well as sequential CU's to form E-CES. Example, for preparing tea, one needs to put the tea bag in a cup, fill the kettle with water, boil the water in the kettle, 5 pour some boiled water into the cup and add sugar to the cup. These are the sequential steps in the preparation of tea.

Dynamic Natural Language: Solutions are prescriptive information being acted upon. NSL, generally speaking, contains a lot more contextual information than natural language, in the form of all the subjects, objects and the desired transformations (verbs or action words). NSL uses the fundamental principles of differentiation to identify the uniqueness of every entity, by attaching adjectives (attributes) to nouns (entities) and adverbs (attributes) to change units (statements of intent or steps for achieving a purpose or goal). NSL is thus equivalent to Natural Language+.

Everything is a Binary Entity (BET): In NSL, all things distinct and discrete are called entities. These entities are either unique (differentiated distinct entities) or identical (undifferentiated distinct entities). Unique entities are represented by words and identical entities are represented by numbers. The term Binary Entity (BET) connotes all discrete entities being in a state of potentiality or reality. As the word 'BIT' (Binary Digit) exists in the context of information in general, a 'BET' is a subset of a 'BIT' that exists in the context of a solution. Each BET is at a differentiated state on account of lot of BITs of information that it carries and is frozen. Events arrive only at the BITs level. Since all bits are frozen, they lose the ability to be loosely coupled. Example: A pen is made up of many atoms. When the pen is frozen, one cannot plug out an atom and call it as a 'pen excluding that atom'.

BETs at all Vantage points: A solution can be broken down to its components. As it is broken down, one can traverse through various Vantage points—at a Chapter level, at a Paragraph level, at an Extended Combinatorial Entity States level, at Change Units level, at entities level and at Attributes level. One important thing to remember from NSL point of view, is to view anything distinct as a BET. A BET status is accorded to Attributes, General Entities, Agents and combinations thereof, Change Units, Collection of Change Units, Solution Ecosystem and to all higher-level collection of BETs. At every Vantage point, NSL treats each BET as a binary variable. Solution ecosystem is setup in such a way that potentialities and their memberships are laid out to enable events to find their way and tag themselves to their members. BETs exist in different substrates and every representation of BET in every substrate will have a unique identity. Examples: (a) an image, or a video representing an entity will have their own identities. Each representation may consume its own quantum of BITs in the form of BETs. (b) An end to end telecom billing solution is a BET. The Change Units which make up this Telecom Solution such as Customer Profiling, Address Verification, Bill Generation etc., are also BETs and this continues down to the last attribute which is attached to every entity.

BIT and BET: A 'BET' (Binary Entity) is to solutions, what a BIT (Binary Digit) is to information. By extension, a BET is to 'Solutions Theory', what a BIT is to Information Theory. Information in general is measured by the number of 'BITs'. What it essentially means is that every bit is in a binary state of being a '0' or a '1'. Information arises only when the position of every bit is determined or, in a sense, differentiated. In order to count the size of information, one ignores the state of every bit, but only counts the number of bits contained within the information. Similarly, in a solution ecosystem, one could count the number of 'BETS' by ignoring the state of each BET. 'BITS' and 'BETS' are highly correlated concepts only differentiated by contextuality—one pertaining to information in general and the other pertaining to solutions in general. A 'BET' is like a 'Primordial Entity' which is devoid of any differentiations. The 'BET' is represented in FIG. 1. When every entity attains that state, all entities become identical and countable. For example, a one GB video would ignore the states of the BITS. All that matters is the number of bits that made up the video. Similarly, in NSL, the quantification of solutions is done by counting the number of BETS that made up the solution.

Change Unit (CU) Clocks: By the very nature of things in NSL, all things exist either in potentiality or reality in CUs and more specifically in CU components. The differentiations with respect to CUs proceed from a class level to many levels of subclasses until the transactional level is reached. It would be, in many instances, valuable to keep track of the birth and death (deletion) of any entity in the solution ecosystem and by extension, the period and the age of existence of an entity. All entities coexist with time, which means that time is always a part of every CU's CES. Time could be sitting in the CU either as a Change Driver (CD) in the physical layer or as an Information Driver (ID) in the information layer, but most often it is treated as an implied entity. The way "Air" is an implied entity for humans, "time" is an implied entity for change units. It is not required to be mentioned separately. At a 'syntactic level', that is as a fundamental solution support level, that caters to all situations and scenarios, coexistence of every entity with time shall be provided for. At the 'semantic level', it is for the solution designer to use or not to use that property and take 'time' as an implied entity. The usefulness of keeping track of time could extend to a wide range of things extending from analytics all the way up to drawing inferences. For example: Imagine a CU with a pen and 3 other variables. Because there are four variables in the CU, it could potentially have 16 different CES (2^4 states). If the pen is the first to arrive, then CES number 1 could change from potentiality to reality. The system tracks the time of that potentiality and the time when that potentiality died (deleted or eliminated), as that potentiality was replaced by 'reality CES 1'. When another entity arrives, that CES becomes potentiality, and another CES, say CES number 5 becomes a reality. The system could also keep track of individual entities also (not just the CES) as NSL provides for loosely coupled, and yet unitary entity states. When the 'trigger CES' is reached, one can also track the lag time between its reality state and the extended CES arising out of the trigger CES. There is always a lag time involved between the trigger and one or more events that trigger causes. Having this information is of great value for the users of the solution in varying contexts Time Derivatives: One could derive periods of existence of BETs of all vantage points based on their time of birth or death. Start of a trigger and the end of a trigger state with respect to each of the events it produces can be captured and lapse times can be derived. For a CU, the proportion of the time—it is in an idle state and the proportion of time—it is in trigger state could also be calculated. Proportion of time—an entity was idle (not participating in a trigger state) vs active can be established. Correlations established between 'events and periods' at various vantage points throws up humongous opportunities for analysis and action. Combinations of time and spatial coordinates takes these opportunities for analysis and action to yet another level.

Change Unit (CU) Spatial Coordinates: Both 'time', and 'space' are ubiquitous. All entities exist in space irrespective of the substrate they belong to. Whether overtly chosen or not, 'space' always exists implicitly with reference to any entity. Just as the system at the syntactic level provides for tagging time related attribute values to every entity, the system also provides for tagging spatial coordinates to every entity. These could be two dimensional or three dimensional. Since every entity is physical and at the same time informational, their existence and interactions are bound to spatial coordinates. When an entity triggers, the altered states that the trigger creates is also expressible in terms of distances. Example: When John travels from place A to B on occurrence of a trigger state, the distance can be measured in terms of number of meters travelled. This is same as measuring the lapse time. The attribute values of space and time are equally applicable to machine agent functions, as they are to human agent functions. Further, in NSL, all entities exist in binary states (BETs). Each state change is an event. All events happen in time and space. Therefore, all entities have attached time and space attribute values (time stamps) indicating 'coming into existence' and 'going out of existence' along with spatial coordinates respectively. This is same as a person's birth time and death time along with birthplace and death place respectively. This applies to potentiality states as well as reality states. The end of potentiality is the beginning of reality and vice versa. This rule applies at all vantage points.

Spatial Distances: Distances covered, in the course of providing a solution, could be derived by cumulating the distance covered by each of the CUs. Such distances can be calculated based on the actual distances traversed or theoretically as a crow flies. These measurements can be for any CU to any CU among the connected or related CUs with reference to a particular solution.

Figure 19:
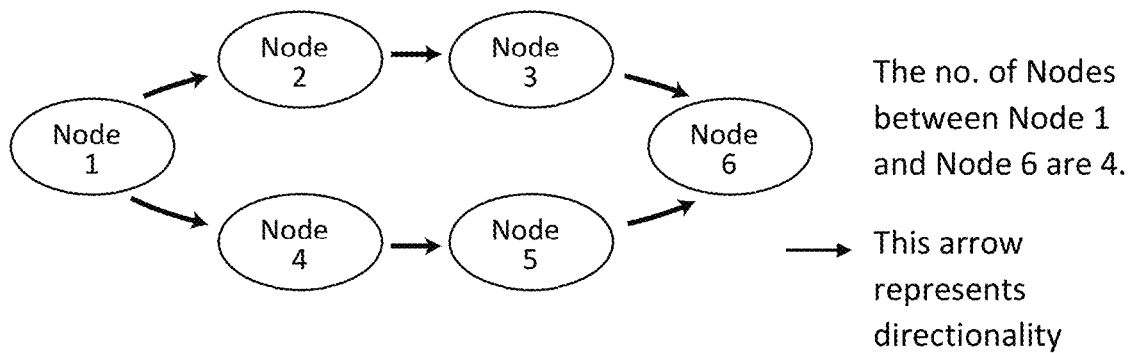
FIG. 19 represents an example of Functional Distances.

Functional Distances: NSL is modelled after a network of nodes spread in three dimensions connected by lines that have directionality associated with them. NSL has an ability to normalize any type of database makes 'polyglot persistence' possible. All entities reside—either in potentiality or reality—inside the nodes. Each of those entities can take many avatars in the form of 'identity, language/number, image, and the like' sitting in the respective substrates. Crossovers from one substrate to another is permitted provided the principles of equivalence and truth values are preserved. Equality applies between classes, between classes to members (a deductive process), and members to classes (an inductive process). All nodes are connected to each other following the nearest neighbour principles. Nodes in the same transaction are called the connected nodes. All nodes in the same solution ecosystem are called the related nodes. Since NSL is governed by network of nodes, all things in the solution ecosystem are relative in nature. Just as the 'cosmological principle' in science, any chosen node or vantage point becomes the central reference point. In other words, there are no absolute reference points—all things are relative. Since the lines connected to the nodes have a directionality, there is a directionality to information flow or differentiations in general. Network of nodes provides for all degrees of freedom. Hierarchical models arise out of specific choices made with respect to information and decision flows, but they are not fundamental. In this background, it is possible to choose any two nodes and measure the functional distances. One has to count the number of nodes if one needs to traverse to get to the other node. This helps to judge the closeness of the relationship between two nodes, among other things. The Functional Distances example is represented in FIG. 19.

Figure 33:
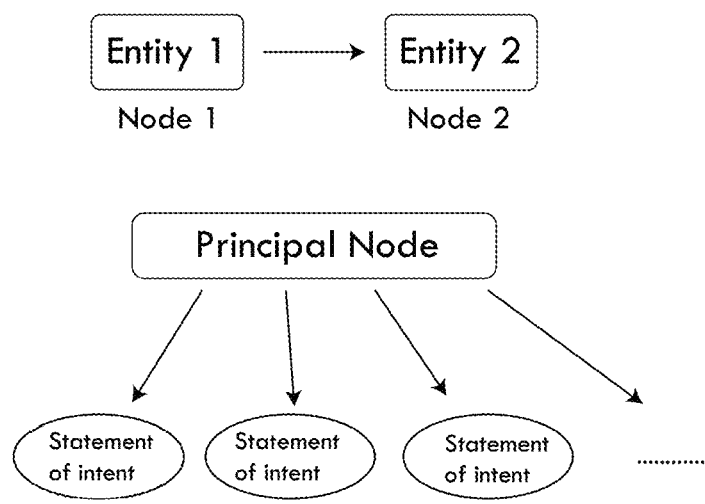
FIG. 33 represents an example of a CU as a local network of nodes.

CU as A Local Network of Nodes: There are innumerable species and organisms on earth. But all those species without exception are made up of 'cells'. The fundamental building block of all organisms is a 'cell'. Similarly, the fundamental unit of any solution is a 'change unit' (CU). All change units are made up of a 'local network of nodes'. A node represents the identification of existence of an entity. Connection of nodes is expressed through 'transformation lines' (TL) with arrows (or equivalents) showing the direction of differentiation between nodes. Nodes are differentiated by unique or identical entities hanging to them. A CU begins with the 'principal node' which is differentiated by 'statements of intent' attached to them. FIG. 33 represents a CU as a local network of nodes. CUs have at the initial level, nodes that relate to 'independent entities' that differentiate the principal node. There is no theoretical limit on the number of nodes at the initial level. There can be any number of levels of attributes and that every level can have any number of attributes. There are four levels of nodes i.e., known as FOUR LAYERED CUs. The nature of this local network of entities is one that it has a property to cause an event in one or more local network of nodes on the trigger condition being met. This property is referred as the driver of change drivers (DCDs). It is also known as 'change drivers' in NSL. In reality, a triggered state of a local network can drive changes in any of the layers of any local network of nodes (say, information layer) including itself.

Four Layered CUs: Everyone has learnt from the way the world works principles as established by 400 years of science. In the presence of agents there are some principles that come to the fore.
 i. Agents are constantly seeking solutions for their survival.
 ii. All solutions arise out of controlled and directed change.
 iii. In other words, agents are driven by purpose as controlled by SSA cycles.
 iv. Agents are designed, in case of humans by nature through evolutionary processes,
  and in case of machine agents by human agents, to beat complexity and infinities.
 v. In other words, agent systems are driven by discrete/distinct states out of necessity.
 vi. Broadly speaking, discrete states pertain to objects, their attributes, and any kind of change.
 vii. Any change is driven by cause and effect principles as experienced by Change Units
  (CUs), with SSA cycles being inherent to them.
 viii. Any discrete/distinct state that is unique can be represented by natural language.
 ix. Any discrete/distinct state that is identical can be represented by a number.

Figure 29:
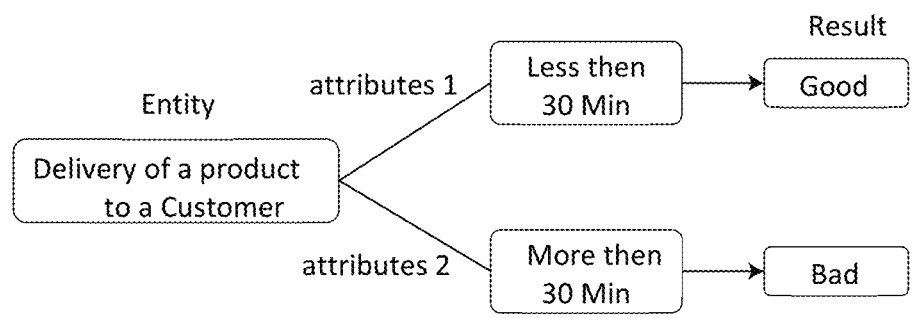
FIG. 29 represents an example of delivery of a product to a customer within a specified time frame or more than a specified time frame.
Figure 30:
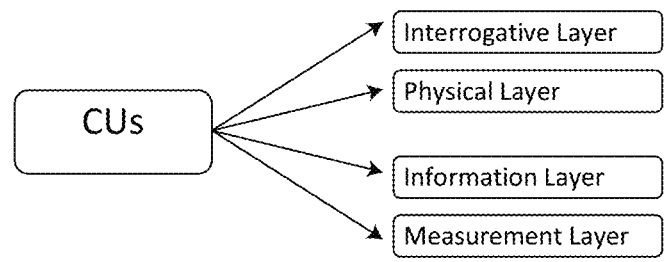
FIG. 30 represents an example of four layered CUs.

In NSL, a CU as a local network of nodes. The principal node represents that local network in the form of a 'LSI' or a CU name. There are two types of layers in the local network of nodes—Physical and informational. But implied or inherent in each of the local network of nodes are two more layers. One of them is the 'interrogative layer'. This represents ignorant agent(s) posing questions and seeking answers from the agent(s) sifting in a CU(s) that are knowledgeable. In order to perform functions within a CU, it is a given that the agents in a CU are knowledgeable. Depending on the Information and Decision Rights of the agents posing questions (interrogatives) the knowledgeable agents are obliged to provide or not provide answers. The other implied layer is the 'measurement layer' (referred to as exclamatory sentences in natural languages). Measurements have the following properties: (i) They are the highlighted portions of the physical or information layers. (ii) Typically, those highlighted portions are further differentiated by attribute values to bring greater focus to things. Example: If the highlighted portion is the 'delivery of a product to a customer', the differentiating attribute could be delivery in less than or more than 30 minutes. (iii) The third property of a measure is a view taken by an agent on the status of the highlighted portion with given differentiated attributes. These are generally referred to as norms. Example: Less than 30 minutes delivery is good, and more is considered bad. This example is represented in FIG. 29. In summary, NSL considers CUs to be four layered and the same is represented in FIG. 30. The four layers of CUs are as follows:
 1. Interrogative Layer: This layer is latent and is invoked when 'ignorant agents' pose the questions. The ignorant agents are provided with answers by empowered agents possessed with information rights and decision rights (IRDR) sifting in the respective CUs.
 2. Physical Layer: It is same as imperative or prescriptive statements in natural languages.
 3. Information Layer: It is same as descriptive or declarative statements in natural languages.
 4. Measurement Layer: It is same as exclamatory statements in natural languages.

Figure 34:
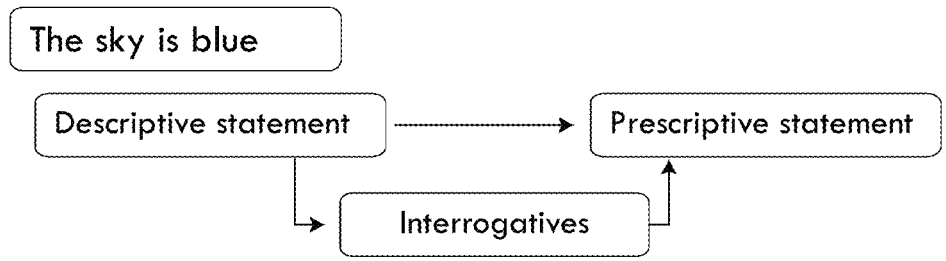
FIG. 34 represents an example of interrogatives helping convert descriptive statements to prescriptive statements in a binary state.
Figure 34:
Figure 35:
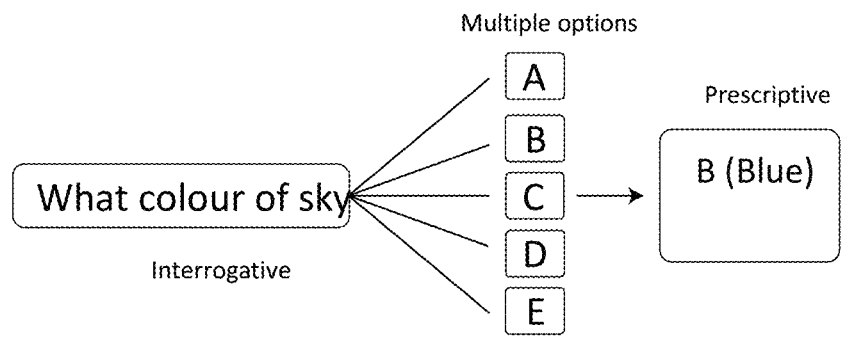
FIG. 35 represents an example of interrogatives helping convert descriptive statements to prescriptive statements with multiple options.

Interrogatives helping convert descriptive statements to prescriptive statements. There could be descriptive statement such as, 'the sky is blue'. This could be converted into a prescriptive statement by posing the question or interrogative, 'is the sky blue?'. The qualified members of this prescriptive statement will be in a binary state of being blue or not being blue (an 'yes' or a 'no'). FIG. 34 represents interrogatives helping convert descriptive statements to prescriptive statements in a binary state. When there are many options provided, the interrogative statement generated 'prescriptive statement' will take the form of a multiple-choice questions. Example: 'What colour is the sky?', the options provided would be A, B, C, D, and E with the 'blue' colour being one among them. Only blue qualifies to be a member in it. FIG. 35 represents interrogatives helping convert descriptive statements to prescriptive statements with multiple options.

Avatars of an entity: Every Entity is physical and has to be represented in one form or the other. Every entity has an identity, a name and in many cases an image. For example, a person may have a name, an identity number, or a photograph which equates the physical person to representations in all three forms. Each representation takes a certain quantity of bits to maintain equivalence across substrates. A name written on paper, or an image representing the person to a video depicting the person will each have different quantities of bytes of information. These varied representations of the same entity in multiple substrates are known as Avatars of an entity.

Figure 2:
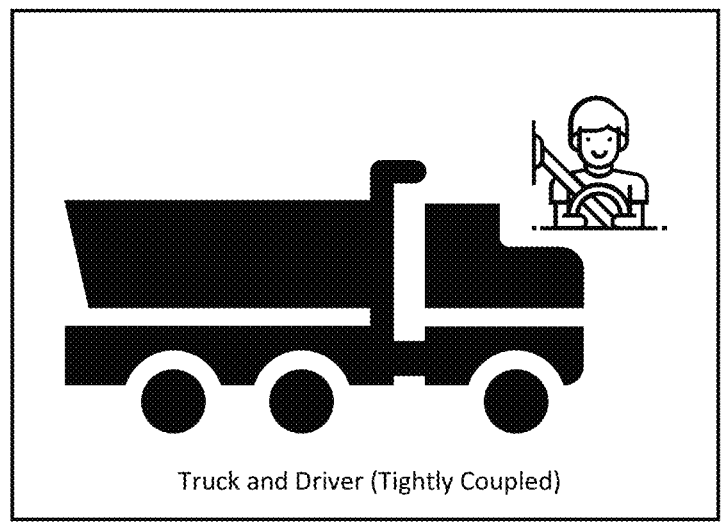
FIG. 2 represents an example of Tightly coupled entities.

Tightly Coupled Entities: Agents and general entities come together contextually to produce an intended change. Often, a combination of entities may arrive or depart together. Tightly coupled entities are those that act together. Example of tightly coupled entities: a truck and a driver arrive and depart together. Tightly coupled entities cannot act independently. In any change, where tightly coupled entities are participating, they must participate together. There cannot be any occasion when one of them is missing from the action. Instances of multiple entities participating in the change together are called tightly joined entities. For example, while performing a surgery, the doctors come in specified suits, gloves, mask and so on. Example of tightly coupled entities is represented in FIG. 2.

Figure 3:
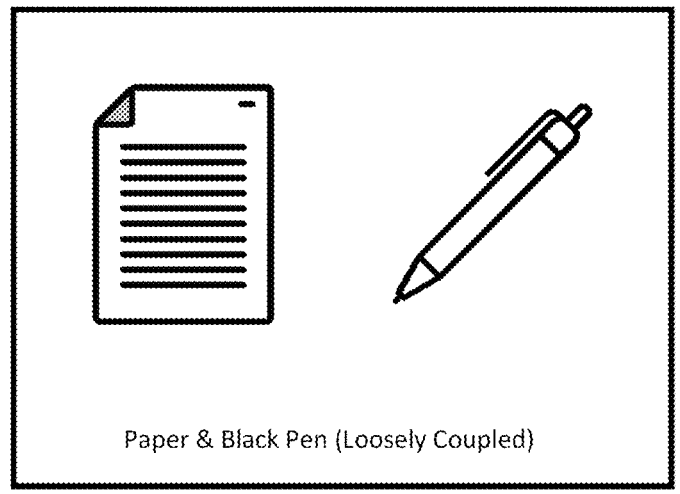
FIG. 3 represents an example of Loosely coupled entities.
Figure 4:
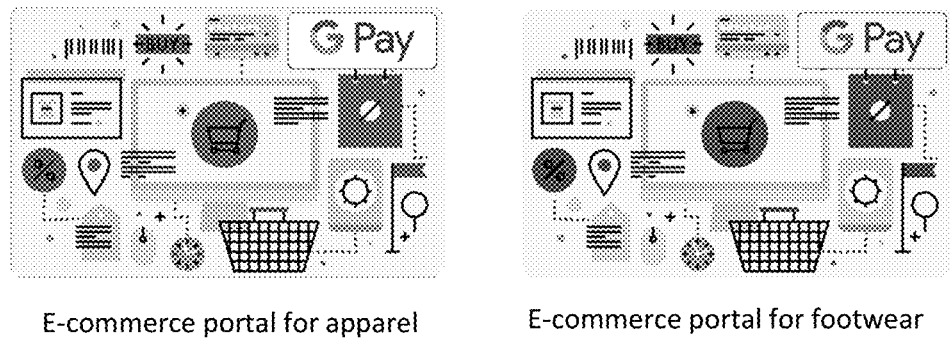
FIG. 4 represents an example of Reserved Entities.

Loosely Coupled Entities: Loosely coupled entities are unitary entities that arrive separately to participate in a change. Example of loosely coupled entities: a pen and a paper can arrive separately into the change unit. They are loosely coupled entities; they can arrive independently. Example of loosely coupled entities is represented in FIG. 3.

Substitute Entities: Substitution of entities can happen at (a) Independent entity level (b) Attribute level and (c) CU level. The word 'substitution' is used only in cases where the ensuing state will generate the same set of events. If the transformational pathways are different, then it cannot be called a substitute entity. When substitution happens, the nearest neighbour should not notice the difference. The effects of the trigger states should remain the same. For example, A pencil can act as substitute for a Pen in the context of writing. The system plays out dynamically that the recipient shall not even notice which entity participated in the change—whether it is the original entity or the substitute entity.

Cloned Entities: As a part of solutions, sometimes, there is a need to make copies of soft assets, without differentiating one from another. Such identical non differentiated soft assets are called cloned entities. Example: An Organization policy has to be communicated to all the employees through an email and each copy of the email is identical and undifferentiated. NSL system provides for entity cloning as a part of the solution design. Amongst the cloned entities, one will not be able to determine which is an original entity and which is a cloned entity.

Figure 20:
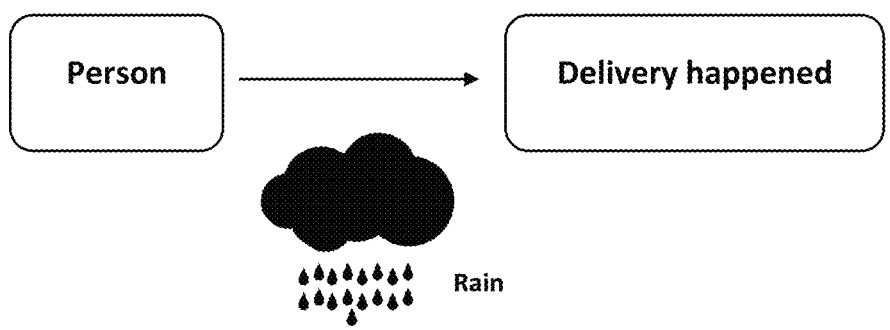
FIG. 20 represents an example of Negative-Entities.

Negative-Entities: It is generally the case that Change Drivers (CDs) that matter are a part of a trigger CES. But in some rare instances, what matters may be absence of an entity rather than presence of an entity. Example: For delivery to happen, it may be important that 'rain' as an entity is not present. This example is represented in FIG. 20. NSL provides for n-Potentialities and n-Realities, that provide an alternative way of dealing with it at attribute levels.

Figure 39:
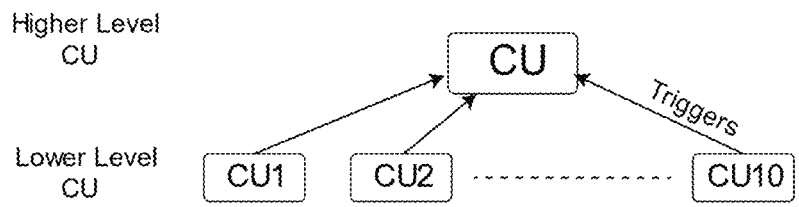
FIG. 39 represents an example of the GSI of the lower level CUs will trigger the higher level CU.

Embedded Change Unit: Embedded Change Units (eCUs) are CUs within CUs. Embedded Change Units (eCUs) are part of what are called vertical differentiations. They trigger only on the trigger of the higher-level CU—either the basic CU above or the eCU immediately above. When there are many levels of eCUs, they are referred to as Primary, Secondary, Tertiary and so on, similar to the way levels of attributes are defined. At every eCU level there can be any number of connected eCUs. There are two kinds of eCUs— 1. Sub-CUs and 2. Recursive CUs. Whether it is 'recursive or sub CU', the nature of the function is just the same. Embedded CUs break up the function of the higher level CU into many steps through connected smaller CUs. Example: The higher level CU could be dealing with moving from one end of the city to the other end. Embedded CUs could break up the function into crossing of 10 connected streets till one exits the city. Entry into the city triggers the embedded CUs of CU1 and exit from the last street triggers the higher level CU, placing the 'exit from the city' event at higher level CU2. In other words, the GSI of the embedded CUs triggers the higher level CU, causing it to generate an event in the next CU. It is incidental that there can be any number of layers of embedded CUs. The GSI of the lower level CUs will trigger the higher level CU is represented in FIG. 39.

Sub-CUs: When a CU is segmented into many underlying smaller CUs, each of those become Sub-CUs. For example, an activity (a basic CU) that takes ten minutes can be broken into many smaller change units made up of minute-or-two segments called tasks. In the absence of a sub-CU, a basic CU (CU1) could place the output in a sequential CU (CU2). But, if the solution designer intended that the activity should be driven methodically through steps laid down in smaller CUs (sub-CUs) connected with it, the designer will have that choice. He could introduce one or more connected sub-CUs. When the basic CU (CU1) triggers, it would then rely on sub-CU-set sitting in the primary embedded CU level. The embedded CU set will have its own embedded GSI. On triggering of that GSI, an event would now be caused in basic CU2, just as it would have happened if the embedded CUs did not exist. This process could occur to any depth with respect to more levels (secondary, tertiary, etc.) of embedded CUs being present. Secondary CU will service respective individual CU in the primary level (each task) through its GSI. That is, Sub-CU1 (task 1) at primary level will be serviced by secondary level GSI and will cause an event in sub-CU2 (task 2) at primary level. This process can continue to any number of levels. NSL provides the ability for each task to be serviced by any number of sub-tasks in the secondary level. Each of several tasks at primary level can have their own secondary levels individually, with any number of tasks that can be accommodated at each of those secondary levels. This is how the differentiation tree built through embedded CUs branches out. At a principal level, there is no difference between the manner in which differentiations happen with respect to attributes and the differentiations as caused by embedded CUs.

Recursive CUs: There are no fundamental differences between Recursive CUs and Sub-CUs. Both are subservient to the basic CUs or higher levels of either Recursive CUs or Sub-CUs as the case may be. The main, and the only difference, between them is that Recursive CUs deal with recurrences and therefore numbers and mathematical constructs; Sub-CUs involve unique entities and unique transformations. For example, each of the series of tasks embedded in an activity would be unique in Sub-CU instances. Washing a dish involves tasks like bringing the unwashed dish from the dining table to the sink, opening the tap, making cleaning sponge wet, applying soap to the sponge, cleaning the dish, etc. On the contrary, Recursive CUs involve recurrences in space and time of some kind. In the case of Sub-CUs, with respect to washing of a dish, Basic CU1 would have triggered and all the tasks are performed at the level of embedded Sub-CUs. The outcome of that would be that the GSI at the level of Sub-CUs would place the washed dish at the Basic CU2 as an event it has caused. This would have happened anyway (Basic CU1 placing the clean dish in CU2), if the solution designer chose not to impose a standard operating procedure in the system by way of primary level tasks. In case the solution required that the dish be washed ten times, before it is placed in Basic CU2, Recursive CUs are important. The tasks performed would not be unique but repetitive. The Recursive CU1 will place in the next Recursive CU the dish that was washed once, the second one will place in the third the dish washed twice, so on and so forth. The last Recursive CU, which is also the GSI where the tenth wash has happened, will place the ten times washed dish in Basic CU2. The change drivers (CDs) in each of those Recursive CUs would be the same agent and the same dish with the attribute values of those dish changing progressively. In the first Recursive CU, the dish would have an attribute 'washed 0', in the second 'washed 1', in the third 'washed 2', so on and so forth.

Figure 40:
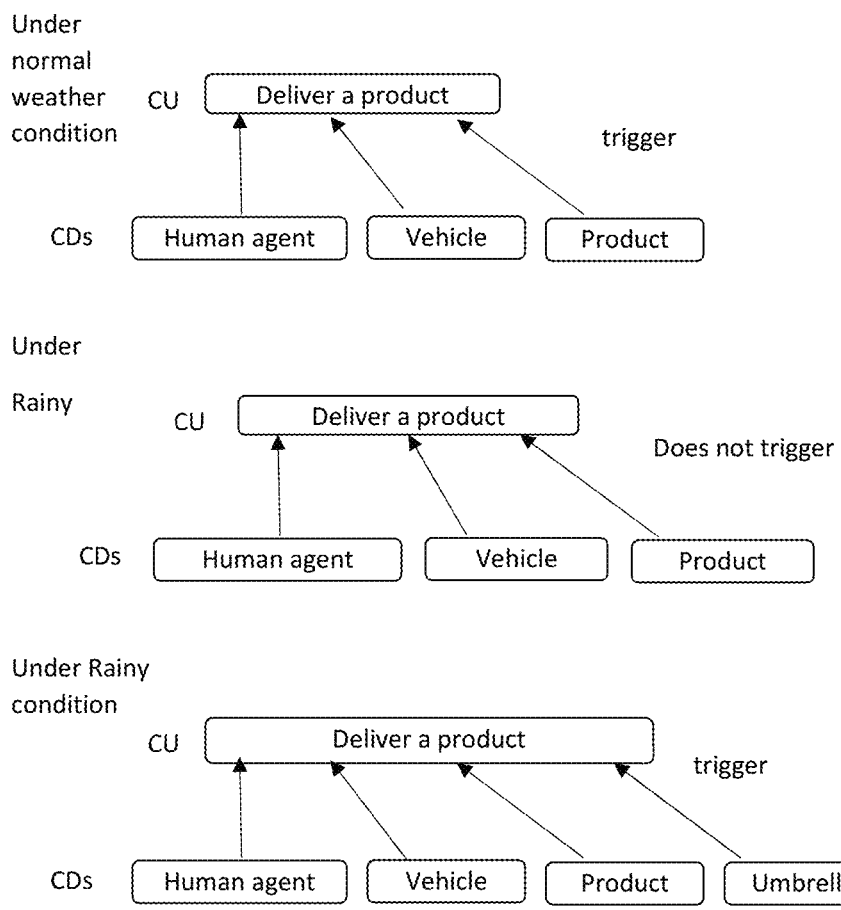
FIG. 40 represents an example of nested CUs apply greater contextuality to the contextuality existing at the higher level CU.

Nested CUs (nCUs): Inherent in every change unit is a playout of fractal like SSA cycle. In the presence of agents, senses detect things in the environment, the mind makes appropriate selection from many possibilities and the body provides the requisite energy to complete the change cycle. Nested CUs are additional layers of CUs added to a Basic CU to give it the power of significantly more information at the transaction level. It is like an SSA cycle within an SSA cycle of the Basic CU. NSL does not place a limit on the number of layers of SSAs or change units. Depending on the desired solution, the solution designer has the flexibility to add as many granular SSAs as required, within a basic change unit Nested CUs can cause one or more events in one or more CUs including the Basic CU that they belong to or their higher-level Nested CUs. For example, a nested CU can convert the 'reality of Basic CU intent' to potentiality and thus disable it under certain circumstances. Events that Nested CUs cause are always in the context of Basic CU to which they are attached, while their trigger could be independent of the trigger of the Basic CU or a higher-level Nested CU. The CDs of nested CUs could be independent entities or attributes of basic or higher-level CU entities (such as the probability of reality state of an entity or a CES). Nested CUs can also convert 'Conditional Potentialities' to potentialities in one or more CUs including themselves. For example, a rain could convert a conditional potentiality of a raincoat in the basic CU to a potentiality—thus making trigger of the basic CU conditional to the availability of a raincoat. Nested CU is euphemistically called Nested mind. Embedded CUs breakup a coarser CU into more granular connected CUs. On the contrary, nested CUs apply greater contextuality to the contextuality existing at the higher level CU. Example: The higher level CU contextuality could be to deliver a product provided there are CDs such as a human agent, vehicle, and the product. The implied condition at the higher level CU is that the weather is normal. There could be nested CU created that brings in the contextuality of 'rain' into picture. The higher level CU will continue to function as though the nested CU did not exist till such time it did not rain. On the condition of the rain being fulfilled, the behaviour of the higher level could change. It could result in stopping the trigger of the higher level CU and abandoning the transaction or it could create a conditional potentiality of introducing an additional CD such as an umbrella. This example is represented in FIG. 40. If the probability of CDs arrival is low, that context could influence the behaviour of the higher level CU. Example: If the probability of the doctor's arrival is quite low, the patient can be asked to come later. There can be one or more connected nested CUs. There can also be any number of levels of nested CUs—contextualities within contextualities.

Nested SSA and Residual Information: Nested SSAs make use of the meaningful information and act on it. On some occasions, a lot of information gets accumulated over time which may not find any value in the form of SSA cycles. This is termed as residual information. The nested mind is to be viewed as any number of layers of nested SSAs. If information cannot be acted upon, it sits in the informational layer of the last layer of the nested CUs. Any action emanating out of nested SSA can be added to the solution class as a CU. The addition of a CU adds more information or generates more information in the form of transactions. Residual information can remain at every nested SSA cycle levels.

Normal Probabilities: Probability is the quantification of likelihood of occurrence of an event. NSL is an entity-based model where entities can switch between potentiality and reality as driven by events. NSL provides the ability to apply statistical methods to BETs at all vantage points. Probability is defined as the ratio of favourable outcomes with respect to possible outcomes. It is based on observation of past events. Example: Delivery of a product may be considered favourable if it happens in less than one hour. Other things remaining the same, across 1000 instances of that product delivery, it could have happened in the stipulated time 800 times. Then the probability that product would be delivered next time would be 80%. In NSL, all transactional classes sit within 'solution classes' above. In order to calculate probabilities all, one has to do is gather transactional information with respect to a given solution class. These calculations can be done in a batch mode in NSL, in most instances, if the probabilities are not likely to vary significantly with every recent transaction. The use cases for application of probabilities are straightforward and plenty. Example: What is the probability that the doctor will arrive in the next hour? If the probability is 80%, then it might be worthwhile for the patient to wait. Applications of probabilities extend to Advanced Planning and Optimization (APO), Analytics, Robotic Process Automation (RPA), introduction of conditional potentialities, Machine Learning, and the like.

Differentiated Probabilities: A case can be made for many variations in calculating probabilities. The Probabilities can be assigned to various vantage points of differentiations tree. Example: What are the chances that a criminal is in a particular Country, or State, or City or Locality? What are the chances that the first event would happen in a particular LSI within a GSI? What are the chances that this alternative CU will trigger first vs some other alternative CU?

Figure 21:
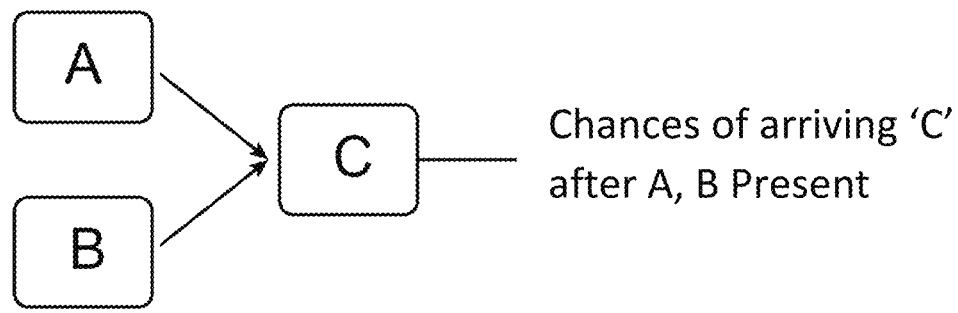
FIG. 21 represents an example of Bayesian logic.
Figure 21:
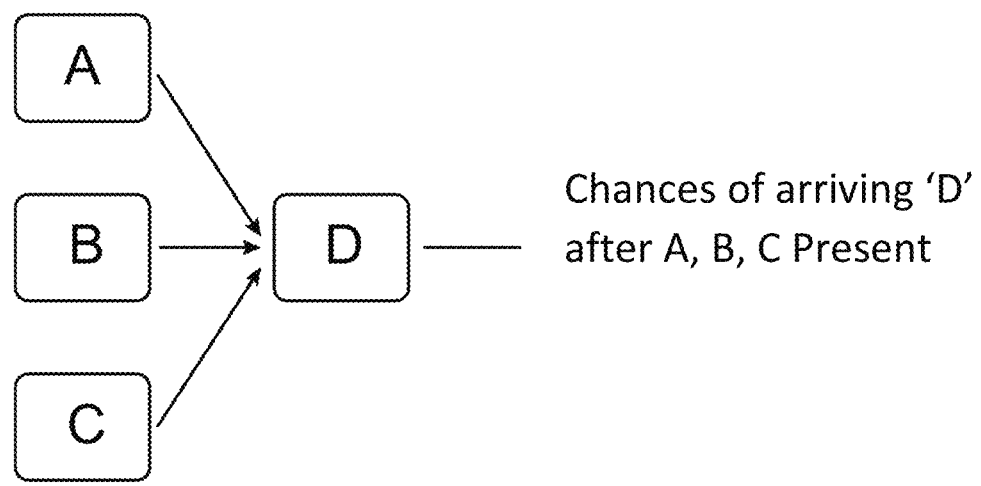

Bayesian Logic: Bayesian logic has been gaining in importance particularly with reference to machine learning. This is about probability of an event based on prior knowledge of conditions that may be related to the event. This is also closely connected to 'conditional probabilities.' Examples: What are the chances that 'C' will arrive, given that A and B are already present? What are the chances that 'D' will arrive, given that A, B, and C are already present? This example is represented in FIG. 21. NSL framework provides for 'Contextuality'. That is, it provides for the arriving or departing entity to be put in the context of the environment into which it arrives which is same as existing CES or ECES being influenced by the arrival or departure of an entity. In NSL, 'conditionality' is nothing but existence of a certain state based on which an action can be performed. Change propagates across the solution ecosystem based on nearest neighbour principles. Given that these fundamental properties exist in NSL, Bayesian logic or 'conditional probabilities' can be dealt at all vantage points quite naturally.

Conditional Potentialities: There are so many entities in the universe of the solution ecosystem. All those existing in the universe are possibilities. A solution designer picks up those possibilities from the universe as potentialities. Between the universe of potentialities and the universe of possibilities, NSL provides the ability of creating an intermediary state, where in possibilities can be stored as reserves and can be converted into potentialities upon fulfilling certain conditions called 'Conditional Potentialities'. Conditional Potentialities are a special class of potentialities that convert themselves to potentialities only on fulfilment of certain conditions. These are potentialities that could exist at the level of attributes, all the way up to paragraphs or even books as a whole but are triggered only on certain conditions being fulfilled. Otherwise, they are like shadow potentialities that are ignored for the purpose of determination of trigger properties. Ex. Raincoat may exist as 'conditional probability' in a basic CU. But it may not be considered for the purpose of trigger of the Basic CU, till such time the 'conditional-potentiality' becomes a 'potentiality'. It is essential for an entity to be first in potentiality for it to become a reality. This is hugely powerful construct in NSL as the entire solution ecosystem can alter its behaviour dynamically as the environment may dictate. The flexibility that this introduces ranges from an attribute, all the way up to highest vantage points in the solution ecosystem. Exercise of this power is only limited by certain conditions being met—and the application of information rights and decision rights of agents.

Entangled CUs: This construct is introduced into NSL to address frequently encountered mathematical expressions such as formulas and equations. Entangled CUs always coexist with properties of being able to influence each other conditionally. The behaviour of entangled CUs is synonymous with entangled particles that determine the value of their counterparts when their values are determined. In other words, there is an inextricable dependency on each other.

a. Formulas: These are defined as 'general constructs of relationships between quantities.' These qualify to be viewed as supersets. Example: 'A' is more than 'B.' These are expressions that contain the possibility of equations but could extend to other general formulas also.

b. Equations: These are defined as 'statements that assert the equality of two expressions.' This is similar to the value of a 'subject' being same as an 'object' with a special property of being able to determine the values of each other unlike a normal sentence where the 'subject' determines the behaviour or the 'object'. This should be seen in the context of mathematics where there is a place for only identical entities and their relationships with respect to sets that they form.

Directionality of Entangled CUs: The 'directionality of differentiation' among entangled CUs is of two kinds.

a. Bidirectional: This applies to entangled CUs with respect to 'equations.' It is in these instances, the events that determine the trigger states in either of the CUs determine which CU takes precedence over the other. Example: $A+B=C+D$. In NSL, $A+B$ belongs to one of the entangled CUs and $C+D$ belongs to the other. If $A+B$ values were determined first, that would become a preceding CU and if $C+D$ values are determined first, then that would become the preceding CU. In case of equations, the equation sign ($=$) shall be present in both the CUs as a constant.

i. Conditional Triggers: The trigger properties of 'entangled CUs' is different from the normal CES based triggers, where on arrival of all change drivers within a CU a trigger happens. In case of a conditional trigger, the state of the next CU is also material. Its state should be such that all but one variable is waiting for value determination. If '$A+B$' values are determined, then it is also necessary for a 'D' and a mathematical expression '+' to have arrived for the '$A+B$' CU to trigger and provide the value for 'C' in the next CU.

ii. Value Functions: In the case above, one CU generates value in another CU, based on fulfilment of conditional trigger states.

iii. Conditional Functions: If the solution designer intends to look for conditions of equality or non-equality to be determined with respect to entangled states, they act as a unitary alternative CU. Example: If $A+B=C+D$, then trigger CU2, if it is not equal, trigger CU3.

b. Unidirectional: This applies to formulas, other than equations. Example: '$A+B$' >'$C+D$'. In this instance, '$A+B$' is always a preceding CU and the succeeding CU '$C+D$' will carry '>' sign also with it. The value of the CU '$C+D$' would be determined by '$A+B$' CU on the condition of '$C+D$' values having arrived. So long as the values of '$C+D$' do not arrive, the unitary alternative CUs will not trigger. But once those values arrive, one of the alternative CUs (one with value of '>' or one with '< or =' value) will trigger.

Figure 5:
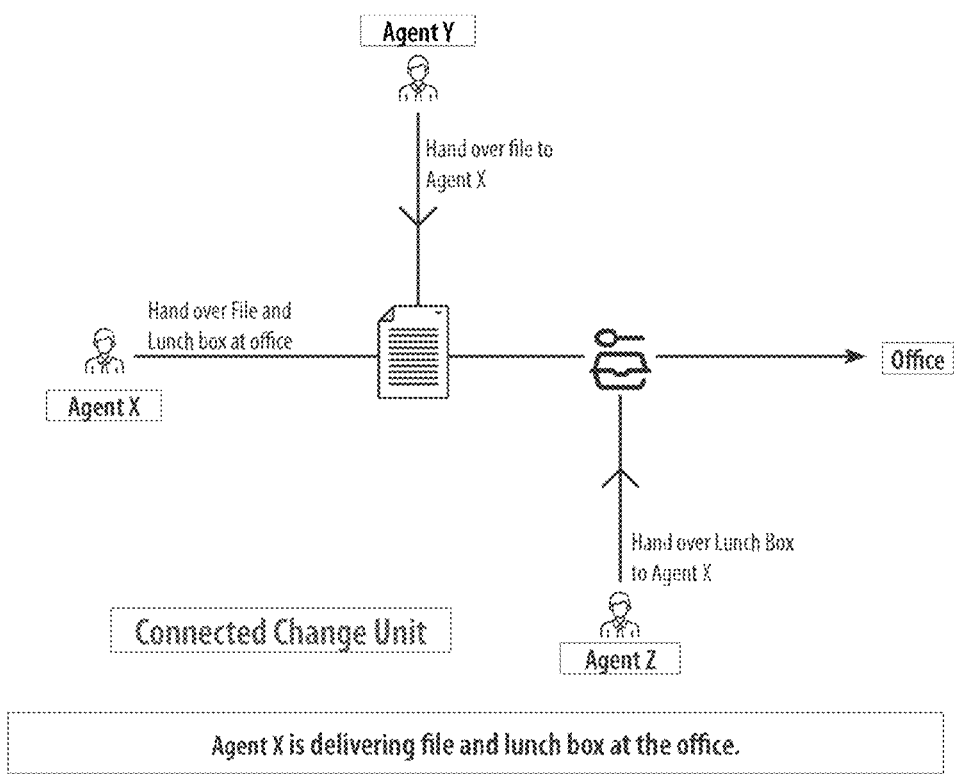
FIG. 5 represents an example of Connected Change Unit.

Connected CUs: All CUs and entities in the ecosystem are related to each other. It is only a question of how close or distant that relationship is. This is similar to how humans have relatives in the form of first, second or third cousins. Connected CUs are those that belong to the ecosystem of a particular GSI. There can be many connected GSIs, but when one of them gets fulfilled, the other connected GSIs disappear, based on the selection done by events. For example, in order to fulfil a customer's global intent of carrying a file and a lunchbox to reach a destination, two separate agents can supply those entities (file and lunchbox) into the connected CU system. The example of Connected CUs is represented in FIG. 5.

Figure 6:
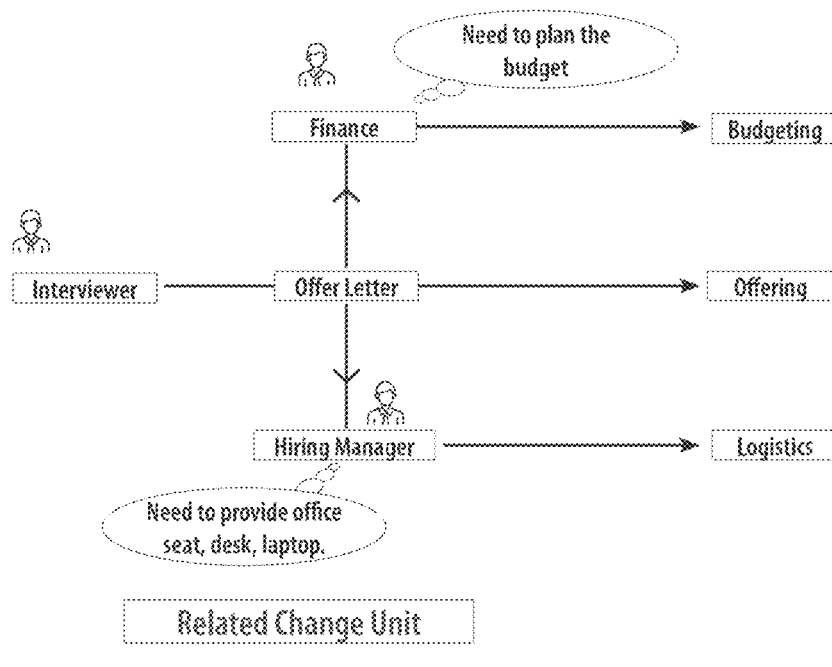
FIG. 6 represents an example of Related Change Unit.

Related entities and CUs: The term 'related entities' refers to all entities that belong to the solution ecosystem, directly or indirectly. Even the entities that arrive into and exit from the solution ecosystem are included. These extend to all classes and all transactions. Related CUs are those which may not be connected with the same global intent. A connected CU ecosystem is, in some ways, a subset of a related CU ecosystem. Example of related CU system: When a final offer letter is made to the candidate, both the Finance Manager and Hiring Manager are notified. The Finance Manager will have to do the budgeting, whereas the Hiring Manager will have to arrange for logistics for the new joiner, while the interviewer will move ahead with his interviewing formalities. The example of related CU is represented in FIG. 6.

Figure 7:
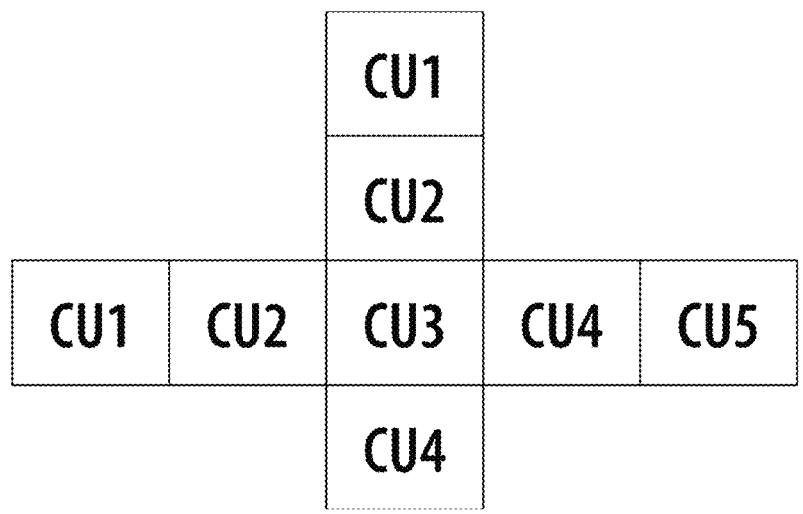
FIG. 7 represents an example of Relativity of Basic Change Units.

Relativity of Basic Change Units: Entities at all vantage points have structures. There are horizontal and vertical structures. Entities are distributed across change units. Change units are part of solutions, solutions serve a business, and so on. Fundamentally, all solutions are made up of one or more than one change unit. Change units consume inputs and produce outputs. If a solution is made up of more than one change unit, the output from the first change unit becomes an input for the second change unit. From the vantage point of the second change unit, the outputs are necessarily inputs. Similarly, a change unit belongs to a solution. A solution may serve a business unit. The business unit may fold into a larger business segment or a vertical. There are subordinate and super ordinate structures within change units. Relativity of change units depends on the vantage point from where the solution, or its components, are viewed. All entities and CUs are related to one another. In order to reach a desired state, entities and CUs need to transition through many local Combinatorial Entity States (CES). All these transformational states are attained through directed change and function as per the Nearest Neighbour concept, which refers to the immediate next state which is attained due to cause and effect principles. Every change unit, connected and/or related with respect to the fulfilment of a wish, is assigned a contextual identity. The ecosystem can alter itself in the interest of an agent and only those entities that matter for the agent will present themselves. Every chosen CU determines the reference frame and assesses its distance to and from any entity in its ecosystem. Each change unit in the solution is taking the agent closer to the fulfilment of a wish and has its relative position. The example of this is represented in FIG. 7.

Controlled Reduction in Uncertainty: All solutions are a result of change. A random change is highly unlikely to lead to a desired change. Solutions are about transformation form one 'sub-optimal CES' to another 'optimal CES'. For the transformation to be reliable, the change has to be a controlled one. Human agents control change by gazing the environment through 'sensing' the environment. For example: 'Search' is one mechanism of gazing the environment. Agents go on to 'selecting' the right entities and then 'acting' on the selected entities. Such controlled action leads an agent from one CES to another till such time the desired CES (optimal CES) is reached. Controlling change requires the mind function. It also requires the body function (the actuator). Both are driven by controlled energy. Human body and brain are well equipped to store energy through the food they consume and control the release of such energy. What this essentially means is that the movement from one CES to another requires the turning of the 'SSA' cycles. In NSL, mind function is expressed through identification of potentiality entities with defined membership criterion. The CUs with their class level components layout the pathways of change, one CU SSA cycle at a time. These cascades of SSA cycles get to the solution in an ideal situation. Sometimes these transformational pathways (the connected CUs) are created by human agents on the fly. But most often, these are stored procedures based on the fact that situations are often repetitive in nature. This is the use of solution class level CUs put in place in anticipation of recurrent membership arrivals by the solution designers.

Solution Class: A solution architect defines classes and subclasses and creates potential level paragraphs. Events arrive at member level and they select the appropriate class. It always starts with a desire being formed, and the change drivers and agent being selected. It is important to separate out the entities that are at the vantage point of solution logic from entities at transaction logic. In the solution logic the variables are 'Any LSI', 'Any Human Agent', 'Any Pen', 'Any Paper', etc. that lay out the principles of entity relationships. All classes have implicit or explicit membership determination criteria. At one end it can be just a binary state, such as 'light being there or not there'. At the other end it could be 'person' as a class entertaining any of the 7 billion people in the world as its members. In such instances, the rule is that the class admits any of the 7 billion people, but only one at a time.

Sub-Solution Classes: There could be any number of sub-classes between the Solution in the lead up to the 'Transactional Class'. Example: If the world is a class level entity, the USA could be its sub-class, and California could be its sub-sub-class. It is to be noted that the sub-classes are the members of the Class.

Transactional Class: The transaction class is a member of the solution class. When a transaction is carried out, the user can select from different possibilities and options that the solution class allows, and which are in potentiality state. It is at the transactional class that transactions playout. It requires the stated transactional change drivers (CDs) to be in place at the physical layer of a CU. For the transaction to playout, 'minimal membership criterion' should be met. Example, When the CU specifies the information of a human being and if a dog arrives, the minimum criteria is not met.

Differentiated Transactional Class: This is one where there is a lot more information that the transactional class entities shall be carrying, going well beyond meeting the 'minimum membership criterion'. Example: The pen that has arrived may be carrying with it additional information such as its colour, its make, the time of its arrival, place of its arrival, and the like.

Sub transaction Class: The solution designer as a part of the solution creation defines the transaction class without mentioning the specifics therein. The agents arriving at the Transaction class has the liberty to create sub classes of transactions which are called Sub transaction Class. Example: The solution designer defines the CU for writing a letter, but the agent writing the letter chooses the style and contents of the letter. This feature empowers every transaction performing agent to be a designer of a solution at the transaction level. This is made possible using the same solutions environment applying Information and Decision Rights. Through the introduction of creation of classes within classes, NSL converts every transaction performer and a user into 'planner and designer'. This is predicated upon the fact that when limiting the degrees of freedom as per planning. It helps agents at the transactional levels to carveout their own destinies. One scenario is to be confined to the constraints laid down by solution designers. In such a scenario, one could act as per the constraints laid down, but one cannot plan and design within the confines of higher level design in the existing solution environments. Example: What if the flexibility to plan and design a transaction is given to the transactional agent? The system level constraints laid down could be that the transactional agent has to make 10 deliveries in a day to any of the hundred houses in a colony. Within the degrees of freedom available, a transactional agent can use the same design system that the solution designer used to plan. One can plan to deliver to 'x' house in the first hour, to 'y' house in the second hour, so on and so forth. All planning or algorithms are about laying constraints that make sense. While there were million possibilities, the agent places some constraints based on some criterion and plans. Metaphorically, the current systems are comparable to evolution designing animals that can react to the environment based on the sensual information. But the animals cannot plan as they lack the prefrontal cortex that can perform high order cognitive functions. The introduction of transactional sub-classes is same as equipping an animal with a prefrontal cortex and making it human. Here is an animal that is now able to think and plan. Sub-transactional class is akin to this. It is that powerful and a great way of empowering people.

NSL is all about controlled differentiations. When an entity is added to an existing CES, that entity further differentiates the CES or ECES. Any deletion of entity or ignoring of value of an entity will result in things tending in the direction of generalization (undifferentiation). All solution designs are around optimal differentiations of classes through connection of classes in the form of CES or ECES. These classes go by different names but mean the same. Examples: Constraints, Rules, Limitations, Procedures, Algorithms, Hypotheses, Processes, Structures, Sets, Guidelines, Regulations, Laws, and Systems. These are all synonymous and mean the same. They shrink the possibilities by admitting certain members and rejecting others. Nature has no concept of entities or classes. In nature, all things operate by fundamental forces of nature and are continuous. Only in agent systems, introduction of entities in the form of classes and members happen. The entities operate by the excluded middle principles in order to beat the complexity of infinities. Evolution has created an entity based model for all living beings. Living beings tend towards entities that matter, through directed energy, for their survival. The artificially created 'machine agents' also follow the same entity based models. Agents anticipate through creation of classes and the arriving members fulfil the anticipation. As mentioned in the description, agents are equipped with an ability to match classes or members with respect to classes. The classes can be differentiated by creating many class level CES or ECES. There can be any number of sub-classes within those classes before the final descent happens at the 'transactional class'. Generally speaking, the empowered solution designers deal with differentiation of classes up to the transaction class levels. Thereafter, at the transaction time, agents performing given roles, operate within the constraints of classes and manage the transactions. If the solution has specified that a customer should be serviced on a given day, the role holder must adhere to that specification. But within those limitations, a role holder has a number of degrees of freedom. The role holder could choose to service the customer in the morning, afternoon, or in the evening. The minimum membership criterion here is a day. These degrees of freedom leave a lot of room for exercising plenty of choices. In reality, the way agents (as role holders) deal with this situation is that they do not chance upon transactional performance. They plan it, i.e., they create sub-transactional-classes within the bounds of transactional classes. Example: An agent is tasked with serving 10 customers on a given day. The agent may be free to serve those customers in any order so long as all the customers are serviced on that day. The agent starts planning activity, by creating sub-transactional-classes (STCs), in the mind. During the day, the agent executes those STCs, by making memberships with respect to those classes happen as planned. This is how people operate as human agents in the real world. Because the transactional agent is staying within the bounds of the transactional classes as designed by the solution designers, it shall create no conflicts with respect to the design. Transactional agents shall be systemically empowered to create these STCs as they please. If these STCs are pertaining to one-time activities, they would take the shape of to-do items. If they pertain to recurrent activities, cutting across timelines, they would be equivalent of habits, making one perform same activities time again the same way.

The Descent Towards Differentiations: As the descent happens from the solution class all the way down to the differentiated transactional class, members at each level are tagged to the class above. Example: World-USA-California. This preserves the requirement of systemically capturing the unbroken differentiation tree. Everything is informational irrespective of the substrate to which an entity may belong. So, acting upon information also includes an 'action in the physical substrate'. Example: Writing a letter in response to receiving a letter is acting upon information. So is, putting a paperweight on top of a fluttering paper is also acting upon information. The question that arises then is, 'when should an agent act upon information? The simple answer to this question is that an agent should act upon information when the effort consumed to generate new information is less than the benefits of new information. Example: If it is dark, and one wants to read, to get up and switch on the light is a worthwhile effort. The cost of consumed physical energy in the act of switching the light on is less than the benefit of reading a book. Following these principles, when there is more 'differentiated transactional class' information, it may make sense to attach a Nested SSA cycle to it and generate new worthwhile information—more often than not.

Figure 8:
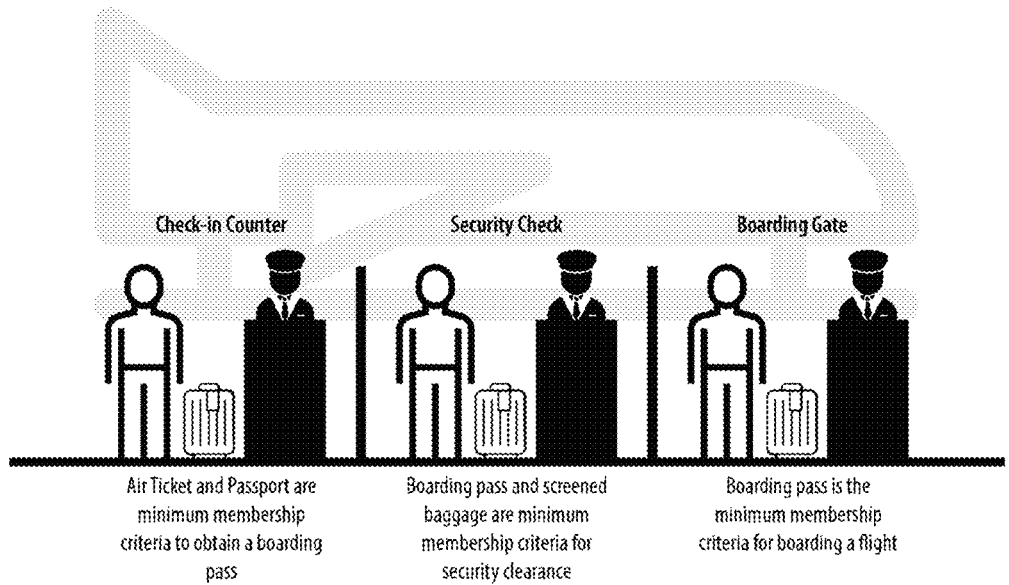
FIG. 8 represents an example of Minimum Membership Criterion.

Minimum Membership Criterion: The Minimum Membership Criterion deals with class level differentiations. Membership is defined in the form of constraints attached at the class level, which mandate the criteria for a member's arrival. While a member arrives with multiple layers of information, for admittance only the bare minimum relevant information is considered, while all other information is ignored. For example, when a passenger arrives at an airport terminal for travelling, at the check-in counter, his air ticket and passport are the minimum requirements for issuing him a boarding pass. At the security check level, the boarding pass and the screening of baggage are the minimum criteria for security clearance. Finally, for boarding the aircraft, the stamped boarding pass is the minimum criterion to board the plane. There are various things that can be checked, such as Driving License Id, employment ID, phone number. However, for the purpose of each stage of checking, only the Minimum Membership Criteria are checked, the other details are ignored. This example is represented in FIG. 8.

Figure 22:
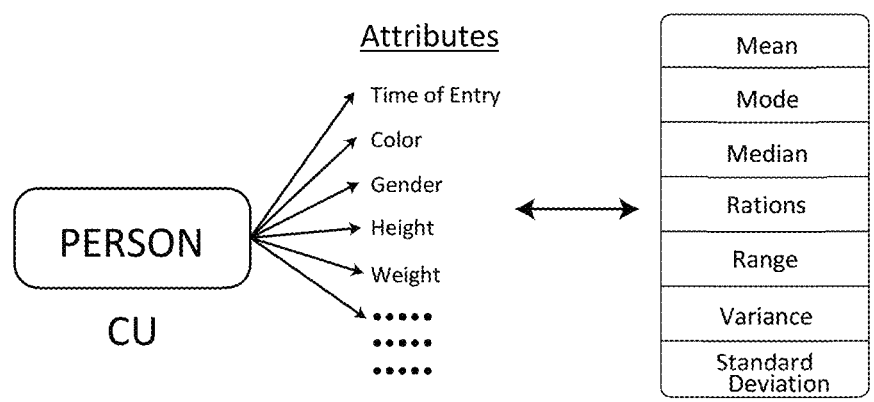
FIG. 22 represents an example of Variability.

Variability: When an entity enters a class as its member, it only fulfils minimum membership criterion. Example: If a person is member of a club, the person will be allowed to enter the club provided he/she carries the membership card. After fulfilling the minimum membership criterion, each qualifying member carries a lot more information. Example: A member carries with oneself the time of entry, one's gender, height, weight, colour, and tons of other information. As the transactional size increases, the quantum of information also increases which is called as data. Such data can be plotted and interpreted in many ways to discern meaningful information. Variability of data or information is assessed in many ways statistically. There are established ways of identifying the mean, median, mode, ratios, range, variance, standard deviation and the like. The usefulness of these in analytics and drawing inferences cannot be overstated. This example is represented in FIG. 22. NSL provides the ability to perform statistical analysis at all vantage points of BETs. In addition, it also takes full advantage of connectedness of all BETs through their nearest neighbours. On top of it, data visualization techniques can be better deployed using NSL.

Reserved Entities and Reserved CUs: Every solution created in NSL is curated and stored in a library called the Dynamic Solution Dictionary (DSD). Each such solution stored in DSD, along with the BETs contained in the solution, can be reused by any solution designer instead of re-creating or re-designing the same again. NSL minimizes the redundancy in building solution logic by providing the ability to use existing BETs at various vantage points. These reusable entities are called the Reserved Entities. If, the entire CU is reusable, it is called the Reserved CU.

Dynamic Solution Dictionary (DSD): DSD is the single central repository of all the solutions and solution components in NSL. Every conceivable solution shall rest in the DSD as contributed by different sources. Entities at all vantage points will exist in DSD—right from the lowest level of an attribute to the highest level of a book or a library. The DLD (solution generation) engine would be attached to this DSD so that any solutions that are not existing can be built in no time and contributed to DSD. DLD can even self-generate GSIs and enable them through LSIs during its idle time, constantly enriching DSD. This shall be based on a 'point system' based on the points assigned to effort and outcomes. This is somewhat akin to business functions that are led by principles of revenues, costs, and profits that are based on assigned values. In being able to self-generate GSIs, the nested SSA cycles would only be emulating how human agents think and operate. All solutions or their components can be visualized as available in the departmental store of NSL. The departmental store would be attached to machine agents driven assembly lines that would assemble any product that is not available in the store in no time. Note that entities can exist at all vantage points with their own unique IDs. Each entity at a different vantage point is like a snapshot taken from that vantage point existing in a binary state. The entities are string together through the concept of nearest neighbours. The DSD shall have a dynamic user interface from where the users engage with the world of solutions.

Substrates: Any self-contained system with its own set of properties and rules, containing sufficient number of member entities to establish equivalence with entities in other systems, is a substrate. The 'rules' referred above are synonymous with: (a) Constraints (b) Properties (c) CUs (d) Principles (e) Potentialities (f) Laws (g) Algorithms or any other synonymous names. Example: The physical substrate has its own qualities of being made up of atoms, operating in a three-dimensional world having mass associated with its entities. Likewise, English language is a substrate made up of alphabets of a particular kind. Just as entities can be expressed ones or implied ones, substrates also can be expressed in a solution ecosystem or be implied. All substrates and entities belong to 'physical reality' and are expressed in space and time without exception. Every entity must exist in some physical form and be embedded in space and time. As everything physical has a distinctiveness associated with it, it is also informational by definition. In modern physics, the boundaries between physical and informational aspects of reality have vanished. Entities move from one substrate to another across the solution. Implied substrates refer to the fact that NSL solutions are stored by default in one substrate or the other, even if is not explicitly stated. For example, a solution designer may create a solution on the NSL platform. The creation of a solution using the user interfaces is only possible when the data is stored physically in databases.

Substrates as 'Classes of Classes': Substrates are 'classes of classes.' Each of the substrates is a system containing large number of entities at solution class levels. Entities contained in a substrate are subservient to the properties of the substrate they belong to. That is, the constraints or rules pertaining to the substrate will apply to each of the entities in the substrate. Example: 'The rock' in the physical substrate would be heavy as dictated by the fundamental laws pertaining to nature's physical laws. The 'word rock' in the substrate of natural language will be governed the laws of natural language. which is same as natural language grammar. Just as humans have the ability to recognize many entities in the environment, they also have the ability to recognize multiple substrates.

Substrates and their properties: Substrates are mediums utilised to observe, record and communicate. There are multiple substrates which are available for Humans. Audio/Video/Image are some commonly known substrates. Each substrate will have its own set of constructs to equate the truth values of entities. There is some commonality in properties when it comes to substrates. For example, all statues made of Brass will possess similar properties. The Brass statues can represent any individual. However, the same individuals can be represented through their pictures or images. The properties of images will again have similarities. Each substrate has its own unique properties. A three-dimensional representation will be vastly different in terms of composition to that of a two-dimensional representation. Similarly, a written text on a piece of paper representing an entity will vary a lot from an image representing the same entity.

Substrate Tagging and Substrate Crossovers: Every entity can reside in multiple substrates. Every Entity is Physical and informational in nature. An Entity can have multiple representations and the representations can exist in multiple substrates. Each substrate and its constituent representations carry their own properties. For example, a statue of a person has its own set of properties. It may be heavy, made up of iron or brass, takes time to be moved from one location to the other and so on. Whereas an image of a person has much different properties. Its lighter, easily movable, consumes much less space, packs in much lesser information, has a two-dimensional form and so on. For Solutions to play out, one needs to define the determination in which form (substrate) or representation it matters. Sometimes a doctor is needed in person to perform a surgery. In some cases, a doctor can call and consult to provide a solution. The substrates also change when the representations change. It is therefore important that every entity and its representations along with the substrate in which it resides becomes important from a solution perspective. Electromagnetic form of representations moves at a much faster pace as compared to physical entities. The concept of substrate crossover and substrate tagging can potentially have a powerful impact in building the most efficient solutions. Dynamism imparted by NSL coupled with seamless substrate tagging and crossovers can truly change the solution landscape and usher in path breaking solutions for the new era.

Equivalence Principles: Equations in mathematics operate by the equivalence principle when $A=B=C=D$, they become interchangeable. Likewise, many substrates can have their equivalent entities in other substrates or within the same substrate. Example: 'Rama' in the physical substrate can have an equivalent entity in the language substrate—'word Rama', in the images substrate 'image Rama', in the perceptual substrate (in the brain) as set of 'molecular arrangements the are equated to Rama', in the same substrate as the 'statue of Rama', so on and so forth. NSL treats every entity in the world, including substrates as existing in the physical world. By the same token, it also treats every entity in the world, including its substrates also as informational, because everything distinct qualifies to be an entity. All entities in each substrate have to be by definition informational. That does not mean that all equivalent entities across substrates carry the same information. Information asymmetries exist between the same entities residing in different substrates except for the cloned entities. Example: When a letter is electronically copied to 100 people. All that the equivalence principle requires is the 'meeting of the minimum membership criterion (MMC)'. What MMC looks for is the minimum required information such that the membership criterion is met—any additional information is welcome, but not mandatory. By looking at an A in a substrate, if one is able to identify another entity in another substrate or in the same substrate as being the same, the requirement of equivalence is met. It may be the case that 'physical Rama' carries $10^{\wedge}50$ bits of information, 'word Rama' carries 32 bits of information, and the 'image Rama' carries $10^{\wedge}7$ bits of information. The information content between equated entities can be different. When crossovers happen across substrates, following the equivalence principle, it is incidental that the truth values have to be preserved. Example: The truth value is preserved when 'physical Rama' is equated with 'word Rama'. Truth value is not preserved when 'physical Rama' is equated with 'word Krishna'.

Representational Entities: In NSL, all things are contextual and relative in nature. Whatever entity that sits in the physical layer of a CU (as a CD) that is contextually relevant, becomes the 'real entity'. All other entities that have an 'equality relationship' with it will become representational entities. In other words, what is 'real or representational' is based on contextuality and is relative in nature. For the determination of what is a real entity or a representational entity, no substrate has primacy over the other. A change unit can have change drivers (CDs) from different substrates at the same time. Example: A Message can be one CD, a 'physical pen' can be another CD, and an 'image' can be yet another CD each belonging to different substrates, and yet sitting in the same CU.

Bundled Substrates: When there is a lot of affinity between substrates, they are bundled together. Example: In Information technology, the layers of abstraction are nothing but substrates in NSL terminology. Those substrates could be controlled by electromagnetic forces, the bits of information, the symbols, the databases, the logic and functional layer, the UI, and the like. They are bundled together as they have a symbiotic relationship. This bundled behaviour also applies to many other substrate groups. Example: The brain entertains many substrates in it, wherein a substrate that captures information, a substrate that stores information, a substrate that processes information, and the like.

Related Substrates: There can be many substrates within substrates that are related with small variations within. Example: If Hard assets is a category of substrate, there are 2 branches within it called the fixed assets and the inventory. These are substrates within the broad substrate of hard assets. Similarly, if Natural language is a substrate, there are 7000 natural languages in the world which are layers of it. Similarly, inanimate things in the world are related to the living beings as they both belong to the same physical world.

Hierarchical Substrates: There are instances where a substrate is defined more broadly or narrowly. One could define a substrate as 'hard asset' or one could descend down the vantage points of substrates and narrow it down to a 'fixed asset' substrate and a 'variable asset' substrate. Principles of differentiation that apply to independent entities through attributes, will also apply to more differentiated substrates also.

Figure 9:
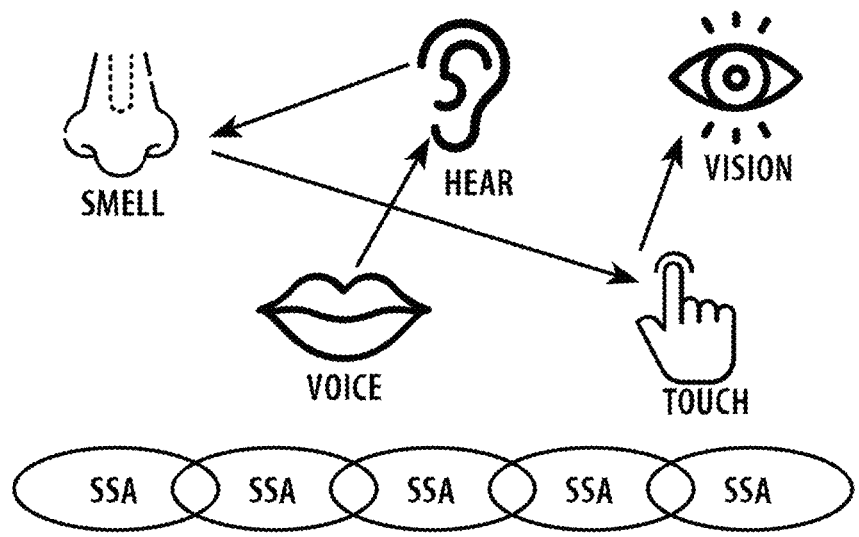
FIG. 9 represents an example of Principles of Physical Continuum.

Physical Continuum: The Principles of Physical Continuum deal with the basic premise that solutions are informational and that information has to be physically stored in one substrate or the other and that the SSA cycles play out continuously. The Principles of Physical Continuum maintain a continuous thread and exchange of information between substrates by preserving discrete states and truth values. The Principles of Physical Continuum deal with information being stored in different substrates while preserving truth values and discreteness without breaking the physical chain of continuity. Since there is continuous transition from a problem state to a transition state, each state is combinatorial in nature. A move from one state to another also has to be viewed as a transition from one combinatorial entity state to another combinatorial entity state. NSL has the ability to store the continuum of states. NSL has the model to capture all the states and connect the substrates, even if the entities are explicit or implicit. While the platform has the capability to store the minimal information important enough to capture the truth values, not all substrates carry the same amount of information. For example, a visually impaired person may sense more information through the ears, smell and touch. People often have varied ways to assimilate information. If a person is in a dark room, then vision may not serve the purpose. The SSA cycle is constantly turning and each SSA cycle is a change unit which is discrete. However, events happening in reality are captured by one substrate or the other. There is a constant substrate crossover which preserves truth value to communicate reality accurately. The flow of energy from the problem state to the solution state is continuous. Hence, the SSA cycles find their representational counterparts in any substrate and each of it is physically stored. The Principles of Physical Continuum deal with information being stored in different substrates, while preserving the truth value by having sufficient constructs to equate representations. This example is represented in FIG. 9.

Symbiotic Substrates: Whether it is human agents or machine agents, physical continuum that leads up to solutions cannot be accomplished in isolation. Seamless transitions or crossovers between substrates is a necessity to maintain the physical continuum and the progression towards a solution. Example: In case of IT, the physical continuum cannot be maintained in the absence, say, of the user interface a place where the inputs are presented to the bundled substrates and outputs are taken from the same.

Properties of Substrates: Entities belonging to specific substrates are influenced by the properties of those substrates. Example: A physical substrate is made up of atoms, the natural language is made up of 'alphabets', and the digital image is made up of pixels. Properties of entities in given substrates are also influenced by the manner in which those entities interact. Physical substrate entities are driven by fundamental forces of nature which is same as the constraints or rules as dictated by the Nature. For example, light travels at a constant speed in vacuum, no two physical bodies can occupy the same space and time, and the like are few constraints dictated by the Nature. Language substrate requires adherence to the grammar of that language (its constraints or rules). The perceptual substrate is dependent on the manner in which molecules in the brain can arrange themselves and act as representational entities. The activity in the brain is dictated by conditions under which neurons fire or not fire. Each of these 'constraints based' or rules based behaviour is dictated by the Sense, Select, and Act (SSA) cycles associated with them. These SSA cycles are discovered based on permitted transformational pathways in the respective substrates that are inherent to them. It is for one to identify the substrate rules and apply them, rather than inventing them. Such rich knowledge base already exists with respect to each of these substrates. As substrates are mental classifications of agents, there can be quite a large number of substrate classes. Just as entities, those substrates could be those that do not matter. Sometimes, they can also be those that are implied.

Labelling of Substrates: All entities are embedded in the reality coexisting with 'space and time'. This reality—the Nature—as agreed, does not classify things. In 'the nature' everything is continuous tending towards infinities. It is the agents that create discrete entities and classify to beat complexity. Agents have limited capacity with respect to sensing, selecting, and acting (performing SSA cycles). Therefore, of necessity, agents have to optimize entities that they deal with. Such classification, as explained previously, can be with respect to both substrates and the entities embedded in them. Since substrates and entities go hand in hand and are inseparable, it is as though they are constant companions and two sides of the same coin. Therefore, one way of dealing with them is to express every substrate as an attribute of an entity. An entity can be labelled for the substrate to which it belongs to. The substrate is also differentiated by the properties of the substrate that cuts across all entities in that substrate. Example: A physical substrate entities have mass or weight associated with them. Then it can be further differentiated by the properties that are specific to it in the context of the substrate to which it belongs. An entity in the physical substrate may be a solid or a liquid. Such labelling can be done in an automated way by the machine agents for the most part. The extent of automation will depend on the predictability or recurrence behind substrate attribute properties. Where automation is not possible, the solution designers or the users shall help in labelling the substrates accurately.

Substrates as Attributes: In NSL all things are relative i.e., relative to the direction, relative to what matters, relative to what the intent is. When anyone looks at things from the perspective of an entity, its substrate becomes its subset or attribute. If anyone looks at things from the perspective of a substrate, then its constituent entities become its attributes. This is same as oneself declaring to be an Indian—where India is an attribute. From the perspective of 'India' as a country, each one in India would be its constituents and thus becomes its subsets or attributes.

Dynamics behind Substrates: How the physical continuum across substrates is maintained can be gazed from the following illustration. This illustration is driven by the WWW principles and how agents pursue solutions in the real world and the technology world. One can observe that the chain of continuity is not broken while the march towards the solution happens. Solutions come into picture only in the context of 'agents'. The Nature just acts based on the four fundamental forces of the Nature and has no particular preferences. The Nature does not seek any solutions, but agents seek solutions. As agents seek solutions, the chain of continuity—physical continuum—is driven primarily by electromagnetic forces. While in some instance, gravity plays a role, the other two fundamental forces of the Nature—strong force and weak force—can be ignored as not being material from the perspective of solutions. Imagine a scenario where a human agent places an order for one bottle of water over the net to quench her thirst. It all begins with some chemical imbalance experienced in the 'substrate of the body' resulting in some kind of message arriving in the 'substrate of the brain' in the form of molecular rearrangements conveying a feeling of thirst. On the birth of such desire to drink water having taken place in the 'substrate of the brain', that desire or wish needs to be conveyed or relayed to the external world. In other words, the brain needs to act upon that information. The brain relies on the substrate of human nervous system that extends to the tongue. The muscular system in relation to the commands from the nervous system, based on equivalence principles, is activated. The movements of the tongue, generates vibrations in the substrate of molecules in the air, again preserving the equivalence principles. In doing so, the agent incidentally also relies on the substrate of language. Just to reinforce thoughts here, equivalence means that particular unique signals in the nervous system will have particular movements in the tongue that are equivalent. Particular movements of the tongue cause particular unique vibration in the air, so on and so forth. With the sounds produced through the substrate of air molecules, expression of the desire is done through the 'phone system substrate'. Based on the vibration of the air molecules, the diaphragm in the phone converts them into equivalent electromagnetic waves in the 'electromagnetic substrate'. Each type of electromagnetic wave caters to a particular representation. On the signal reaching the phone at the other end, the electromagnetic substrate transfers the signals to the substrate of air molecules at that place. The substrate of the operator's eardrum who picks up the phone at the other end will propagate the customer desire to the brain of the operator. Preserving the equivalence principles, the operator transfers information to the substrate of the nervous system, which transfers it to the substrate of the muscular system of the hand, which in turn enters the details into the computer at the level of the UI substrate which in turn transfers the information to the under-the-hood substrate of the computer. The under-the-hood substrate of the computer conveys the information to the substrate of communication network. The communication network passes on the information to the under-the-hood smart phone substrate of the delivery person which in turn places the information at the UI substrate of that smart phone. The electromagnetic waves radiating from that UI act as another substrate that carries the information to the substrate of the visual cortex of that delivery person. Through a series of substrate transfers such as the brain, the nervous system, the muscular system, the delivery person now acts upon information at the physical substrate level. As mentioned earlier, acting upon information at the physical substrate level is not different from acting upon information at the perceptual substrate level or language substrate level. The delivery agent picks up a bottle from the shelf, gets on to a bike moving through the physical substrate and arrives at the doorsteps of the customer. If the payment is through a credit card, there are again a series of substrate crossovers that take place within the bundled substrates of the computer and the payment is made. The customer picks up the bottle of water in the physical substrate and drinks the water. The water passes through the gastrointestinal substrate of the body which in turn is passed on to the substrate of the circulatory system of the body when absorbed through the intestinal linings. Now the chemical balance in the body is restored with respect to water, and that information is conveyed by the body to the substrate of the brain through some rearrangement of molecules taking place therein. Finally, the thirst is quenched. By no means, the involvement of the substrates in the above illustration is exhaustive. This illustration is meant to drive home the point that every solution requires a large number of crossovers between many substrates preserving equivalence principles. It also drives home the point that a substrate is a class conceptualized by agents, just as entities within them. One may take many entities in any solution design as implied, only those entities that are worthy of being taken note of are specified. In order to write a letter, one may specify a pen, a paper, a person, and an intent and may take the table, the chair, the enabling environment such as the comfort of a room as a given. The same principles apply in case of substrates also. One would only mention only those substrates that are worthy of mention, and other things are taken as a given. Example: One may recognize the substrates of the body and the brain and ignore many of their sub-substrates.

Substrates Library: All things are informational from NSL perspective, irrespective of the substrates they belong to. An entity can exist in many substrates simultaneously. The equivalence principles and truth values should however be preserved. There will be information asymmetry with varying quantities of information in each substrate. Existence of 'minimum qualifying info' is sufficient to establish 'equality of entities' sitting in different substrates. Example: By looking at the 'word pen' one can establish its equality with the 'physical pen'. Though the quantum of information in the 'physical pen' is significantly higher (as it houses tremendous amount of discrete/distinct states), few bits of info in the 'word pen' is sufficient to establish its equivalence. It has met the 'minimum qualifying info' criterion. All substrates are mental constructs of agents. They are classes of classes. Example: A pen by itself is a class and it could be sitting in the physical substrate. It so happens that the 'physical substrate' is also a class. When the 'pen class' sits in the substrate of 'physical substrate', NSL encounters a situation of a 'class within a class'. This example is represented in FIG. 37. Everything in information technology is ultimately dealt at a representational level of a language. The additional information in the physical substrate is captured by expressing that additional information in the form of attribute values hanging to the 'class of physical substrate' expressed in language terms. Also notice that the superset of all substrates is the 'physical substrate' as nothing can fall outside of space and time in which this substrate resides. The physical substrate is a superset because the information in it is maximal as all distinctive states have to be captured in it. NSL has a substrates library that focuses on i. Physical Substrate ii. Lifeforms Substrate iii. Language Substrate iv. Images Substrate v. Metaphors/Proverbs/Idioms Substrate. FIG. 38 represents the five identified substrates in the substrate library. The substrate library deals with the following:

1. First establishes all the additional information with respect to every entity by way of structured attributes.
2. Establishes a process for subjecting those entities to the constraints pertaining to respective substrate.
3. Further establishes constraints with respect to the interactions those entities can possibly have with other entities individually or in combinations.
4. Feed into the predictions that can be made and inferences that can be drawn.
5. Make the machine agents draw inferences same as or better than human agents.

Substrates and Differentiations: It is a given that each substrate has its own properties. It is also a given that each entity in a substrate carries the label of the substrate as its attribute. It is also established that different substrates carry different quantum of information for an entity across substrates. Information that could be acted upon could be different for different substrates. An elephant in the physical substrate has huge amount of intrinsic information (if one counts all the cells and functions) associated with it (say, $10^{40}$ bits). The accessible information (by way of its image) could be, say $10^{7}$ bits. Even then, it is significantly more than the information in the substrate of language where it is only 8 bytes—with 8 letters in the word 'elephant'. Humans take advantage of this additional information available to them due to information asymmetries between substrates. In order to act upon that additional information, they have to rely on SSA cycles that the properties of respective substrates provide.

Levels of Substrate SSA Cycle functions: It is a given that different substrate entities carry different amounts of information. The equivalence principles are still preserved irrespective of information asymmetries between entities in different substrates. It is also a given that different substrates carry different properties and rules that their constituent members follow. Example: To reiterate, physical substrate is bound by the fundamental forces of Nature; Language substrates are bound by their grammar. Each entity, irrespective of the substrate to which it belongs, is an information entity. A 'paper weight' is an information entity and the 'word pen' is also information entity. Existence and behaviour of the 'paper weight' as an informational entity is bound by the laws of the physical substrate. Existence and behaviour of the 'word pen', which is also an informational entity, is bound by the laws as laid down by natural language grammar. To act upon information means changing information through 'directed energy'. Such controlled energy is through the application of SSA cycles. Sense (S), Select (S), and Act (A) cycle require application of controlled energy. Irrespective of the substrate to which information belongs, acting upon information will invariably involve application of controlled energy by the agents. To move a paper weight on the table is acting upon information. To write a word, next to another word, is also about acting upon information. The SSA cycles lay down the constraints, the transformational pathways, the rules, the principles, the laws or any other synonymous names through which one may refer them. The sum and substance of things is that information in any substrate can be acted upon and that the entities will first be subservient to the constraints of the substrates to which they belong to and thereafter to the NSL solution framework limitations. Example: If the paperweight is pushed beyond the table, it will fall down as per the physical substrate principles. Similarly, the 'word pen' will be recognized as a noun in English language and dealt accordingly. SSA cycles with respect to the substrates can exist at the following levels:

a. At the attribute levels: Every entity is labelled for the substrates to which it belongs as its attribute. That substrate attribute will get further differentiated for the properties that are particular to it. Typically, an entity may inherit some qualities that are universal to that substrate. Example: All the entities in the 'physical substrate' will possess mass. But there may be some entities that possess some differentiating attributes as compared to others. Example: Some entities in the physical substrate are solids and other liquids or some may be made up of metallic atoms and others non-metallic atoms. The differentiating substrate attribute tree of an entity can be of any length as the situation may warrant. This is similar to 'data types' in the technology world. An SSA cycle can be attached to such differentiating attribute tree to act upon the information therein. A 'Rock' may have attribute differentiations such that anything smaller than a certain size will not be a rock, but a pebble anything larger than a certain size would not be a rock but a boulder! The membership criteria of an entity as also determined by its substrate attributes will consider anything outside of it as improper or illogical. If one of the agents points to a pebble and says that it is a rock, the machine agent in this case will conclude that it is an improper classification and will correct the other agent by saying that it is an improper classification. This classification is done by the machine agent using supervised algorithms.

b. At the CES levels: Entities come together in a CU before they start interacting to cause something. Substrate properties may allow some entities to coexist and may not allow some others to coexist. Example: A certain size room where the dynamics of solutions playout will or will not permit certain entities to coexist. A large machine may not fit into that room, while a computer can be in that room. These constraints can be specified at attribute levels of given CES substrates so that the right kind of inferences can be drawn by the machine agents. The inferences are inferred by the machine agents using Artificial intelligence techniques.

c. At the Trigger CES Levels: Yet another set of constraints or application of SSA cycles would be around permitted interactions and not-permitted interactions. In a physical substrate, it is impermissible or possible for a person to walk through a wall or to walk on water. Such constraints can also be specified at the 'trigger CES' levels. It may be noted that many constraints will playout at higher vantage points itself before the constraints are explored at the more differentiated attribute levels. Example: No solid can pass through another. The matter is settled at the higher vantage point itself, without consuming too much computing power at the lower levels of differentiation.

d. At the Extended CES Levels: Similarly, there are SSA cycles attached at the cause and effect levels. This is same as drivers of change drivers (DCDs). Example: One can aim and shoot: not the other way round.

Substrates in The Information Layer: Entities can sit either in the physical layer or information layer. Physical layer entities are called change drivers (CDs) and information layer entities are called Information Drivers (IDs). Whatever appears in the physical layer can also appear in the information layer. The substrate labelling principles will also hold good even for entities in the information layer. The only difference between the two layers is that only entities in the physical layer influence the trigger function—information layer entities do not. The owner of the CU also has access to information both in the physical layer and information layer. A few examples of the frequently occurring substrates in information layer are as follows: Structured Text, Unstructured Text, Images, Tables, Messages, Measures etc.

Empowering Machines like No Other: The complexities of NP-Complexity problem (non-deterministic polynomial) hit machines so hard, that even super computers are unable to solve certain problems which are easy to identify but not that easy to solve. NSL unlocks the true potential of machines by empowering them with sensing and actuator capabilities and attaching the layers of the Analytical Engine and Inference Engine. SSA cycles exist in the agents' system. NSL provides for any number of vertical or horizontal SSA structures. This distribution of SSAs helps simplify inferencing and analytical capabilities—not only for humans but also for machines. Generally speaking, Machines may be equipped with superior storage and compute capabilities than humans. The addition of the Inference Engine and Analytical Engine helps to unleash the machines' true potential by replicating human behaviour or, in some cases, exceeding human intelligence by their ability to process large amounts of data, make quick decisions and act without the help of a human. NSL constructs could lead to machines replacing many human functions and potentially taking over the world.

Functional Asymmetry: Functional asymmetry refers to sufficient SSA cycles not being available for machine agents. Information asymmetry refers to sufficient information not being available for the machine agent. Humans can read the lines and read in between the lines. Read in between the lines refers to contextual information which humans can relate to. Along similar lines, there are cases of asymmetries even in Human understanding. A Nuclear scientist may be better placed than a policeman to understand Nuclear Physics. A view taken by an experienced detective on a crime scene may be far better than a view taken by a Chemist who may not relate to the subject that well. NSL embarks on a mission to disband asymmetries to empower machines like never before. This asymmetry is systematically eliminated by introducing the Inference Engine and the Analytical Engine. Machines may only read the lines but may not have the capacity to read between the lines as much as what a general human can do. NSL provides the unique potential to empower the machine. Machines are far superior in comparison to humans, when it comes to information storage, information retrieval, processing a large quantum of data and response times. Machines can tilt the scale of inference in their favour if the informational and functional asymmetries are bridged between humans and machines. Machines should be provided purpose and anticipation just as humans. They should have a third eye to read between the lines, have a sense of purpose to play out the SSA cycles. They should be provided the concept of anticipation and planning, as well as a lot of contextual information.

Information Asymmetry: NSL benefits from 400 hundred years of science. It reinterprets the 'way world works' (WWW) in the background of 'technology solutions'. While it has not discovered anything new about the 'way world works', it has invented a way of dealing with technology solutions. One of the most significant conclusions drawn by NSL is that everything in the world is physical, embedded in time and space. At the same time, everything in the world is informational, making the differences between physical and informational only notional. Going a step further, it treats both time and space also as entities—making those also informational. All entities in the world undergo continuous change as driven by energy. Agents capture in the solution ecosystem only those static and dynamic entities that matter for them. Agents (both human and machine) control the entities and their behaviour through directed energy that they provide. An implication of this is that all 'directed actions' are same as' acting upon information in a directed way'. In this world that consists of many substrates and entities embedded in them, there exists a reality where one entity may have its counter parts carrying reciprocal information. Reciprocal information is one where one could look at one entity and deduce information about some other entity. NSL calls these entities representational entities. These representational entities can reside in the same substrate or across different substrates. Example: A person and his statue are sitting in the same physical substrate and could represent each other. It is more often the case that representational entities are sitting in different substrates. Physical Rama could be sitting in the physical substrate, the word Rama could be sitting in the language substrate, and the image Rama could be sitting in the substrate of images representing each other. The crossovers from one entity representation to another in a different substrate can happen respecting the equivalence principles as established by truth values. It is these equivalence principles that preserve maintenance of physical continuum being maintained from the 'start CES' to the 'end CES (GSI)' respecting the physical laws. If entities can possess reciprocal information, and thus acquire the quality of being able to represent some other entity, what qualifies to be called a real entity among these representational entities? The answer to this is simple and straight forward—it is relative to the desires of the stakeholders (GSIs) and the choices made by the solution designers. Information asymmetries exist between human agents and machine agents. When reading a sentence, human agents read between the lines and thus come to possess a lot more information than the machine agents. Example: In a sentence, 'Elephant is walking in the wood', a human agent is generating lot more information than the machine agent. The human is imagining the size of the elephant, the nature of the wood and the landscape in his own way. Similarly, there is information asymmetry between the human agents as well. Example: When two friends see the third common friend, they draw the same conclusions about the friend. But at a more differentiated levels their views about that friend would be quite different. This kind of asymmetry between human agents can be called the 'between the ears asymmetry'. It is these very principles that apply with respect to information differences at the level of 'vertical CU differentiations.'

Figures 10, 11:
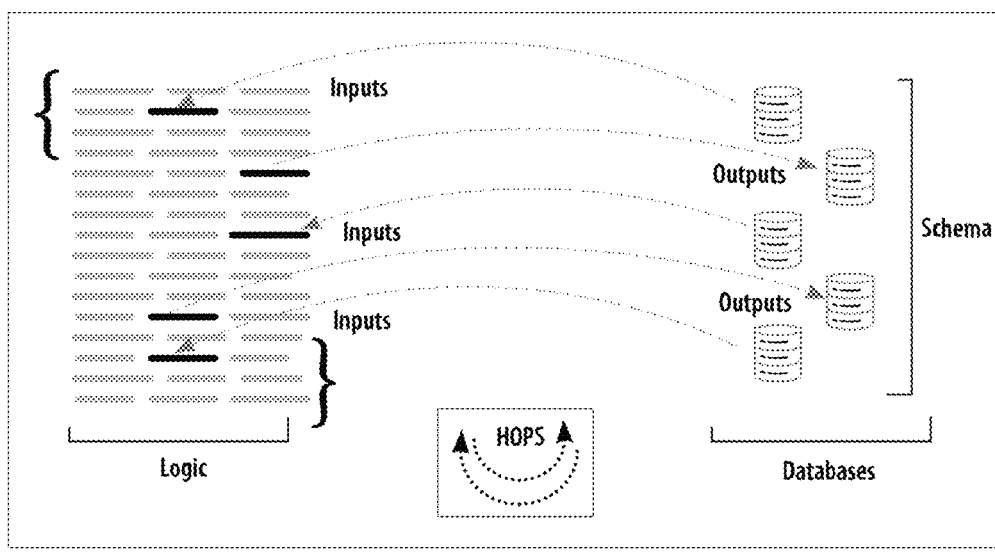
FIG. 10 represents an example of Dynamic switch between potentiality and reality.
FIG. 11 represents an example of Server Function.

Dynamic User Interface: NSL provides for a platform to develop solutions using natural languages. NSL makes the development of any solutions using natural language and mathematical constructs possible and it is agnostic to any of the thousands of natural languages being used. NSL makes the solution logic transparent. In line with the vision of democratizing solutions, NSL has developed dynamic user interfaces (CDUI), which move away from the old paradigm graphical user interfaces to interfaces that house dynamic text. Every solution presents itself as sentences and paragraphs. FIG. 10 represents an example of Dynamic switch between potentiality and reality. Further, User interfaces shall be self-configurable, driven contextually and dynamically. Dynamism and contextuality go together. Dynamic Solution Dictionary (DSD) adjusts itself dynamically to provide a distributed and secure access to solution 'BETS' individually to its stakeholders (human agents). Access privileges are governed by Information and Decision Rights (IRDRs) possessed by each of the stakeholders.

Figure 12:
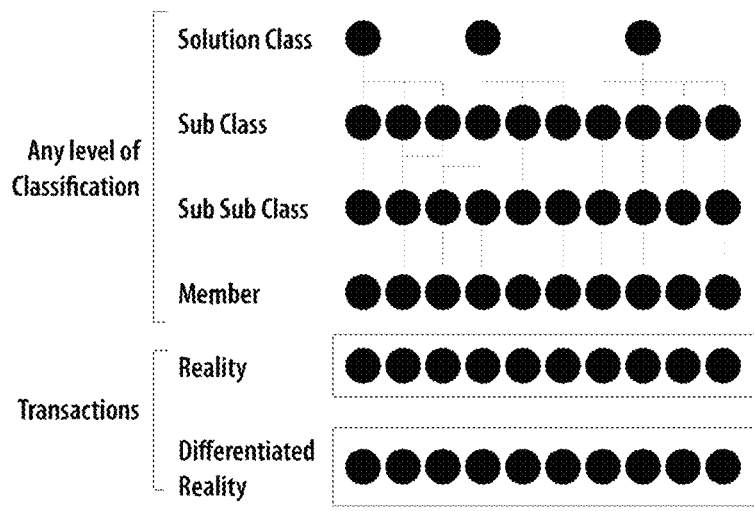
FIG. 12 represents an example of Search through Solutions and Transactions.
Figure 13:
FIG. 13 represents an example of both transactions and logic are searchable in NSL.

Server Function vs Search Function: NSL solutions are transparent. The solution logic is over the hood. Availability of Solutions in the informational form allows platform users to search for solutions, solution components as well as transactions. The server function is represented in FIG. 11. NSL views both the solution class and transaction class as two different tiered classes as represented in FIG. 12. Transactions are looked at as event arrivals in solution classes. All the solutions including the logic are seen as a string of connected classes, which allow eligible members to arrive in the form of events. NSL, therefore, needs very little processing capability and relies more on search principles. In NSL, both transactions and logic are searchable as represented in FIG. 13. The server function is a lot slower than search. The server function is like a hop function. The data is pieced together through hops from database to logic. The server function is like referring to another book, retrieving the data and coming back into the mainstream logic, and then again being redirected to another book to refer to some other information. The server function works as per the database schema, as pieced together by logic which resides in the programming code. This explains why the old paradigm needs so many skillsets. Logic is written by a developer. The database schema is pieced together by a database expert. User interfaces are put together by a UI expert. Customer requirements are understood by a business analyst. However, a large gap in knowledge is created due to Chinese whispers. Schema can sometimes be very complex. Data can be spread across so many tables that the naked eye may not be able to easily put together the solution logic by just looking at the schema. NSL is based on search principles. NSL does not treat the solution logic any differently than the transactional logic. NSL only deals with differentiations. Differentiations in solution classes lead to further differentiations in transactions. Transactions hinge on to the solution classes.

Figure 14:
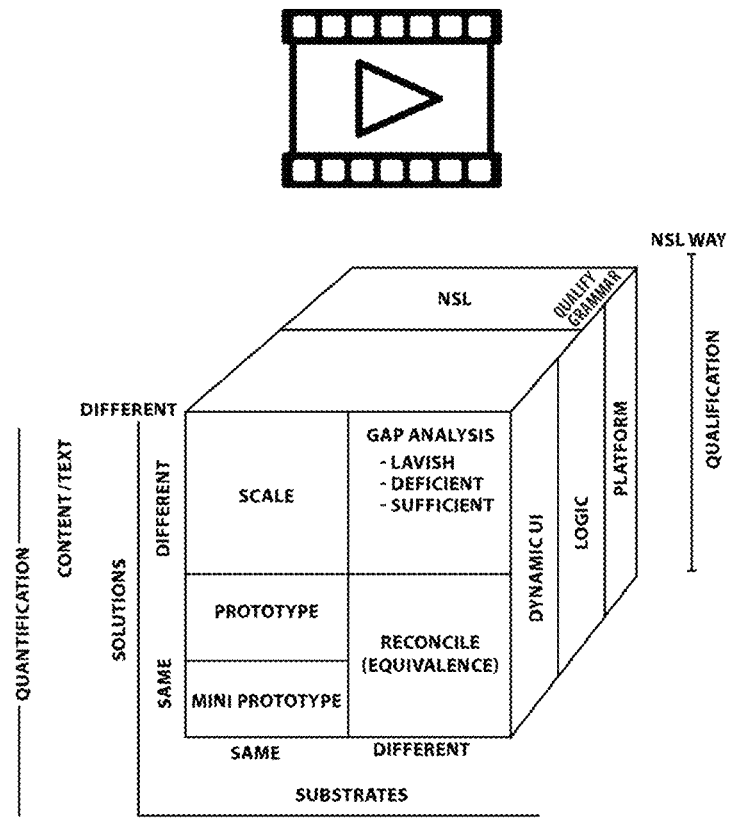
FIG. 14 represents an example of Solution Lavish Environment.

Solution Mining: Solutions exist in many substrates. Programming language, videos, Standard Operating Procedures, flowcharts, images, audio files are some of the substrates which house solutions. Solution mining refers to translation services. Solution mining helps extract information from all the substrates and translates the same to Natural Solution Language. There are three types of environments for solution mining:

a. Solution Sufficient Environment: Solution sufficient refers to substrates which have the grammar or constructs available to map each component, while preserving discreteness and truth values.
  b. Solution Deficient Environment: Solution deficient substrates do not have the complete information required for the solution logic. Solution substrates like business process modelling notations (BPMN) do not have all the information at the granular level to help explain or piece together logic. There is an absence of granularity and detail.
  c. Solution Lavish Environment: Solution lavish substrates have excessive information, more than what is needed to help establish the logic. Videos as a substrate contain a lot of information in each frame. Information extracted through each frame of video gives rise to a lot of redundant information. Hence, extraction of solutions from videos calls for the removal of redundant information and identifying information that is important from a solution perspective. While so, there can be room for improved solutions, as learnt from multiple transactional information. This concept is represented in FIG. 14.

Machine Learning with NSL: NSL structures are very well suited to align seamlessly to the old paradigm's new technologies like Machine Learning and Artificial Intelligence. Machine learning employs vector spaces. A vector space (also called a linear space) is a collection of objects called vectors, which may be added together and multiplied ("scaled") by numbers, called scalars. In NSL, the vector space is equated to entities that matter. Just as objects in the real world are equated with combinations, Machine Learning uses vector spaces to define objects. NSL constructs have more depth and flexibility for classification of entities as they are based on natural languages and engage sensory experiences which go way beyond what machines can sense at the current juncture. Just as objects in real world are equated to combinations, Machine learning uses vector spaces to define objects. NSL constructs have more depth and flexibility for classification of entities as it is based on natural languages and engages sensory experiences which go way beyond what machines can sense at the current juncture.

Inferences in Artificial Intelligence: Artificial intelligence has hit a roadblock in drawing inferences just like humans would. Various approaches have been taken in order to solidify research around building human-like inferencing techniques in machines. In Artificial Intelligence, inference rules are applied to derive conclusion that leads to the desired goal. The inference rules comprise Modus Ponens rule, Modus Tollens rule, Hypothetical Syllogism, Disjunctive Syllogism rule, Addition rule, Simplification rule, Resolution rule etc. NSL has the best structures available to mimic human behaviour and inference capabilities in machines. The nested SSA cycles, along with sensing and actuator capabilities, give machines an edge in learning and drawing actions. NSL gives the freedom to attach constraints at a class level to allow potential classes as well as potential members. There are 5 levels of constraints that NSL structures have, which give the system a definitive edge over traditional system. Humans have used natural languages for thousands of years, understood change as value creation due to directed and controlled differentiation and used mathematics extensively as a means of solving day-to-day problems. The constraints of physics, agent systems, grammar of natural language and constraints of mathematics help build almost human like behaviours in machines. NSL has natural structures which are conducive for Artificial General Intelligence Towards Superior Machine Aided Solutions: NSL removes barriers between man and machine. NSL structures allow machines to make informed predictions, suggest smarter actions and take accurate decisions. Machines can recognize patterns. As compared to human agents, machines can work more efficiently, process information more quickly, and store vast amounts of information without forgetting or losing information. Developer Less Development is now possible because NSL structures allow machines to view information in the same way that living beings do. As NSL converts all solutions to informational form, it can be fed into machines easily. Arming the machine with superior training enables the evolution of artificial general intelligence and, consequently, more accurate predictions, decisions and action.

Developer Less Development: Most of the solutions in the programming world are dealt at equivalent of Basic CU (including their Embedded CUs) levels. NSL's central dogma reduces all solutions to 'entities and their relationships' in the context of 'agents and their purposes (wishes)'. Relationships are either static (CES) or dynamic (ECES). NSL treats ECES as a special class of information, thereby eliminating the need for a 'process'. Every agent is an entity (with some special properties) and every purpose is a chosen CES by an agent. A TES' or 'ECES' are about relationships of entities. When entities combine, each combination is a result of loosely coupled, but a unitary entity qualifying to be called an entity by itself. Thus, all entities, including their most complex combinatorial forms also exist only in binary states. This means that the vantage points can change, but their fundamental nature of being binary entities would not change. Entities at all vantage points are connected or related to each other through their nearest neighbours. Example: If Tom's friend lives 5 houses away, then Tom can go there without crossing the other four houses. Entity relationships are nothing but contextual-coming-together-of-entities with respect to solutions. A solution is nothing but a fulfilment of a wish, which in turn is a 'chosen CES'. DLD contextually connects all entities to the chosen CES (GSI) automatically. This automated selection of potentiality entities in the context of GSI (Global Statement of Intent) follows a structured three stage process:
   a. Contextual Selection of LSIs (Local Statements of Intent)
   b. Contextual Selection of CDs (Change Drivers)
   c. Contextual Selection of DCDs (Drivers of Change Drivers).

DLD has the ability to do contextual search and identify the right kind of contextual entities that meet the objectives set by a GSI. In the process, DLD stiches together all the contextual entities. DLD uses machine learning techniques to make the automated process of building a solution most efficient. NSL Framework lays the foundation for this to be dealt with utmost efficiently. The DLD engine uses NLP, ANN, Nearest neighbours' techniques/components for processing the solution content. The NLP technique includes named entity recognition, word disambiguation, entity synonymization components. The ANN technique includes probabilistic models, sentence encoder, Deep learning components. The DLD engine uses the Probabilistic models for the various permutations and combinations to make predictions.

Figure 15:
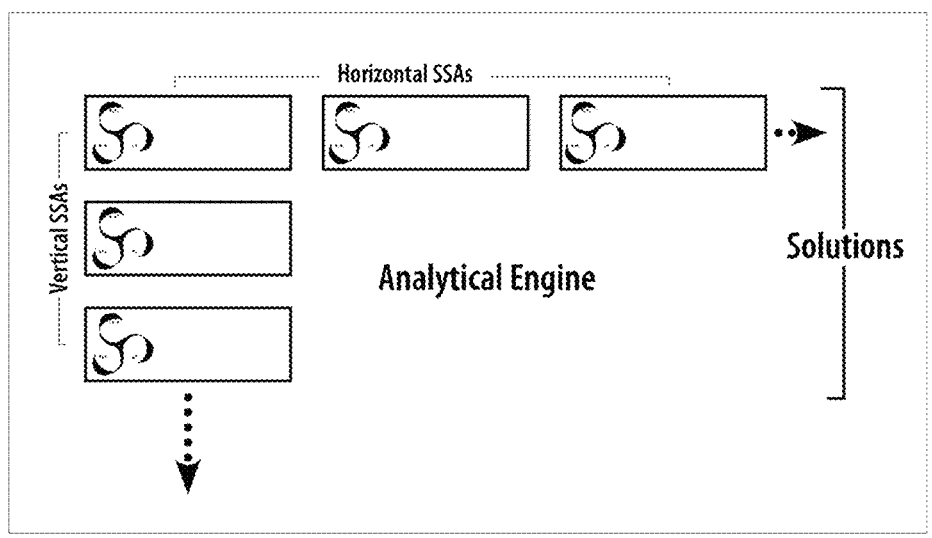
FIG. 15 represents an example of Analytical Engine.

Analytical Engine and Robotic Process Automation: There can be any number of levels of Nested SSA Cycles added to a Basic CU. The only requirement is that there is additional differentiated information worthy of being acted upon. Even partial information available at the higher level can also be acted upon. Example: If Rama brought vegetables, the Nested SSA Cycle can place the 'vegetables' in the physical layer and cook. Rama can be placed in the information layer of that Nested SSA cycle as 'residual information'. If the outcomes of Nested SSA cycles are fed to respective CUs in the ecosystem in the form of analysis and insights at the information layer level, then it is equivalent of powering the solutions with the analytical engine. Alternatively, if the outcomes of Nested SSA cycles are powering CUs owned by machine agents at the physical layer, then it would relate to Robotic Process Automation (RPA). If there are no actuators involved at the physical layer, RPA would be of the software bots' kind—influencing things in the 'computer substrates'. If there are associated actuators, depending on their sophistication, RPA could extend to influencing thing in the 'physical substrates'. The Analytical Engine processes data using descriptive statistics and/or inferential statistics techniques. The Analytical engine performs descriptive, diagnostic, predictive and/or prescriptive analytics on the data (Big data) by using Artificial Intelligence techniques, Machine learning techniques, Natural Language Processing techniques, Deep Learning techniques and the known techniques. FIG. 15 represents an example of Analytical Engine. Further, NSL provides a very powerful analytical engine. This is enabled by the fact that entities and CUs can be made as granular as possible to process information at the very source. The eCUs and nCUs provide for even greater granularity to consume information and generate unprecedented insights. The differences between analytical engine functions and RPA are quite marginal in NSL. The Analytical engine generates insights for self-consumption or propagation across the solution ecosystem as needed. RPA is just one additional step away. The insights which are placed in the 'physical layer' to be acted upon. Such actions are driven by machine agents to minimize human effort and enhance the quality of solutions.

Figure 26:
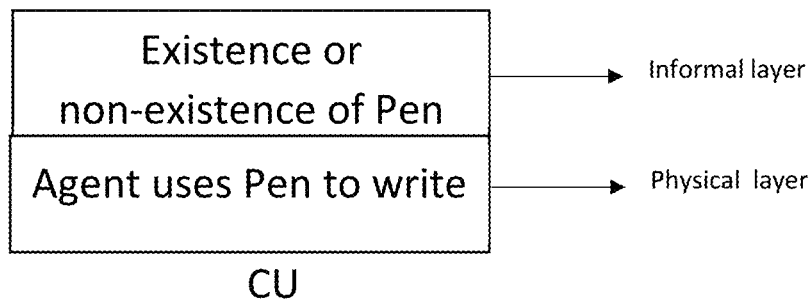
FIG. 26 represents an example of Information rights and Decision rights.

Information rights and Decision rights: Information rights, as the name indicates, provide access to information about the entity in question. Example: An agent has access to knowing 'existence or non-existence of a pen'. Where there are only information rights for an entity, those entities sit in the information layer of the CU owned by a given agent. In case of decision right, an agent is empowered to influence the entity. Example: In case of the 'pen', an agent is empowered to use it to write or do what the solution design provides for. These entities sit in the physical layer of the CU owned by a given agent. The examples of Information right and Decision right herein above mentioned are represented in FIG. 26.

Figure 27A:
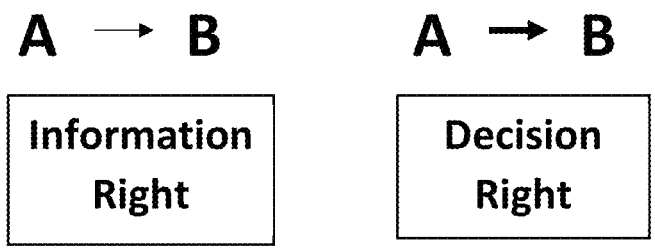
FIG. 27a represents an example of One Way Arrow of Information right and Decision right.
Figure 27B:
FIG. 27b represents an example of Two Way Arrows of Information right and Decision right.

Relationships between agents can be specified visually through arrows: Information right and decision right arrows can be differentiated by thin and thick arrows. A) One Way Arrow: If an arrow is shown as emanating from 'A' with the tip of the arrow pointing towards 'B', it is a one way arrow. What this means is that whatever information rights and decision rights 'B' has, those rights are also passed on to 'A' but not the other way round. To have decision right over 'B' means that 'A' has the power to compel 'B' to do whatever is in the power of 'B' to do on his own. Example: If it is in the power of B to place a paper weight at one corner of the table, 'A' can compel B to place the paper weight at the corner of the table. The One Way Arrow of Information right and Decision right example is represented in FIG. 27a. B) Two Way Arrows: In this case, the arrows connecting the A and B have pointers at both ends. What this would mean is that A has all the information of B and also has the ability to compel B to do a given thing (in case of decision right) and vice versa. The Two Way Arrow of Information right and Decision right example is represented in FIG. 27b.

Figure 25:
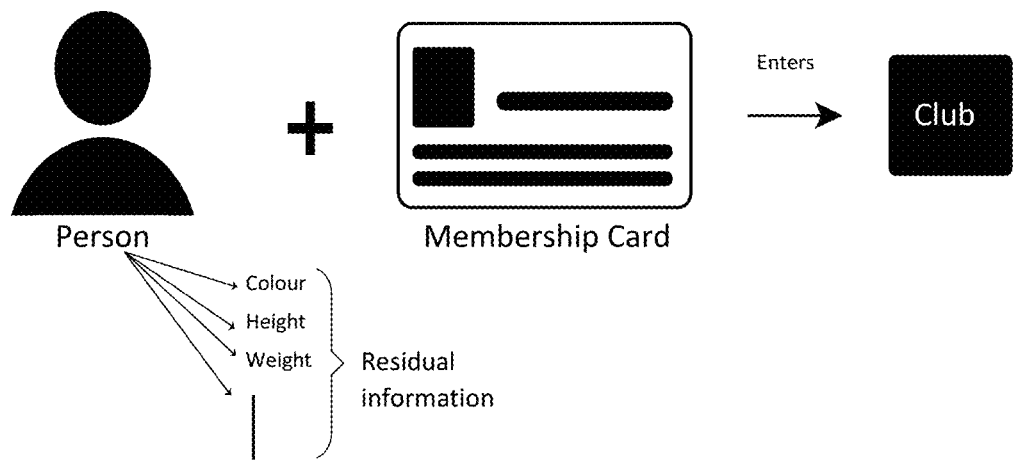
FIG. 25 represents an example of Residual information in NSL.

Controlled Changes: In NSL all change happens in change units (CUs). All CUs deal with controlled changes. Change is in the form of events that come into the CUs and go out of the CUs in the form of events it causes. The change is always in the form of entities switching between potentiality and reality states. It is also the case that the reality states many times carry residual information (information that goes well and beyond that which fulfils the minimum membership criterion). Example: If a person is a club member, he/she could enter if he/she carries a membership card. But each time he/she enters, he/she will carry into the club much more than the information pertaining to the membership card. He/she carries his/her height, his/her colour, his/her weight, so on and so forth with him/her as well. This additional information is known as residual information in NSL. This example is represented in FIG. 25.

It is also worthy of note that change, information consumption and generation, inputs and outputs, changing entity states are all synonymous in nature: Because information is anything that is 'distinct and discrete'. Anything distinct and discrete is an entity. Energy alters the states of entities. This is same as cause and effect principles that everyone is familiar with. In an agent world, a solution ecosystem captures and only deals with entities that matter in the context of solutions. In technology parlance, these are usually called the inputs and outputs. 'Controlled changes' referred to above imply presence of a Controller; that Controller is an Agent: That agent could be a machine agent or a human agent. The conclusion is that all change units are driven by agents and at least one agent is present in a change unit to drive the controlled change.

Change Units carry entities that matter: Those entities that belong to the change units are accessible to the agent(s) that owns them and controllable by the agent(s) that owns them. Such access and control of the entities is specified by way of information and decision rights. These rights are carried as 'attribute values' by both the agents and the entities concerned.

Relationships between Agents can also be specified through IRDR: It is a given that agents own entities and entities are owned by agents. But in the ecosystem of a solution there are many agents playing different roles. The relationships between such role holders can also be specified through IRDR. If an agent has decision right over another agent or an entity, it is implied that one has information right also as it is not possible to exercise a decision right without having the information right. But there are plenty of instances where an agent would have an information right without having a decision right over an agent or entity.

A CU is a local network of nodes of potentiality and reality: A reality is a qualified member of potentiality (or so to say, a class). IRDRs apply equally to potentiality and reality entities: Fundamentally, the principles of IRDR are the same irrespective of the entities belong to potentiality states or reality states. Potentiality or class entities are dealt by the solution designers: Those who possess the solution design rights can exercise those rights. As discussed, all solutions are about differentiated classes. Class level differentiations happen through construction of class level CES and ECES.

Potentiality or class level differentiation happen both horizontally and vertically: A) Horizontal differentiations happen when potentiality entities combine into potentiality CES or ECES. B) Vertical differentiations happen when potentiality entities are further differentiated through many levels. This vertical differentiation is achieved through a descent from a class to a sub-class, to a sub-sub-class, so on and so forth till such time the descent touches the transactional class. It is at the transactional class that the transactional events take place (operations). In the constructs, NSL is also providing for further descent from the 'transactional class' to 'sub-transactional' classes. These sub-transactional classes can be created by the transactional owners. From the point of view of a class, the sub-class is its member. From the point of view of the sub-class, the sub-sub-class is its member. This descent can continue till the final transaction reality happens (operations happen). Whether it is potentialities (classes) or reality (members), all entities are informational. They follow the nearest neighbour concepts whether the differentiation is vertical or horizontal in nature.

The continuum of IRDR cannot be broken and IRDR is agnostic to whether an entity is a potentiality one or a reality one: The principles of IRDR are the same. There should always be a specification of IRDR with respect to every entity. They adhere to the same nearest neighbour principles. A class/potentiality and a member/reality relationship cannot be broken and be treated on a different footing.

Classes and transactions are an unbroken chain of interconnected entities and relationships: They have to be treated on the same footing. The fundamental NSL framework provides for three-dimensional network of nodes: All degrees of freedom are available for the solution designer to provide for IRDR. In other words, Hierarchical structures arise out of specific choices, not out of necessity. If the IRDRs are one-way arrows, hierarchical structures are likely to emerge. But all kinds of three-dimensional networked structures and information flows are available for use as needed.

Figure 28:
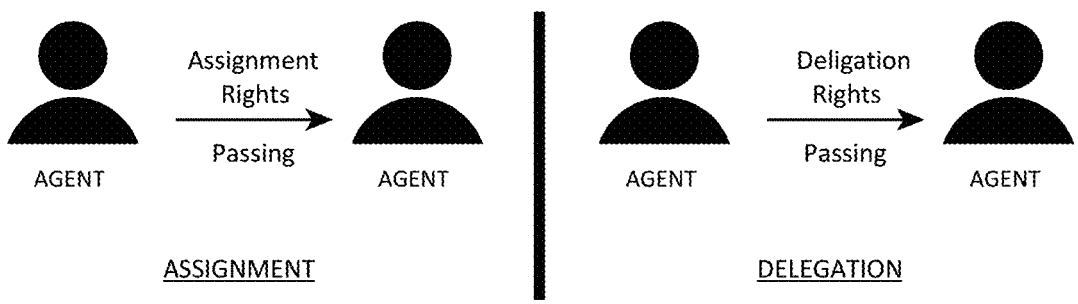
FIG. 28 represents an example of Assignment and Delegation of Information right and Decision right.

Assignment or delegation of IRDR: The solution designer can assign or delegate IRDR to agents within the solution ecosystem. Assignment pertains to an agent having information rights to pass on that right to other agents within the constraints laid by the solution designer. Delegation pertains to an agent having decision rights to pass on that right to other agents within the constraints laid by the solution designer. These constraints can pertain to letting assignments or delegations happen to limit number of agents for a limited time. It can even be event-based assignments or delegations. The Assignment and Delegation of IRDR is represented in FIG. 28.

Conditional potentialities with respect to IRDR: Solution designer can also provide for conditional potentialities. In other words, in given instances, IRDR of agents can change contextually. This will prove to be a unique feature that provides for a highly versatile solution design.

Figure 16:
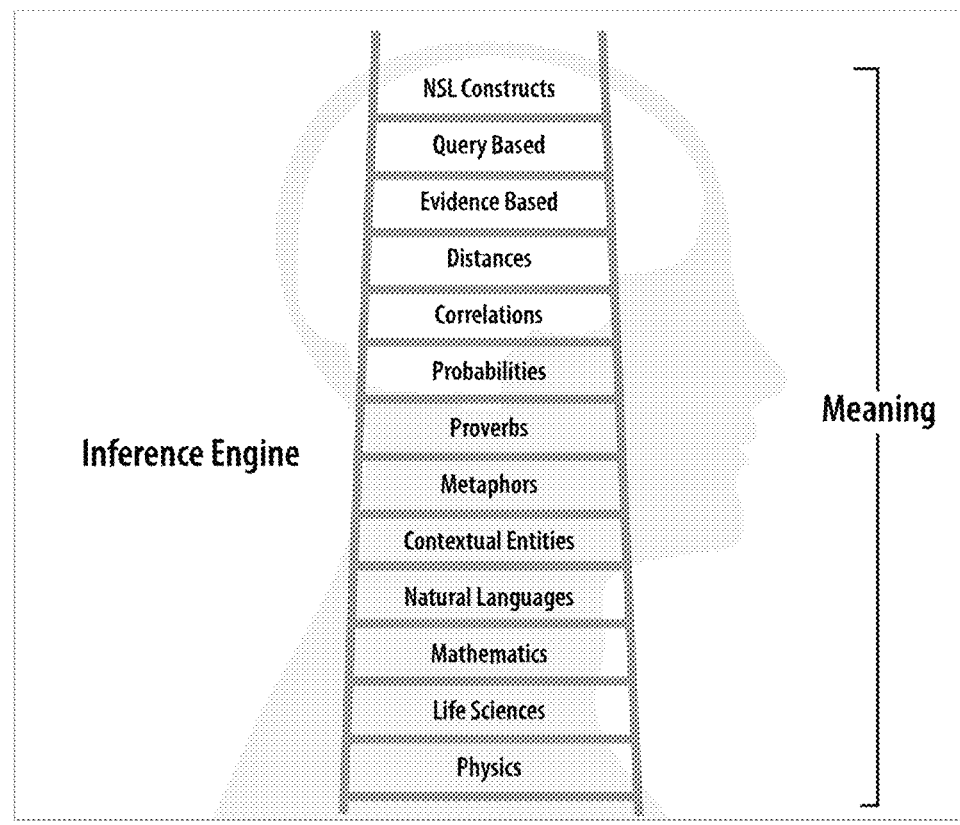
FIG. 16 represents an example of Inference Engine.
Figure 23:
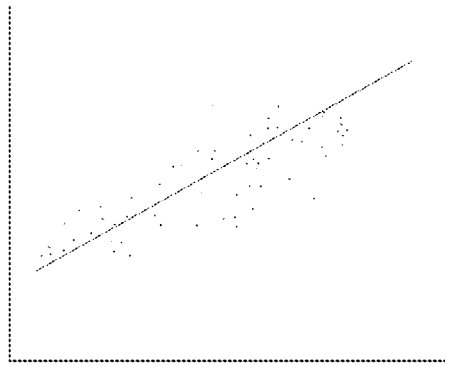
FIG. 23 represents an example of Principles of Correlations.
Figure 23:
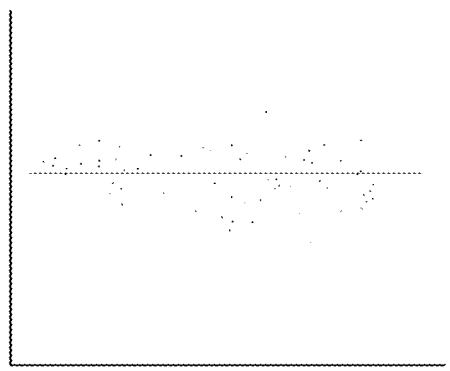
Figure 23:
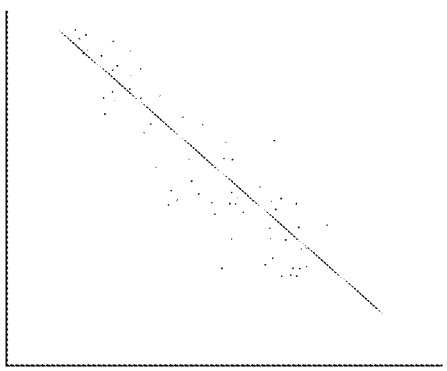
Figure 24:
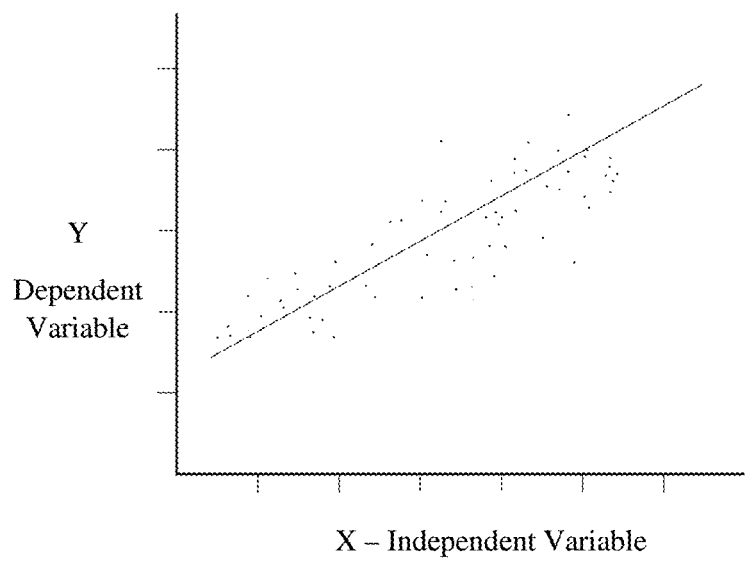
FIG. 24 represents an example of Regression Analysis.

Inference Engine: NSL recognizes solutions to be a special class of information, centring around differentiated classes, that can be acted upon. The word 'information' is being used in the limited context of information sitting in the substrate of natural languages. Natural languages are 'meaning centric'. NSL is solutions centric. NSL is a subset of natural languages as it is a special class of it. Natural languages deal with everything in the world and are neutral to whether they lead to solutions or not. NSL only deals with solutions. NSL selects those entities in the natural language (numbers and mathematics are implied) that matter. NSL heavily relies on 'information' and the 'meaning that it carries' as it is constantly looking for information to be acted upon. The inference engine, using tokenization methods, Rule based POS tagging methods, Stochastic POS tagging methods, Markov model, Hidden Markov model methods, specializes in drawing the right meaning with respect to information and thus plays an extremely important role. Information resides in very large number of substrates contextually. 'Physical, biological, images' are just a few of the several possible substrates one can easily identify. Each substrate has its own properties, principles and constraints by which it is guided. Entities are also bound by the properties of substrates to which they belong. The constraints and principles that each substrate is led by is often clear. Each such substrate principle is equivalent of static differentiated class level entities. Ex. All bodies are bound by the force of gravitation. Only those bodies that fit this class level specification will qualify to be members. All that the inference engine does is attach Nested SSA Cycles to each of the applicable substrates in which an entity is sitting. All solution classes or classes in general are equivalent of NSL entity potentialities. Whenever an SSA Cycle plays out at these substrate levels, it checks for fulfilment of membership criterion. FIG. 16 represents an example of Inference Engine. Some of the constraints and principles that NSL's Inference Engine relies on are:
  a. Constraint of Physics: The physical substrate is governed by the laws of physics such as the four fundamental forces. For example: If a sentence stated that a person jumped from the ground to the tenth floor, the physical substrate constraints will classify the sentence as illogical.
  b. Constraints of Life Sciences: SSA cycles are set up and connected in such a way that the natural selection system happens at all levels, at all vantage points. Any disruption in the SSA cycles creates an effect, which machines cannot comprehend. For example, if there is no known evidence of human life beyond 150 years, a solution involving life sciences come equipped with present notion of constraints for Age among other important parameters.
  c. Constraints of Mathematics. For example, there are AXIOMS in mathematics. These AXIOMS are class level statements. The sum total of all the angles in a triangle are 180°. Similarly, the circumference of a circle is $2\pi r$. The systems will continuously check for all the known constraints of Mathematics.
  d. Constraints of Natural Languages: Every sentence in natural language must have a verb, all unique entities are identified as nouns, adjectives can qualify only nouns and adverbs qualify verbs are some of the constraints.
  e. Constraints of NSL and agent systems: It states that SSA cycles are meant for agent systems, that agents are purpose driven, that they constantly seek to move to a more desirable state. It states that agents, general entities and purpose are inseparable, the arrival of all change drivers is a must for a change to be brought about, change cannot be triggered without the presence of agents, entities should be attached to appropriate attributes, change units should be connected to the right agent and all change happens in space and time.
  f. Principles of Probabilities: SSA cycles generate additional information, which throws more light on reality. As one goes more granular, all that is left is mathematical constructs at the very bottom of having or not having an entity. Probabilities can be between 0 and 1. How probable is it that a car can run without petrol? How probable would it be that James can reach London on time if there is a 1-hour delay due to a technical snag on her flight? The answers to these questions become extremely relevant for advanced planning and optimisation purposes. Quantifying the uncertainty is done by applying probability principles such as probability axioms, conditional probability, conditional independent probability, the probabilistic inference (i.e., the computation of posterior probabilities for query propositions given observed evidence.) etc. The full joint distribution is used as the "knowledge base" from which answers to all questions may be derived.
  g. Principles of Correlations: Correlations refer to the availability of an entity vis-a-vis another entity. Correlations can vary between −1 to 1. There can be an extremely strong correlation or no correlation at all. The availability of past or current data can help understand the strength and direction of the relationship between two entities. There can be many use cases based on historical data. What could be the correlation between the summer season and snow-clearing machines? What could be the correlation between a CGPA of 4/5 and a student opting for higher studies? Further, if anyone can infer something about one entity based on knowledge of another entity, the entities are considered to be associated or correlated. Correlations can be positive or negative. The correlation is represented in FIG. 23. Correlations between any two entities is a matter of degree, ranging from −1 to +1, expressed as correlation coefficients. Examples: Knowing the distance to a customer place, one could draw some broad conclusions about the time it takes to deliver a product and vice versa. Looking at the horse one can tell its chances of winning. Knowing the company one can tell how much revenue it is likely to generate in the year. Looking at the trigger CES, one could tell its cycle time. In the absence of information about an entity, correlations can help to draw more informed conclusions based on other available information. When one knows of 'a delivery person' being highly correlated to 'assured delivery', the system is likely to pick that person for more sensitive deliveries. Correlation coefficients can be expressed as attribute values of an entity with respect to entities that they are correlated to. Those entities can be individual entities or CES also. This is same as attaching IRDR to entities as attributes of an agent. In case of correlation coefficients, NSL specifies in that 'correlations attribute branch', the entities and their coefficients. These are constantly updated as more and more transactional data or information arrive. These values can be generated in a batch mode for the most part. In instances where the influence of the most recent transactions on the correlations is high, one can resort to real time assessment. It goes without saying that only those instances where there is a statistical significance one may be compelled to maintain these correlation attribute values. There shall be reciprocal information in most instances. Example: If 'Saturdays' have correlation coefficients with respect to 'Production', 'Production' will have correlation coefficients with respect to 'Saturdays'. In addition, generating correlation attribute values is influenced by what really matters. The correlation between a beating heart and a person attending an office may be high, but that information is not value adding. It pays to keep a base of reserved entities in the DSD with respect to 'entity-correlations' of value. This reduces the additional effort of having to identify such correlations of value, each time a new solution is developed.

h. Principles of Regression Analysis: Both correlations and regression analysis deal with relationships between entities. Regression analysis focuses on predicting the value of dependent variables given the values of one or more independent variables. The regression analysis is represented in FIG. 24. One of the applications of regression analysis is treatment of an LSI as 'dependent variable' and all the other change drivers (CDs) as independent variables. The regression formula can be attached to the trigger CES. If the CU is dealing with delivery of a product, it can then make more precise predictions about parametric values of delivery.

i. Distances between entities: Every entity is related to every other entity. NSL works on the principles of differentiation. NSL has a binary tree structure for all the potential entities participating in the solution ecosystem. All potentialities are classes. Classes can be vertical or horizontal. Distances refer to the number of events which separate one entity from another. Distances also play a key role in determining constraints of whether a solution may or may not work. For example, if a desired state is 10 events away, the solution designer cannot place the desired state in the very next change unit. The system can remind the designer to take corrective measures.

j. Querying principles: As solutions are informational, it presents a unique opportunity to solution designers. Designers can ask a series of questions to extract the answers in a structured manner. Once answers to specific questions are obtained, one's knowledge about the current reality stays on a firm footing. Based on queries, one can even conclude on the immediate next state of things. For example, if someone were to be asked about his current location and he answered "Ireland", it is unlikely that this person can be in USA in an hour. Similarly, any contradiction can also be validated against recent answers.

The natural selection process gets extremely refined by the application of simplified rules as laid out by the inferencing engine. The application of a structured inferencing mechanism will enable machines to take informed decisions. Machines may deal with much more data and process information at speeds which are millions of times faster than humans. In their day-to-day life, humans may not apply the learnings derived from mathematics, physics or natural language to filter choices and arrive at decisions. This sometimes may result in decisions which may not always serve humans well. NSL's Inference Engine helps weed out all the noise and aligns machine systems to deal with entities that matter to take decisions just as humans with complete knowledge of all these disciplines would. Laws, as laid out in physics or mathematics or agent systems, are a few in number. But these constraints and principles, as understood by science, help explain everything that happen around. Complexity arises due to information not being available. SSAs are operating at multiple vantage points. Even in a human body SSAs are operating at the nucleus level, cell level and all the way up to the body level. The distribution of SSAs makes the complex simple. The addition of SSAs generate more information. This leads to the complexity levels coming down with vast amounts of data being made available for analysis and decision making. Structuring helps to simplify things. Application of a structured inferencing mechanism enables machines to take informed decisions. The natural selection process gets extremely refined by the application of simplified rules as laid out by the NSL Analytical Engine and the NSL Inference Engine. The Analytical Engine and Inference Engine are closely connected with each other. The Inference Engine provides the meaning to help machines interpret things the same way that humans would. The Analytical Engine provides the tools for analysis and decision support systems. It helps measure performance in real time to aid and refine solutions. NSL drastically cuts down the time taken for inferencing due to inherent simplified decision support mechanism. Building on these principles, NSL inference engine has the potentiality to draw inferences that take away the informational and functional asymmetries between human agents and machine agents completely. The inference engine gets the information or knowledge from the knowledge base to come to a deduction or conclusion or derive a particular solution. The inference engine uses forward chaining or backward chaining methods for deriving a particular solution. The inference engine derives conclusions or inferences from the facts and/or rules by using deep learning algorithms also. The knowledge or facts stored in a knowledge base is maintained in the form of a database. To build solutions, the solution architects need a database to store and retrieve the data specific to their solution. This database is provided by NSL platform by storing the meta-data of the entities and attributes provided by the solution architect. During the execution/running of the solution, data is taken as input from the end-user in the exact format as the solution designer intended. Whenever a query comes, the data is accessed and/or retrieved from the database by using the known ways. The query-based access comprises a Structured Query Language (SQL) and/or a Not only Structured Query Language (NoSQL). The knowledge base is also stored in the form of Graph structure, wherein the data can be accessed and/or retrieved from the Graph by using the known means. General Equivalence Matrix (GEM): NSL is based on principles of the way the world works (WWW). NSL deals with this reality comprehensively through understanding gained from the discoveries in science. It deals with a Global knowledge base that is on a very firm ground. The WWW from the perspective of agents is all about entities and their relationships. Entities and the dynamics of change are comprehensively dealt in NSL mapping. The constructs in NSL collectively represent a body of solutions logic and knowledge presenting solutioning opportunities for the world. The General Equivalence Matrix (GEM) relies on equating solutions and their components with respect to any existing solution framework and the NSL Components. The process is led by 'the principle of preserving the purity of NSL in building the next generation solution framework'. No matter where the solutions may be resting currently, they are all made up of entities and their relationships. All entities in the solution are those that matter, distinct, physical, and at the same time informational. All controlled information first expresses itself to provide meaning and by extension provides solutions. This is same as all the 7,000 natural languages of necessity, dealing with 'meaning' and nothing else. In case of NSL, what are dealt are the 'solutions' irrespective of where they reside and how they express themselves. The GEM has the following sub-sets:

k. Solutions Equivalence Matrix (SEM):
  i. Syntactic Level Equivalence: This equivalence matrix is prepared to establish that the syntactic constructs of NSL shall meet most of the needs across any existing solution frameworks. In the process of establishing this equivalence, NSL provided for an equivalent construct wherever there is no matching element for a construct in an existing solution framework. This has enhanced the ability of NSL to deal with any situation as a construct in the NSL Framework and made NSL constructs far more mature and comprehensive.
  ii. Semantic Level Equivalence: This equivalence matrix is prepared to establish that the practices of NSL are mapped to different existing solution practices. This provided an opportunity to identify the gaps in existing solutions and 'power the same with NSL'.
 l. Programming Languages Equivalence Matrix (PLEM): This equivalence is in the context of the Translation-360 (T360) initiative. NSL is an entity-based model. All that counts is entities and their relationships in the context of solutions. Anything distinct and discrete is an entity. Loosely coupled entities give rise to CES that would have an entity status of its own. Entities are either unique (represented by words or symbols) or identical (represented by numbers). All distinct states in the world are embedded in the physical reality of space and time (which shall be treated as a substrate by itself). All distinct things in the world, irrespective of the substrates they belong to, shall also be considered informational in nature. Language is a substrate by itself. All physical things can be represented through their counterparts in this substrate establishing the 'equivalence principles'. Solutions pick entity classes and their relationships, and the pathways of transformations are created that would lead to the solutions. In a solution, all things have class level entities into which qualified members arrive at the transaction time. NSL provides a framework capable of picking up entities and relationships that matter for any kind of solution. This framework is based on the way the world works principles. The workings of the world are fairly well understood due to expansion of knowledge over the years, backed by science. NSL has the ability to capture all the solution scenarios irrespective of the nature of solutions. NSL follows the 'principles of equivalence'. NSL has managed to reconcile solutions in different substrates quite effectively. In doing so, it has established the fact that solutions can exist in different substrates. It has also established the fact that NSL framework can capture the essence of a solution elegantly irrespective of where the solutions may lie. This is similar to capturing the meaning behind varied natural language substrates accurately. It is in this background all programming languages are mapped to the NSL Framework and vice-versa. It has been done by establishing a 'programming languages equivalence matrix' based on the equivalence principles. The matrix is represented by rows and columns. Every row in the matrix has a unique id that acts as a variable. All rows represent uniqueness of Structure, State (Constants/Variables) and Functions. Columns represent NSL constructs and different programming languages and their constructs. While the row represents uniqueness, the column in the same row represents identicalness—or, in other words, equality. One thing common across all the tested solutions in different programming languages is that the solutions work, which means that there is no ambiguity in function. It also means that the electron is able to find its way to the solution definitely all the time. The complexity pertains to determining the uniqueness of entities or sets of entities with respect to a programming language and placing them in the right rows. Equality relationship is first established between each row's unique variable id-s and the NSL constructs through JSON based canonical representation. If any programming language 'to' NSL is needed to be done, the identities in the JSON format can be replaced by the equivalent constructs in that language where applicable. The Technology Translation Framework is thus established. Following the same principle, NSL is retranslated into any programming language by replacing the variable id-s in the same row by that particular language construct. The Technology Retranslation Framework (TRF) is thus established. There may be many columns in a row that are filled, while others may remain inapplicable—with null values. There will be instances where hardly one or two columns in a row are filled across many programming languages. The Matrix is dense or sparse depending on the nature of the programming language. It is denser for general purpose languages (like Java, Python etc.,) while sparser for special purpose languages (like COBOL, Fortran etc.,). That speaks for the uniqueness of those constructs in those programming languages as compared to most others. The number of rows in the matrix grow as the uniqueness of some constructs across programming languages is required to be provided for. Each Row would sometimes bring together constructs from Interface, Logic and Persistence Layer. Programming practices in the past have accumulated with non-standard structures. Emergence of API's and Wrappers lead to inherent behaviour only being understood at Input and Output level without having access to the algorithms which drive the behaviour. Each Construct in the programming languages is supported by Infrastructure (Hardware). T360 covers all the constructs holistically by accounting for the behaviours of Constructs along with the Hardware/Operating system and any external device ecosystem.

m. Natural Languages Equivalence Matrix (NLEM): NSL framework is an entity-contextual-identities based one. It is the identities that drive the function/logic of NSL solutions. It is these identities that matter for all the under the hood activities of the solutions. Natural languages are specifically in the context of human agents and their interfaces with the solution environment. A row represents uniqueness and a column the 'equivalence' with respect to a specific natural language. The first column represents identities and the rest of the columns represent different natural languages. All the change drivers (CDs) within a CU are mostly either single words or short phrases. They are also mostly parts of speech such as nouns, adjectives, adverbs, and propositions or simple phrases. The DSD houses the CDs and their equivalents in different natural languages. DSD borrowed these from existing dictionaries across languages. For the purpose of sentence creation across languages, one can create sentences by borrowing from the hundreds of verbs available in DSD and prefix it with nouns and noun phrases (that would represent the subject of a sentence) and filling with suffixes using appropriate nouns and noun phrases (which would represent the object of a sentence). Since most of the CUs are recurrent in nature, DSD also houses large number of CU-describing-sentences that can be contextually picked and used and the DSD will contain sentence-equivalents in all other languages.

Figure 17:
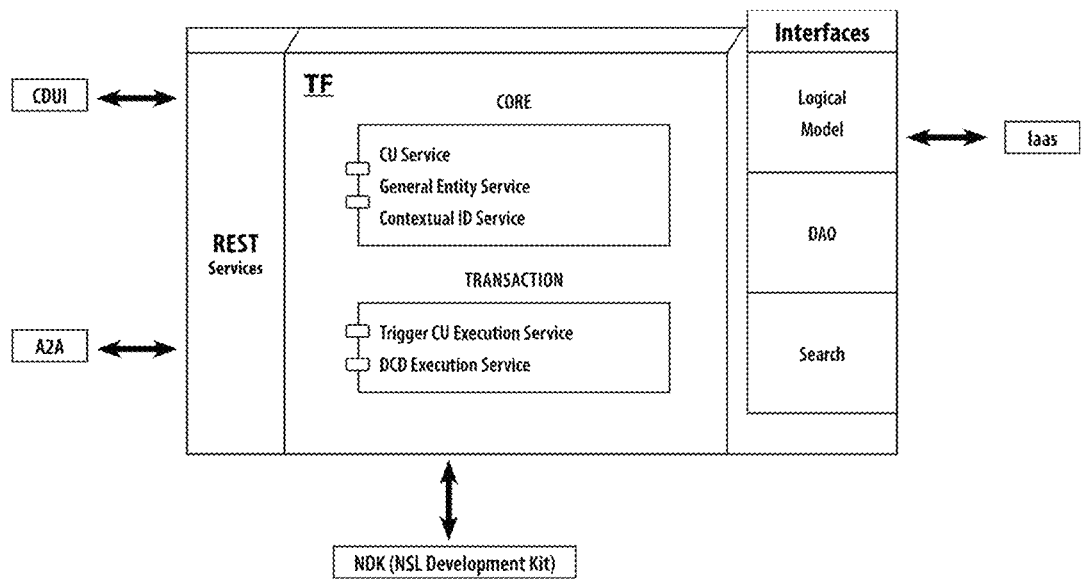
FIG. 17 represents an example of NSL-Technology Framework architecture

Natural Solution Language-Technology Framework (NSL-TF): NSL-TF is responsible for design and implementation of NSL Runtime Environment. NSL-TF is developed using Java and Spring Technologies. It consists of multiple modules designed with distributed micro services. The multiple modules, present in NSL-TF, are responsible for providing capabilities to design, construct to all constructs present in NSL such as Entities, various types of CUs, Transaction Classes, Reserved CUs, Natural Language Translations etc. In NSL, General entity creation, updating of entity by adding a new attribute, updating an entity by adding a new sub-entity, updating the entire entity, creating a basic change unit, updating a basic change unit, updating a CU by modifying participating items (ex: attributes) in its layers, updating a CU by modifying layers, creating a GSI, updating a GSI, adding a recursive CUs, adding alternative CUs are done by using JSON (Java Script Object Notation) schema and other known ways or methods. NSL-TF architecture comprises a Core and Transaction. The Core comprises a CU Service, a General Entity Service, and a Contextual ID Service. The Transaction comprises a Trigger CU Execution Service and a DCD Execution Service. In NSL-TF, Databases hold information in all forms. The NSL platform provides for polyglot persistence. Polyglot persistence refers to the co-existence of multiple databases to support the run time of the solution ecosystem. For messaging and other asynchronous use, TF uses Kafka and/or MQ (Messaging Queue) related technologies. For user authentication and authorization—IAM (Identity and Access Management) technologies like Key cloak and Spring Securities are used. The NSL-TF architecture is operatively connected to multiple modules as represented in FIG. 17.

Animating Natural Languages: This is a process that enables any solution to be built in less than 1% effort as compared to conventional ways. Even complex solutions can be built using NSL paving the way for elimination of programming code completely.

Figure 31:
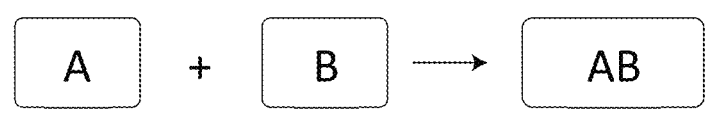
FIG. 31 represents an example of class relationships.
Figure 32:
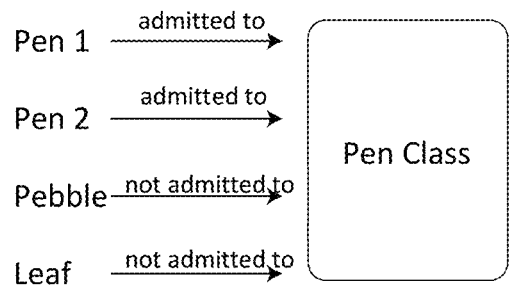
FIG. 32 represents an example of a class admits only qualified members.

Animating natural languages has the following elements:

a) Distinct/Discrete States: NSL defines information as anything distinct/discrete that matters. All things that matter are expressed as entities. NSL is a 'binary entities' (BETs) based model. The concept of entities is meaningful only in the context of agent systems. Agents recognize patterns in the world. Agents classify things and their interaction in the world so that their survival needs are better served. Pattern recognition and classification convert continuities into discrete (distinct) states. This is done to beat infinities and complexities in the real world. Agents' ability to store, process and act on information is finite and limited. Video captures real-time experiences in the world through 30 frames per second being rolled in front of the eyes. There are infinities between any two frames. But ignoring all that information is as important as recognizing the information contained in each of the frames. The only choice left for the agents is to capture information in a discrete and optimized fashion just sufficient for better survival. Incidentally, knowledge of discrete entities and the discrete events that they cause are sufficient to build any solution.

b) Binary Entities (BETs): NSL takes an approach in recognizing the true nature of entities in agent systems. The true nature of the entities in agent systems is that they exist in binary states. Binary Entities (BETs) are akin to binary digits (BITs) that quantify information. A 'BIT' is a basic unit of information. A 'BET' is a basic unit of solution. NSL BETs quantify solutions. Just as 'bits' exist in a '0' or '1' states, BETs exist in the form of 'just a class' or 'a class with a qualified member in it'. In other words, they exist in a state of potentiality (0) or reality (1). Agents' actions are always preceded by 'thinking'. The agent decides to leap and then leaps. Some actions are at instinctive levels. The body has ingrained in it an ability to 'auto-think' which is called as 'unconscious functions'. Thinking is a pattern created in one's mind in anticipation. This thinking function or anticipation function is same as the 'class' side of the binary state. No member can exist outside of a class.

c) Class Relationships: When a class combines with another class, the two together form a new class (combinatorial entity state). The classes together contribute to greater differentiation. Example: When 'A' and 'B' combine, they become 'AB' and AB is differentiated from either A or B. This example is represented in the FIG. 31. Each class should also be seen as a 'constraint'. A class admits only qualified members. Example: If the class is 'pen', then a 'pebble' or a 'leaf' cannot be admitted into that class. This example is represented in FIG. 32. It is in that sense that a class is a constraint. By reducing the possibilities, classes bring focus to things. By combining classes, the focus can be sharpened more and more. It is through this methodology of eliminating possibilities constantly that NSL gets to that entity or set of entities that really matter. If combination of A, B, C (ABC) is what is desired, having just A, B, C, AB, BC, or CA is not going to fulfil the criterion set. All the three must exist simultaneously. In information technology this process of combining classes such that desired differentiations happen is dealt through the 'AND' operator. When the combinations branch out, the same is dealt through the 'OR' operator. The 'NOT' operator deals with the toggle between a class and a member. The 'NOT' converts a 'class' (potentiality) to 'class with a member' (reality) and vice versa.

d) Synonyms of Classes: The world refers to 'classes' by different names. In the process there is also a fair bit of confusion arising out of the proliferation of these synonymous terms and multiple interpretations related thereto. At the end of the day, they all mean the same thing. The problem with such synonymous terms is that people tend to think of them as different. In addition, they assign different meanings adding to the confusion. Here is a sample list of many synonymous terms for 'classes':

A. Potentiality
B. Constraint
C. Rule
D. Algorithm
E. System
F. Process
G. Structure
H. Limitation
I. Filter
J. Anticipation
K. Solution
L. Regulation
M. Decision
N. Choice
O. Selection
P. Attention
Q. Theorem
R. Axiom
S. Pathway
T. Channel What one would notice from the above is that each of the terms above limits the possibilities from an array of possibilities. It is through a series of such directed reduction in possibilities one gets from less desired position to more desired position. Any possible solution can be achieved by creating class level CES and, in turn, Extended CES in NSL runtime environment.

e) Class and Member Relationships: NSL has disclosed about how classes can be connected to create any differentiated solutions. NSL also has another kind of relationship involved in solution environment. That relationship is between classes and members. When a solution is created using connected and related classes, that by itself does not do the trick. It has to be put on the NSL runtime and exposed to the environment. The solution then breathes in members from the environment into designated classes and also breathes out members to be absorbed by other designated classes. Breathing in and breathing out is same as inputs and output, or incoming events or outgoing events.

f) Class to A Member: This applies to all solutions that have already been put in place, wherein all the classes and their relationships are already established. All that is left to do is gazing the environment to admit qualified members into local network of nodes; and for the local network of nodes to generate qualified members for other local network of nodes. In a class to member relationship situation, admittance of members is based on available classes. In other words, there cannot be a 'member' unless there is a pre-existing 'class'.

g) Members to Classes: In these situations, agents recognize the entities in the environment and try to make sense of them. This is done through proper classification of entities that are encountered. Much of machine learning is about identifying these classes either in a supervised manner or in an unsupervised manner. Example: if a person is looking out of the window and the person is unable to recognize a particular bird, then the person asks his/her friend, and his/her friend tells him/her, 'oh! That is a pigeon'. In his/her friend case, he/she has moved from a class to a member because he/she knew what class the pigeon belonged to. In the person's case, the person has moved from a member to a class as the person had no idea before as to what class that entity belonged to. Much of learning proceeds in this manner. Classes make mental constructs possible such that any new environment could be made sense of in the context of those pre-existing classes. Solution designers show their acumen by identifying the right classes and their relationships in the process of building solutions. This is how natural languages are animated in NSL.

For all practical purposes, animated natural languages emulate the behaviour of living beings perfectly. The toggle between class and member relationships makes natural languages dynamic. It is the arriving and departing members into the solution sets (class sets) that animates natural languages. All solutions are now capable of having a representational counterpart in the form of 'animated natural language'. This is a natural extension to the representational capabilities of all natural languages. All natural languages can comprehensively depict any complexities in reality in a static manner. All that NSL does is to bring those natural languages live by animating them. The Magic Mirror: 'Animating natural languages' is one powerful way of explaining the true nature of NSL. Another equally powerful metaphor is the visualization of NSL as a magic mirror. Thousands of natural languages have been tested for their ability to represent all things in the real world effectively for thousands of years. In one sense, natural languages are mirrors of entities in the real world. One thing about a mirror is that it captures all physical images accurately. But it is just a mirror. The entities in the mirror reflect, and are influenced by, entities in the real world. But for all practical purposes, mirrored entities do not influence the entities in the real world. It is a different story when it comes to the magic mirror. This magic mirror is made up of controlled electromagnetic forces. Such control is obtained by many levels of abstractions in the 'information technology' mirror. By coupling these controlled electromagnetic forces with many levels of abstractions, and the natural languages, NSL makes a magic mirror a reality.

The nature of the magic mirror: The entities in the magic mirror can interact with each other. They can interact with entities in the other magic mirror counter parts. They can also seamlessly cross the boundaries of 'mirrored existence'. They can 'leap out of the screens' and interact with entities in the real world seamlessly. These controlled entity interactions, as facilitated by human and machine agents, obtain many magical properties. Irrespective of what substrates (physical world, Images world, natural languages world, etc.) they belong to, entities are only influenced by what matters for the solutions. Most interestingly, many of these entities can travel at the speed of light and change their states billions of times a second.

Typing Away Solutions: With respect to recording solutions in NSL, it takes only a limited time to type away those solutions over the NSL runtime and make them work. Not much effort is required for creating UI, database interfaces, and mobile enablement. On top of it, solution development can be done in any natural language and translated to any other solution language. Another significant additional benefit is the ability to recast the solutions in select programming language environments and preserving input and output equivalences.

Contextuality and Conditionality: Every entity is unique, and it has its own properties. In agent systems, entities are those that matter for the agents as they seek solutions. At the vantage points of agents, entities are mostly macroscopic. Those entities are already made up of trillions of atoms and particles of different types. Innumerable discrete/distinct states contribute to contextual differentiations of the properties of entities. That is how, for example, a pen comes to have a property of being able to write or a paper having the property of being written upon. Agents rely on such entities to meet their objectives. Example: A person needs only an apple to satiate hunger. In this case, trillions of discrete/distinct states in the form of atoms may have come together (combinatorial discrete/distinct states) to form an apple. But if the same person needs to write a letter, that person would now need a pen and a paper to write the letter. Just as 'apple' produces an event of 'satiating hunger', the combination of 'pen and paper' has the ability to produce an event of 'written paper'. Note that entities in NSL paradigm operate with the principles of excluded middle. That is, the entities are either there or not there—in binary states. In any environment where solutions are already designed, classes are first created to facilitate arrival of members. In the case above, the apple class was first there (in potentiality) before the real apple arrived. Intermediary states such as 'half an apple' or a 'quarter apple' are not provided for. When the apple arrives into the class, it is known as an event that would have turned the 'class apple' to reality. If the apple departs, that is also an event. The 'class apple' is now devoid of its member, turning the situation to potentiality again. Two entities—pen and paper—are required to produce a desired event of writing a letter. NSL theory requires that the combination of 'pen and paper'—that togetherness—itself has its own property. Since there are two entities in the form of binary variables, the combinatorial states from a solutions perspective can be in four different states.

1. Both pen and paper are in potentiality (Only the classes exist).
2. Pen has arrived as member hanging to the class pen, therefore, pen is in reality state and the paper is in potentiality.
3. Another possibility is that the paper has arrived turning its state to reality, but the paper is yet to arrive.
4. The fourth combinatorial state is that both pen and paper are in reality.

Notice that only the fourth state has the ability to cause a desired event of 'written letter'. That is, only that combination meets the condition of generating the desired event. The rest of the three combinations result in production of 'null-events' (no events). The desired event and null-events using pen and paper entities is represented in FIG. 36. The difference between a single entity model and a combinatorial entity model is that the events can happen individually with respect to each entity present in the combination. In other words, CES behaves like an independent entity but for the fact that it is made up of many loosely coupled entities and attributes. For all practical purposes, a CES made up of two or more entities operates as those each of the entities contained within it are its attributes. If one switches the vantage point and looks at things from the point of view of a GSI, all CUs and the entities contained in those together become attributes of the GSI. All combinations are contextual and relative i.e., an entity with respect to others. But only the presence of all entities involved in the combination fulfil the 'condition' of triggering an event. If there are 10 entities in binary states, possible combinations are 2^10 (1024). But only the 1024th combinatorial entity state fulfils the condition of triggering desired event(s). This is the primary difference between contextuality (CES or ECES) and conditionality. A conditionality is that contextuality that has trigger properties. Incidentally, if entities are in a state of 'constancy' (Member always present in a class), the number of possible combinatorial entity states come down accordingly. If nine out of 10 entities are 'constants', then there would be only two combinatorial entity states, the 10th entity being in potentiality or reality and all others are present in any case. There are implied entities whose presence is taken for granted and choose not to state them. Example: One may take a table and a chair as givens with respect to writing a letter. The pathways of change are clearly laid down with respect to 'machine agents' such that when a condition is fulfilled, actions are automatically performed. In case of 'human agents', when the trigger conditions are fulfilled, it is generally supposed that the performer of a role has the ability to direct the change as needed.

Figures 41, 42:
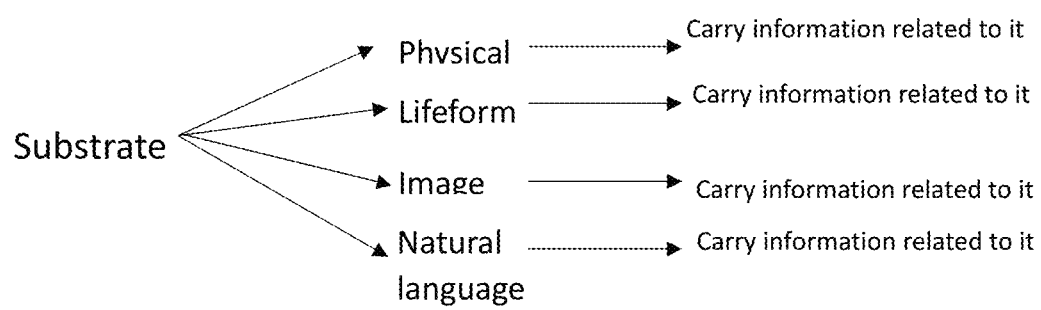
FIG. 41 represents an example of shades of potentiality in a combination of two binary entity model.
FIG. 42 represents an example of carrying varying amounts of information irrespective of the substrates.

NSL is based on the principle of binary entities (BETs). A binary entity is an entity that exists in a state of potentiality or reality. BETs relate to solutions, just as BITs relate to information. Interestingly, this binary state of BETs remains the same irrespective of the vantage point. This is a consequence of all 'BETs' in the ecosystem being connected to each other through the principle of nearest neighbours. When two 'BETs' are connected together, that combination will now be governed by the principle of being existent in a binary state. When two binary entities are connected together, there are four possible states. For this combination to be in a state of reality, state transitions should go through three states of potentiality. Example: Both entities are in potentiality state, one of them in reality state but the other in the potentiality state, the first is in the potentiality state while the second entity is in a state of reality. From the point of view of the assessing the reality state of the 'combination of two binary entities', all the above three states are still potentiality states. Only when both the entities are in a reality state, the combinatorial entity state of two binary entities in a reality state. That means, there are three 'shades of potentiality' associated with in a combination of two binary entity model, which is represented in FIG. 41. The formula with respect to the 'shades of potentiality'-which is same as 'non-trigger combinatorial entity states—within a CU is '2^n−1'. In an extreme instance of 10 sequential CUs, where the last CU is a GSI, each CU causing only one event in the next, one can estimate the number of shades of potentiality. This number would be a number close to 2 raised to the number of variables in the GSI. Quite significantly high 'shades of potentiality' will exist. There is bound to be huge number of possible 'shades of potentiality' in theory. But in practice, only given 'potentiality pathways' tend to be taken at transactional time.

Example: In the physical layer of a GSI, there could be potential ECES as enumerated below, the ground state is,
-(CU1) A'B'C'D'—(CU2) E'F'G'—(CU3) H'I'J'—(CU4) K'L'M'N'O'

As events happen in the ecosystem of the specified GSI, there will be many transitions in the 'potentiality states' (shades of potentiality) before GSI is fulfilled, as below,

. . .
. . .

ABC'D-E'F'G-H'I'J-K'L'MN'O

. . .
. . .

ABCD-EF'G-H'I'J-K'L'MNO

. . .
. . .
. . .

ABCD-EFG-HIJ-KLMNO

As all 'BETs' are transformed into a state of reality, the GSI is realized as shown above. Each letter from A to 0 in the example represent a change driver, which is same as a 'BET' in the physical layer of a CU. Letters with the primes (example, B') are to be read as the 'BETs' in a state of 'potentiality'. A letter without a 'prime' (') is to be read as a 'BET' in a state of reality. The default start ECES is the combination of ground state CES across all CUs all the way up to and including GSI CU. The other extreme is where the GSI is realized when all the BETs are in reality state across all CUs belonging to the GSI. All the hundreds of possible potentiality states in the example chosen are called 'shades of potentiality'. In other words, any of the potentiality states in the GSI will fall under the potentiality state of the GSI and there is only one state in reality, 'the GSI reality state' (GSI without a prime attached to it).

The pathway through shades of potentiality chosen is unique to this transaction. It is most likely to be different for the next. Every transaction leaf behind its fingerprint of transitions through 'shades of potentiality'. There are patterns one could observe with respect to different agents as they transition through different shades of potentiality. These would be equivalent of 'contextual fingerprints' left behind. One could glean a lot of information from this dynamic, taking 'analytics and machine learning' techniques to new levels of effectiveness. When one switches the vantage points to GSIs, the 'shades of potentiality' will dramatically increase and making 'contextual fingerprints' much more powerful. The 'contextual fingerprints' arise out of 'realized potentialities' (leaving out many unrealized) as against total number of 'shades of potentiality'. These 'contextual fingerprints' are synonymous with an alternative phrase 'contextual transactional potentiality pathways'

Shades of Potentiality Theorem: In NSL, a series of connected 'BETs' lead to a solution (fulfilment of a wish). BETs are connected as they are part of a CES in the physical layer of a CU or they are part of ECES (Extended CES). 'BET' stands for binary entity. 'BETs' toggle between a state of potentiality (where only a class exists) and reality (where the class has a qualified member sitting in it). This is synonymous with 'bits' (binary digits) in information theory where the binary variable accommodates either a '0' or a '1'. The number of binary entity CES that the physical layer of a CU accommodates is governed by $2^b$ formula where 'b' is the number of BETs in the CES. Example: If there are 6 CDs (change drivers) where BETs sit in the physical layer, there are $2^6$ CES (64 CES). Of which only the 64th CES shall be in a state of reality (where all the CDs would have arrived) with respect to triggering and realizing an objective.

Theorem for Shades of Potentiality in Single CU System: Shades of potentiality in this single CU system would be $2^b-1$; wherein 'b' stands for number of BETs in a given CU. If 'b' is 6, then total CES would be 64; the shades of potentiality would be 64-1 (63), also known as non-trigger states. It is observed that the system has 63 shades of potentiality. The definition of 'potentiality' is the potential that a class holds to turn into reality. All the 63 states hold the potential to turn into reality. Potentiality states could belong to any of the 63 states, but they are still classified as belonging to a state of potentiality. The potency of the potentiality state varies based on the number of events that separate the reality state and the potentiality state. If the GSI reality state requires 25 events at the minimal for the GSI to turn to reality, the number of events that belong to potentiality states would be 24 (25-1). The last event turns the 'global statement of intent' to reality. The Shades of potentiality theorem quantifies the maximum number of potentiality states that could theoretically exist in any GSI environment. But, depending on the nature of arrival/departure of entities (called events), the pathways of reality would transition through only that many CES as there are number of BETs in the CES. In the case above, there are only 6 states; the base state of all BETs being in potentiality state and five more transitions before the 64th state happens. This presupposes that only arrivals are considered (not providing for departure of members from classes and re-arrivals). Depending on the order in which the CDs may arrive, the potentiality pathways in the shades of potentiality get determined.

Theorem for Shades of Potentiality in Multi-CU system: In almost all cases, there are number of sequentially connected CUs leading to the final wish fulfilment (in the last CU). The theorem for shades of potentiality in multi-CU system is, $$((2^{(b-c-e)}) \times (2^{(b-c-e)}) + (2^{(b-c-e)}) \times (2^{(b-c-e)}) + (2^{(b-c-e)}) \times (2^{(b-c-e)}) + (2^{(b-c-e)}) \times (\text{all the way up to the final CU}) \ldots (2^{(b-c-e)}) + (2^{(b-c-e)})) - 1$$

Where, 'b' is a variable representing the number of BETs(CDs) in respective CUs; 'x' is the mathematical multiplication sign acting as the connector of CUs in addition to its multiplication function; each of the mathematical units preceding or succeeding a 'x' sign represents respective CUs (example, '$(2^{(n-y-z)})$' represents the first CU, '$(2^{(n-y-z)})+(2^{(n-y-z)})$' represents the second, so on and so forth); 'c' stands for the number of 'BETs' that exist as 'constants' in the CU (in a state of reality all the time, not accommodating binary variability); e' stands for the number of events one or more of the preceding CUs, belonging to the same 'connected sequential CUs', cause in a CU (This is same as preceding sentences belonging to the same paragraph causing events in the ensuing sequential sentences (CUs); all the variables are contextual in nature (contextual variables) carrying values that are specific to the context of each CU. Example: Variables such as 'b, c, e' will have values that are specific to each CU. 'b' in CU1 could be 6 and 'b' in CU2 could be 4. All the arithmetic functions should be performed sequentially rather than following the arithmetic standard conventions. Example: 16×4+4×8+8. To solve this arithmetic equation, the sequential steps are shown as follows: First step: 16×4=64; Second step:64+ 4=68; Third step: 68×8=544; and Fourth step: 544+8=552. It is the above method that should be followed for the purpose of 'shades of potentiality theorem'. If the same problem is performed using normal mathematical conventions, the arithmetic would be performed the following way: (16×4)+(4×8)+8 and the result is 104. In a scenario, where the first CU by definition will not have any preceding CUs, then at least one event being caused by preceding CU or CUs does not apply. The theorem provides for it as in the first CU 'e' is '0' and there is no influence of preceding CUs. The second CU onwards there are only half the number of potentiality states if the event caused from the previous CUs is only 1; As the number of events in each CU caused by previous connected CUs increases, potentiality CES pathways (or shades of potentiality) will keep dropping at the rate of ½ for each event. In case of 3 events from previous CUs, the number of potentiality CES will drop by ½×½×½—which is same as ⅛th. The reason for this is explained through an example: Let this theorem be applied for determining shades of potentiality in a 6 CU system exemplified below,
1. CU1 has 6 CDs; Constants 0; Events (from connected CUs) 0—First CU will not have any events from the connected sequential CUs. Events will arrive from only related CUs or as provided by an external agent(s).
2. CU2 has 4 CDs; Constants 0; Events from connected CUs 1
3. CU3 has 5 CDs: Constants 2; Events from connected CUs 2
4. CU4 has 3 CDs; Constants 0; Events from connected CUs 1
5. CU5 has 5 CDs; Constants 1; Events from connected CUs 2
6. CU6 has 4 CDs; Constants 2; Events from connected CUs 1

When the theorem is applied to the example above, $$((2^{(6-0-0)})\times(2^{(4-0-1)})+(2(4-0-1))\times(2^{(5-2-2)})+(2^{(5-2-2)})\times(2^{(3-0-1)})+(2^{(3-0-1)})\times(2^{(5-1-2)})+(2^{5-1-2)})\times(2^{(4-2-1)})+(2^{(4-2-1)}))-1$$

Which is, $$((64)\times(8)+(8)\times(2)+(2)\times(4)+(4)\times(4)+(4)\times(2)+(2))-1$$

Which is, $$(64\times8+8\times2+2\times4+4\times4+4\times2+2)-1$$

Which is,

33386−1

In other words, there are 33385 shades of potentiality in the above example. Influence of Constants: It is explained in a simplified manner with an example to address the influence of constants. Example: The CES with respect to CU1 in this example has the following BETs: A B C D. The number of states these binary entities (BETs) can accommodate in the normal course are 16 (governed by the formula $2^b$), where 'b' here being 4, the CES are 16. If 'A' and 'B' are constants, then the CES will drop to 4 ($2^{(4-2)}$) as now only ABC'D'/ABC'D/ABCD'/and ABCD are permitted states.

Influence of Events: It is explained in a simplified manner with an example to address the influence of events. Example: The CES with respect to CU1 has four BETs i.e., ABCD, which is followed by a CU2 with three BETs i.e. EFG. When CU1 triggers, in one case, it causes an event in CU2 turning its BET 'E' to reality. In the normal course, ECES between CU1 and CU2 would be governed by the following formula $2^4$ (the number of BETs in the first CU without any constants in it, which is an assumption made for the purpose of discussion here)×$2^3$. Which is same as $2^7$ in the ECES (128 combinatorial entity states). But in reality, the number of ECES will not be this many for the simple reason that none of the 16 CES in CU1 will cause the BET 'E' to turn to reality till such time CU1 triggers and the trigger process is complete (assuming here that the trigger process time is 10 minutes). For all practical purposes, CES in CU1 can coexist with only half the CES in CU2 till the CU1 trigger process is completed. 'E' BET cannot turn to reality before the trigger process in CU1 is completed. The combinatorial entity states in CU2 are,
1. E'F'G'
2. E F'G'
3. E'F G'
4. E'F'G
5. EF G'
6. E F'G
7. E'F G
8. EFG Since BET 'E' cannot turn to reality till trigger process in CU1 is completed, four of the eight CES in CU2 marked red (i.e., 2, 5, 6, and 8 combinatorial entity states) cannot exist. None of the non-trigger CES in CU1 can turn E' in CU2 to a reality state. Even the trigger CES in CU1 cannot turn E' in CU2 to a reality state until the 10 minutes of trigger process time is completed. Due to this effect, Extended combinatorial entity states between CU1 CES and CU2 CES will be limited to only 16×4 combinations (not 16×8 combinations). However, in case of CU1, the 64th CES (ABCD where all the BETs are in reality), causes CU1 trigger. In the intervening period of 'ten minutes it takes for the trigger to be completed', E will continue to be in a state of potentiality (E')—permitting any of the four CES (1, 3, 4 and 7) to combine with the 64th CES in CU1. On completion of the trigger process, 64th CES in CU1 can also coexist with the other four CES (2, 5, 6 and 8) where E is in a state of reality. The second part of the formula in each CU with respect to 'shades of potentiality theorem', . . . . '+$((2^n-p-z))$' . . . . arises out of this special nature of 'trigger CES'.

Minimum Number of Realized Potentialities: As mentioned in "Theorem for Shades of Potentiality in Multi-CU system" as an example for determining shades of potentiality in a 6 CU system, there are a total of 33385 possible number of shades of potentiality or potentiality pathways are observed. Each time a solution plays out, only a limited number of these 'shades of potentiality or potentiality pathways' get realized. In other words, each transaction leaves its own footprints of 'realized potentialities' in the sands of 'shades of potentiality'. In the example, the first CU has 6 BETs giving rise to 64 CES, all the states but for the last (63 states) belong to the shades of potentiality. To appreciate the fundamentals behind realized potentialities, the experiment is started with a single CU system. If there is only one BET 'A' in a single CU system (for argument's sake) that BET is either A' or A, wherein A' represents the ground state. Between the ground state and the reality state, there are no intermediary states are observed. In this instance, there are no 'shades of potentiality'. But in a single CU system with 3 BETs, there are many shades of potentiality. There is the ground state (where all the 3 BETs are in a state of potentiality) plus 2 events leading to 2 jumps into CES potentiality states. Example:
1. A'B'C'
2. A B'C'
3. A'B C'
4. A'B'C
5. ABC'
6. A B'C
7. A'B C
8. ABC If one counts the ground state also as potentiality, there shall be three shades of potentiality before the final state of reality. The realized shades of potentiality marked in red (i.e., 1, 4, 6, and 8) happen when 'C' arrives first and 'A' arrives next before 'B' arrives making the desired trigger CES happen. The realized order of potentiality CES here is 1 ^4 ^6 before the trigger state 8 is realized on the arrival of B. These are the footprints of realized potentialities. As a general rule, the realized potentialities are 1+number of events, wherein 1 is accounting for the ground state. In the example herein above, there are 3 realized potentialities and two events before the 'trigger CES' is realized.

In a multi-CU system, even the intermediary CU trigger states are counted as 'realized potentialities. Only the GSI triggers CES would be counted as the reality state. In NSL, all things are contextual and relative. In the above example, contextuality is in relation to realization of GSI (global statement of intent). All the 'realized potentialities' or 'potentiality pathways' are attributes of GSI realization. The theorem for minimum number of realized potentialities in the backdrop of 'shades of potentialities' would be the number of BETs in each of the CUs multiplied with each other. In the example enumerated herein above, while there are 33385 shades of potentiality pathways, the realized potentialities (the ground state plus the number of events that can be caused in a CU) after accounting for the constants are only, $(6 \times 4 \times (5-2) \times 3 \times (5-1) \times (4-2))-1$
Which is, 1727(i.e., 1728−1).

Minimum Number of Events in the Shades of Potentiality: The theorem for minimum number of events in the shades of potentiality arises out of adding all the BETs in the connected CUs together, minus the constants in each of the CUs, minus 1 (the final event) that fulfils the GSI. In the example enumerated above, it would be 21 events in the shades of potentiality. $((6+4+(5-2)+(3)+(5-1)+(4-2))-1$. The total events are 22 of including the one that realizes GSI reality state.

Unidirectional Events: The minimum number of events in the shades of potentiality presuppose unidirectionality of events. That is, it is assumed that events in individual BETs flow from potentiality to reality, not the other way round. Members arrive into classes causing an event.

Bidirectional Events: The minimum number of 'realized potentialities' presupposes unidirectionality of events. This is because the theorem is in the context of minimum number of 'realized potentialities. Bidirectionality of events rises when members leaving from individual BETs causing an event is provided for. Any such departures will add to the number of events within the shades of potentiality. Example: A 'person' arrives, that is event one. A 'pen' arrives, and that is another event. But the 'person' who is there in the 'person' class now departs, causing an event as well. The example can be extended to make the point that bidirectional events can theoretically cover all the shades of potentiality for a given GSI. In the example as stated herein above under 'Realized Potentialities', the number of realized potentialities in the form of CES are listed as 1 ^4 ^6 before the trigger CES 8. However, if 'C' departs from the CU, the realized potentiality CES would be '2'. Thereafter if 'B' arrives, the realized potentiality CES would be '5'. Likewise, if 'A' departs and 'B' arrives, the realized potentiality CES would be '7'. The 'shades of potentiality theorem' establishes all the possible shades of potentiality. The theorem with respect to 'realized potentialities' only establishes the minimum number of possible realized potentialities. For this to happen, only unidirectionality of events shall prevail. However, there can be any number of arrivals and departures within CUs before the trigger, if bidirectionality of events is provided for. These could add not only to the events within a GSI, but also enhance the count of 'realized potentialities' that go far beyond the minimal number of realized potentialities.

Alternative CUs: One can call the CUs that belong to the same GSI ecosystem as connected CUs. If they influence things outside the GSI ecosystem, the influenced CUs are called 'related CUs'. If the connected CUs belong to the same paragraph, such connected CUs are called sequential CUs. These are governed by the 'AND' function. That the shades of potentiality theorem apply to these connected CUs is a given. But it applies equally to all the GSI ecosystem connected alternative paragraphs (generated due to the influence of alternative CUs) also. Alternative CUs provide alternative pathways to GSIs, to be governed by the 'OR' function. NSL has already established a process for the count of number of pathways in the context of a GSI. The shades of potentiality theorem can be applied squarely to all the existing GSI pathways.

Reconciling Permutations and Combinations in Mathematics: NSL revisits permutations and combinations of objects/entities in the context of solutions. NSL, for the time being, ignores 'permutations' as the CUs, generally speaking, consider combinations only. Order in which BETs arrive at are relevant only in some special cases. These objects/entities take the form of 'binary states' when it comes to solutions—wherein they are converted into 'BETs. When binary entities combine in a CU, the number of combinatorial states (CES) that they give rise to is shown in the example herein below. Example: The CDs/BETs in the CU being 3, they would lead to 2^3 'CES', which is 8 CES (following $2^b$ formula).

1. A'B'C'
2. A B'C'
3. A'B C'
4. A'B'C
5. ABC'
6. A B'C
7. A'B C
8. ABC

However, the 'combinations' of objects/entities formula will yield the following result. Combinations' formula is n!/(n−r)! r!

Where 'n' is number of entities, 'r' represents the combinations at a time. In case of three binary entities, 'n' is 6 (3 potentiality states and 3 reality states) and the total combinations would be, 6!/(6−3)!3!=720/6×6=20

In addition to the combinations (8) listed herein above, the following combinations are also included, 1. A'A B'
2. A'A B
3. A'A C'
4. A'A C
5. B'B A'
6. B'B A
7. B'B C'
8. B'B C
9. C'C A'
10. C'C A
11. C'C B'
12. C'C B Thus, the total combinations will be 20 (8 and 12). Binary entities by nature cannot coexist between potentiality state and reality state at the same time. Therefore, the second set (12 combinations) is excluded. The resultant combinations are only 8, consistent with the $2^b$ formula.

The question arises as to how one can explain the difference between the number 20 that the combinations formula yields and number 8 that the BETs formula yields. The differences can be accounted for by taking the special nature of 'BETs' as compared to entities. BETs always come in entity pairs, but only one of them is present at any given time. The first BET is a potentiality entity and the other a reality entity. As a rule, both potentiality and reality are not permitted to be present at the same time. All BETs are taken into account with respect to arriving at the combinations. A consequence of this is the BET count (b) is always same as 'r' in combinations formula and the 'n' is always twice that of the number of BETs (2b). When considering all the above into account, the difference between the 'combinations of entities' in the traditional formula and the 'combinations of BETs' as per BETs related formula stands explained. In the example above, the difference is 12 (20 ^8). In all these 12 instances of combinations of entities, both potentiality and the reality of the same entity were present. These are defined as unpermitted combinations in the BET model. The remaining combinations are 8 which is same as what the BET formula '2^b' yields. The formula for identifying the unpermitted BET combinations can be stated as below, $$(n!/(n-r)!\times r!)-2^1$$

Permutations: These are combinations where the order also matters. Permutations are generally not significant with reference to BETs with a CU. However, permutations assume a special role with respect to relationships between CUs.

Example:
A. Register customer request
B. Travel to customer place
C. Deliver the product In this example, each CU is order sensitive i.e., 'C' cannot be followed by 'B'. Combinations: Generally speaking, within a CU, it does not matter in what order the BETs would arrive. Example: For 'writing letter', it does not matter when the 'person' or 'pen' or 'paper' would have arrived into the CU. All that matters is whether all the entities were present for the purpose of 'writing letter'. There are rare occasions when the order may also matter with a CU. Example: It could matter in a CU for medical consultation that office-boy, nurse, doctor and patient arrive in that order. In Permutations, the order in which BETs are arranged also matters. Ordering could play an important role in some special cases of CES in a CU. But in all cases of CUs within a GSI, order in which CUs appear is of paramount importance. The following formula applies with respect to permutations (combinations where order matters) of BETs: 2^b×b!

As per the example above, this translates to 2^3×3! which is equal to 48.

The traditional permutations formula for entities is as follows, n!/(n−r)!

When this formula is applied to the example taken above, it would yield, $$6!/(6-3)!=720/6=120$$

As is the case with combinations formula, here also there is incidence of unpermitted permutations i.e., 120 ^48=72. There are 72 unpermitted permutations where both the potentiality and reality states of the same BET are present.

When those unpermitted permutations are ignored, the remaining permutations match the number that the BETs formula yields. 2^b×b!

As per the example above, this translates to 2^3×3!=8×6=48

The formula that identifies the unpermitted permutations is (n!/(n−r)!)−((2'1))×b!)

Where 'n' is the total number of entities, 'r' is the number of entities in the chosen set, 'b' is the number of binary entities (BETs).

The Result as per the example chosen above is, $$(6!/(6-3)!)-(2^3)\times3!)=(720/6)-(8\times6)=120-48=72$$

Vantage Points and BETs: Here are some of the things that are most striking about 'shades of potentiality'. Irrespective of what the vantage point is, all the BETs are in binary states. In 'Theorem for Shades of Potentiality in Multi-CU system', the theorem is applied for determining shades of potentiality in a 6 CU system example, wherein the GSI fulfilment has only two states namely 'Potentiality State' and 'Reality State'. While the 'shades of potentiality' were 33385, they have collectively belonged to only one state of 'potentiality'. The 'Reality State' of that GSI was only one—when all the BETs in the GSI CU were in a state of reality.

Vantage Point Switching: At higher vantage points, there are many differentiating connected entities or attributes (BETs). A GSI may have any number of BETs connected with it. No matter what vantage point one can choose the 'BET' from that vantage point is always in a binary state. There can be any number of shades of potentiality, but always only one reality state. All BETs in NSL ecosystem are connected. All BETs are distinct/discrete but connected. The vantage point from which one can look at a BET changes the nature of the BET. It is all relative to what matters for the empowered agents or stakeholders. It is observed from the perspective of realization of Global Statement of Intent (GSI), there is only one reality state and that is when all the BETs in the GSI CU are in a state of reality. For determining shades of potentiality in a 6 CU system example in the 'shades of potentiality theorem', there are 33385 shades of potentiality but only one reality. When the vantage point switches to CU1 in the same example, there are 6 BETs in it, resulting in 64 CES. Since the vantage point is that CES that results in trigger, 64th CES becomes reality CES and all the other 63 CES represent shades of potentiality. When the vantage point was GSI CU, there were 33385 shades of potentiality. The first CU's 64th CES is no longer the 'reality state' because the vantage point switched to GSI CU. The first CUs 64th CES becomes only a participant in the 'shades of potentiality' as the vantage point switches. Every participating entity in the shades of potentiality assumes a status that is equivalent of an attribute serving the cause of a chosen vantage point. Just as entities and their attributes are participants in CES, TES' are also participants in ECES (extended CES). If the vantage point chosen is a particular CES, all its participating members contribute to the shades of potentiality. That CES will continue to be in potentiality till such time all the participating BETs in that CES have turned into reality. If the chosen vantage point is an 'independent entity', all its attributes contribute to its shades of potentiality. If one can choose a vantage point of a BET-BET in its most elementary form—with no downstream BETs, such a BET would have no shades of potentiality. There is only one potentiality state, i.e., a class without membership.

Applications and Use Cases: There are any number of use cases and applications that can ride on the back of 'shades of potentiality' and the theorem related thereto. NSL takes a transformational approach by converting all entities in a solution ecosystem into BETs. Developing solutions in NSL is as much an art as it is science. The NSL constructs and tools are so extensive, putting them to creative uses is of immense importance. Features such as sub-transactional classes (that are like adding prefrontal cortex to the solutions), the concept of substrate entity libraries, and shades of potentiality that are partially dealt here are quite transformational. NSL is most differentiated by its BET structure. Once an entity is chosen and converted to a 'BET', it acquires some most significant properties. One of those is the retention of fractal like nature of a 'BET' at all vantage points. This gives complete flexibility to the solutions designer and the transaction performer to apply any kind of contextuality or conditionality to a 'BET'. As discussed, 'contextuality' is one or more BETs being combined with one or more BETs as a situation may warrant; 'Conditionality' is about applying trigger properties to a given context so that the right context can generate events of its own. Each 'BET', no matter what the vantage point is, can be differentiated by attaching any other 'BET' to it. The added BETs become the attributes of chosen BET. It is this flexibility, transparency and simplicity that sets NSL quite apart from any other solution framework. Imagination is the limitation with respect to adding differentiating BETs to any BET at any vantage point.

Parallel CUs: To start with, connected CUs are those that belong to the same GSI ecosystem. The GSI ecosystem includes the main GSI or those that accommodate alternative CUs and alternative GSIs (different scenarios relating to the main GSI). Example: Deliver with 'cash payment' or 'credit card' payment. It is sequential CU (AND) functions that lay down the pathways all the way up to GSI, and alternative CUs (OR) and sequences connected thereto that lead to the same or alternative GSIs. Each alternative GSI is a separate paragraph, but one that belongs to the ecosystem of connected GSIs. If the events generated by a CU crosses the boundary of connected paragraphs and influences events in other paragraphs, those events are called related events. In this background, NSL assess the qualities of 'parallel CUs'.

Parallel CUs have two characteristics: 1) The trigger of these CUs is independent of triggers in the corresponding CUs. 2) For the GSI as a whole to be realized, all the parallel CUs should also have triggered. This is how parallel CUs distinguish themselves from 'alternative CUs'. In case of alternative CUs, once one path is taken, the other path loses its significance. But in case of parallel CUs, the branch to which they belong to also persists for the GSI to be realized. Parallel CUs belong to the main or alternative paragraph of the same connected GSI ecosystem. Parallel CUs are branches of the main or alternative paragraphs wherein they run parallel to given segments of the main or alternative paragraphs.
1. Parallel CU branches: These are made up of one or more CUs.
2. Main CU Pathways: For the sake of simplicity, the segments that belong to the main or alternative paragraphs with respect to 'parallel CU branches' are called 'main CU pathways'.
3. Parallel CU Branch Emanating CUs: These are the CUs from which the parallel branch emanates.
4. Parallel CU Branch Culminating CUs: These are the CUs into which parallel U branches culminate.

Example: Assume that 'CU1-CU2-CU3-CU4-CU5-CU6' represent a GSI. There could be a branch emanating from CU1 that has a characteristic of being a 'parallel CU branch' corresponding to a 'main CU segment'. It could flow in the following manner. CU1-PCU1-PCU2-CU4-CU5.

Wherein PCU stands for 'parallel CU'. In this example, 'CU2 and CU3' represent main CU segment, PCU1 and PCU2 represent 'parallel CU' branch. This parallel CU branch emanates from CU1 and culminates in CU4. This example is represented in FIG. 57.

Shades of Potentiality Theorem in the Context of Parallel CU Branches: Standard 'shades of potentiality theorem' is as follows:

$$((2^{(b-c-e)}) \times (2^{(b-c-e)}) + (2^{(b-c-e)}) \times (2^{(b-c-e)}) + (2^{(b-c-e)}) \times (2^{(b-c-e)}) + (2^{(b-c-e)}) \times \ldots \text{(all the way up to the final CU)} \ldots (2^{(b-c-e)}) + (2^{(b-c-e)})) - 1$$

The 'parallel CU branch' creates a new pathway with respect to the GSI. In those instances, two pathways come to exist. One pathway is with the 'main CU segment' in it and another with the 'parallel CU branch' in it. The 'parallel CU branch' is CU1-PCU1-PCU2-CU4-CU5 . . . . In this example, the path culminates in CU4. Parallel CU branches contribute additional shades of potentiality to the ecosystem of a GSI. The theorem for the additional shades of potentiality is exactly the same as what 'shades of potentiality theorem' dictates. One needs to insert the theorem's mathematical segments for each PCU and the culminating CU, right after the culminating CU. Example: . . . $\times (2^{(b-c-e)}) + (2^{(b-c-e)})$ . . . so on and so forth. That is, shades generated by PCU1-PCU2-CU4. The culminating CU4 shades are influenced by events generated in CU4 from the PCUs in the preceding parallel CU branch. Example: If CU4 has 4 variable BETs, and the events generated in it from the parallel branch are 2, then the permitted CES would be $2^{(4-2)}$, which is 4 permitted CES (or additional shades of potentiality). Total shades of potentiality involving parallel CU branches shall be guided by the standard theorem enumerated under '1' multiplied by shades of potentiality parallel CU branch contributes minus 1. The theorem for shades of potentiality where a parallel branch is present can thus be stated as follows:

(Shades of potentialities in the main pathway)×(Shades of potentialities that parallel CU branch contributes)−1

It is recommended that the mathematical segments relating to the parallel CU branch be inserted right after the culminating CU.

Applications at The Source of Information: In the conceptualization of information, anything distinct and discrete is information. Therefore, all things are informational irrespective of the substrates. Example: Whether the substrate is 'physical', 'life form', image, or natural language, each one of them is carrying varying amounts of information. This example is represented in FIG. 42. In this conceptualization, information is intrinsic to all things in existence. It is not relative to communication as conceptualized by Claude Shannon. While so, information recognized by agents or ignored by agents or unknown to agents is the one that is relative. In this conceptualization, the distinctiveness/discreteness can apply equally to absolute things such as 'pens' or the nature of change itself such as pen being place to the left or right. The 'way world works' dictates that energy causes change and transformations. Which means, energy causes new information. In a world where unrealizable 'absolute zero' temperate is hypothetically achieved, no more new information can get generated. Every recognized change as caused by energy is an event. Events can be random or controlled. It is only in agent systems; events are controlled to obtain certain end objectives. Events are synonymous with new information. The lines between any recognized transformation/change events and information are blurred. All of them are synonymous. NSL organizes controlled changes in the form of connected binary entities or 'BETs'. Since everything is a binary entity connected to other binary entities, an agent can place oneself at any of the vantage points of these combinatorial binary entity states. If the agents are placing oneself at the vantage point of a CU, the downstream connected BETs together create a binary state. Each of these states, like a frame in a film, is connected to other frames in the system. The difference is that each frame encompasses all the downstream entities. Most of the features of NSL, including the statistical features, can be made applicable at each of these vantage point. The ability to apply these features at every vantage point is called as the application of features at the very source of information. Example: One can apply a statistical feature such as 'probability' with respect to the arrival of entity 'A' into a CU. If the vantage point is that entity 'A', one has applied the statistical feature 'probability' to 'A'. If there is a combination of three entities in the same CU, 'A', 'B', and 'C', the statistical feature 'probability' can be applied equally to that 'ABC' combinatorial entity state. From the point of view of vantage point 'ABC', applicability of 'probability' is equally valid.

Past, Present and Future: It is necessary to put 'time' in the right perspective. All solutions arise out of controlled change in agent systems. All change happens in time. The question arises as to what 'time' is? NSL views time as a derivative of the sum-total-of-change in the universe. NSL measures space using standardized 'scales'. NSL measures unchanging space, like the length of a room, with another unchanging scale unit to determine the number of recurring units in the room of that scale. Likewise, NSL measures all of change in the universe with a standardized recurring change in the form of what one can call it as 'time units'. Those can be number of seconds in an hour or number of sun-rises in a year. The world is in a flux as driven by energy. Some changes are predictable and others not. Some changes can be controlled and others not. In the universe, only the present exists. Past is a 'recorded memory' in the present. Future is a memory of anticipation recorded in the present and interestingly, the present is fleeting. It is changing every nano-second, pico-second, and femto-second. There are orders of magnitude smaller fragments of even a femto-second. There are limitations at the level of agents' systems to capture units of time that are smaller than specified. Human agents do not perceive time any less than 100th of a second. 'Present', for human agent, cannot be any smaller than that. Even if the ability to record smaller units of time for a machine agent is much higher, it is only a few orders of magnitude greater than human agents. While these are smallest units of possible 'lengths of presents', the present is relative to agents' choices. Example: To a question such as, 'what are you doing currently?', an agent can relate to it in contextual terms, or relative terms, in many ways. It is this minute, this hour, this day, this year, etc. The vantage points of the present can differ quite widely. These choices have implications on how one communicates, and how one builds solutions. The 'present' does not exist in absolute terms. 'Present' is transient and relative. It only exists relative to how one defines it or wish it to be. The reference points for 'tenses' in natural languages is how one defines the present. One would say, 'I was at such and such place 'minute/hour/day/week/month/year' ago; I am at such and such place this 'minute/hour/day/week/month/year'; I will be at such and such place next 'minute/hour/day/week/month/year'. Notice that conceptualization of present is relative to the context. NSL treats 'time' also as an entity (just as space is also treated as an entity) just as any other entity. When it combines with other entities, or any other combinations, it defines the context of its own existence.

Life Cycle of an Entity: Every entity in the solution ecosystem also has a lifecycle associated with it. Solution level entities tend to live for longer as compared to transaction level entities. Some solution components (say, given CUs) may last for a long time as compared to others. Every entity (solution entity or a transactional entity) will have a date of birth (creation time) and date of death (deletion time) associated with it. Deleted entities can still persist in repositories as may be determined by the designers. When an entity is modified, the old form is dead (deleted) and the new form is born (created). A transactional CU lasts only till such time the transaction is completed. Just like people, not all entities are equally active. This applies equally to solution class entities and transactional class entities. Some entities are used extensively. If an entity is participating in a trigger state, it is considered to be active—otherwise idle.

NSL APIs: Success of NSL will most significantly depend on its ability to coexist with other solutions environments. Its ability to integrate with other solutions and solution components, such as webservices, seamlessly, is vital for its success. NSL contributes to other solution environments and equally benefits from them. NSL APIs preserve the purity of NSL framework by using only natural language constructs in the process.

NSL Grammar: NSL grammar stands for natural solution language grammar. The objective of NSL grammar is to lay ground rules or constraints or limitations that would animate natural languages for the purpose of dealing with solutions. NSL grammar is a grammar within the natural-language-grammar. In other words, NSL grammar is about rules or constraints or limitations within rules or constraints or limitations. For example, NSL grammar shall respect the natural language grammar while it overlays its grammar on top of it. The sentences formed by NSL shall still be grammatically correct from the natural languages' perspective. There are some permitted liberties that NSL takes within bounds for the sake of dealing with solutions effectively. NSL is predicated on the belief that natural languages (in conjunction with mathematical constructs) are also a form of code. Every person is familiar with this from a very young age. That is the reason NSL uses the word 'natural' when it refers to these languages. Programming languages that are artificially created, and are another form of code, have dealt with 'solutions creation' right from the inception of information technology. However, they have alienated human agents from machine agents. NSL corrects this anomaly. It makes solutions fully transparent and many times effective. NSL and NSL grammar take natural languages and convert the parts of speech into BETs. In so doing, NSL animates natural languages to develop solutions of any complexity in any of the natural languages.

NSL grammar piggybacks on natural languages and their grammars. Natural languages are for information (information as traditionally understood), whereas NSL grammar is for solutions. NSL grammar—sits on top of natural languages, makes the entities (parts of speech) more complete, structures them in an NSL compliant way, converts the 'entities' into 'BETS' and the 'BETS' are placed on the technology backbone and NSL runtime environment. NSL grammar—animates natural languages, lets natural languages sense entities in the environment, selects entities from the environment, acts on the available entities to influence the environment, helps agents to realize their objectives and makes solutions in natural languages possible.

NSL Runtime Environment: When any natural language text is natural language grammar compliant and NSL grammar compliant, the natural language text can be written on the NSL runtime environment to create any solution of any complexity. NSL replaces programming languages completely. In addition, it powers the solutions with NSL specific features that place NSL two generations ahead of any programming language based solutions and accelerating the realization of artificial general intelligence.

Figure 44:
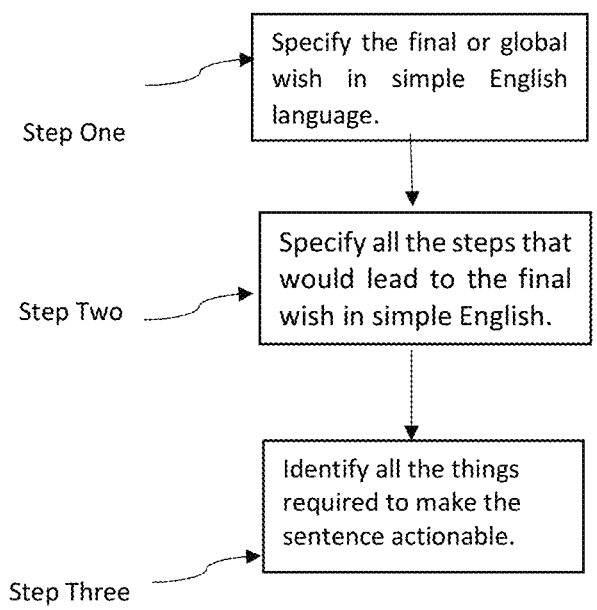
FIG. 44 represents a flow chart of the building solutions process in NSL.

Building Solutions NSL Way: FIG. 44 represents a flow chart of the building solutions process in NSL. For building solutions at the 'elementary' level, the following approach is taken:

Step One: Specify the final or global wish in simple English language active voice sentence.
Example: 'Friend receives letter'
Step Two: Specify all the steps that would lead to the final wish in simple and plain
English.
Example:
A. 'Person writes letter'
B. 'Boy posts letter'
C. 'Postman collects letter'
D. And the like all the way up to the letter being received by 'friend'.
Step Three: Identify all the things required to make the sentence actionable.
A. Inputs:
  1. Agent: In this case it is the 'person'
  2. Things: For the person to write a letter, there is need for,
    i. Pen
    ii. Paper
  3. Attributes: The things may have to have given attributes,
    i. Blue-ink (solution designer could specify this for the pen)
    ii. Dark-shade (this is an attribute of an attribute: dark-shade blue-ink)
    iii. White (this could be the attribute of 'paper')
  4. Action: In the first example of step two above, 'writing' is the action required.
B. Output: In the example above, output is the 'letter'.

Figures 45, 46:
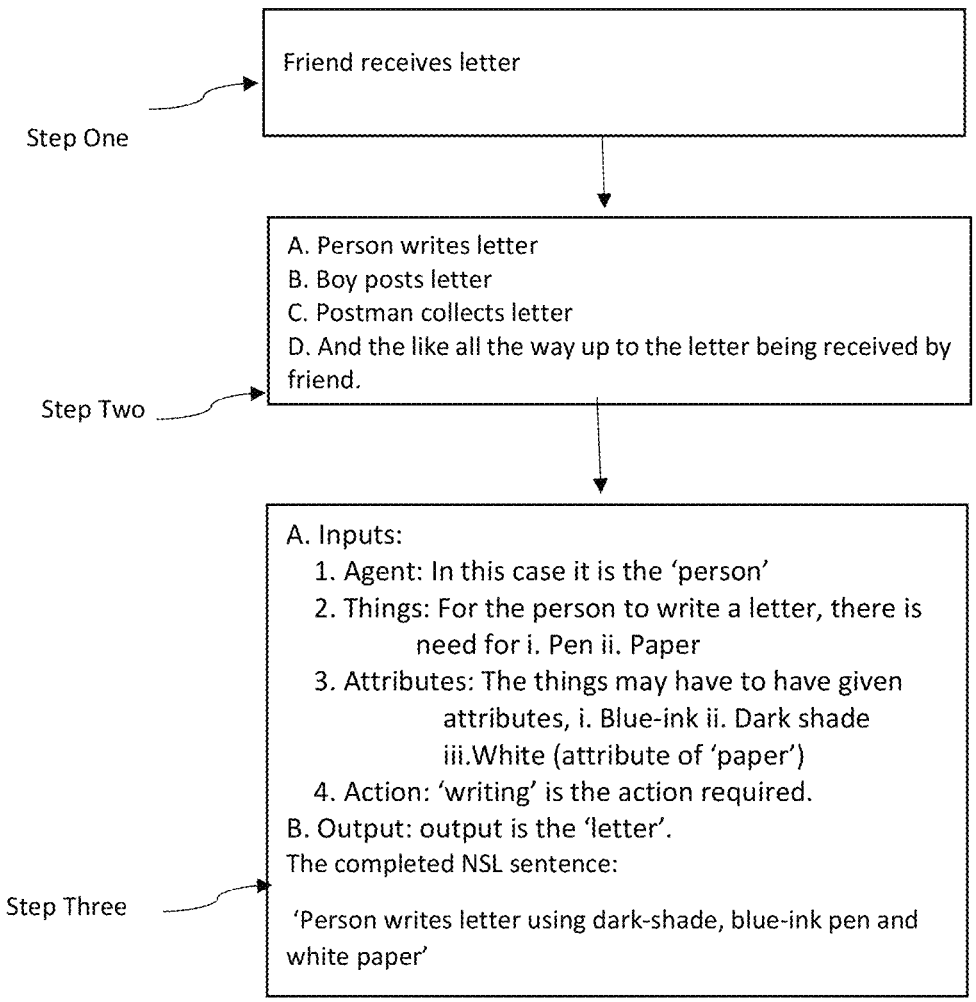
FIG. 45 represents an example of the building solutions process in NSL.
FIG. 46 represents an example of the Parallel CUs.

FIG. 45 represents an example of the building solutions process in NSL. At the most fundamental level, all that needed is to go through all the 'three steps' above. The completed NSL first sentence will read this way as shown herein below: 'Person writes letter using dark-shade, blue-ink pen and white paper'.

All the inputs and outputs that matter shall be first recognized to be existent in the form of classes—what it is called as potentialities.
A. Person—agent
B. Writes—(when it is in the 'wait' mode or potentiality state, it is a 'class')
C. Pen—Thing
D. Paper—Thing
E. Blue-ink—Attribute
F. Dark-shade—Attribute of attribute
G. White—Attribute
H. Letter—Thing The Items 'A' to 'G' are inputs and 'H' is the output as mentioned herein above. When all the inputs arrive—and only when all the inputs arrive—the sentence generates the output. In this case, it is the 'letter'. All inputs arrive into the classes of the sentence in the form of their qualified members. In the parlance of NSL, classes without members are considered to be in 'potentiality state' and classes with members having arrived into them are considered to be in 'reality state'. When all the members of all the classes in a sentence have arrived, the sentence will read this way as shown herein below: 'Person Rama' wrote letter using dark-shade, blue-ink and white paper'.

The first sentence was in grey as all the things that mattered were only at a class level. When members arrive into the classes, the colour changes to red. Because the member that arrived into the class 'person' was quite distinct (say Rama vs John vs Peter), such member was clearly stated. But in instances where the arriving members were undifferentiated ones, such as a paper or a pen, it was enough to change the colour (only class is grey and class with a member is red). Notice that differentiating attribute classes precede the things and arriving members succeed the class. Example: Class 'Person' was succeeded by the member 'Rama'. The designers have the flexibility to use nodes, lines, directionality settings, boxes, colours, superscripts, toggling mechanisms to make the understanding and experience of the user special.

Turning the Dial: In NSL, the teams have put the toggle from fat to flat sentences on a firm ground. In NSL, there is a process to convert 'fat sentences-to-programming-languages' and 'programming-languages-to-fat-sentences,' for all languages. NSL intends to turn the dial so that one can build solutions in natural languages directly (flat sentences) and toggle them to network of nodes structures (fat sentences). It is more or less established that NSL grammar based solutions will accelerate the process of developing solutions to a significant degree and solution development is more intuitive and fun.

Figure 47A:
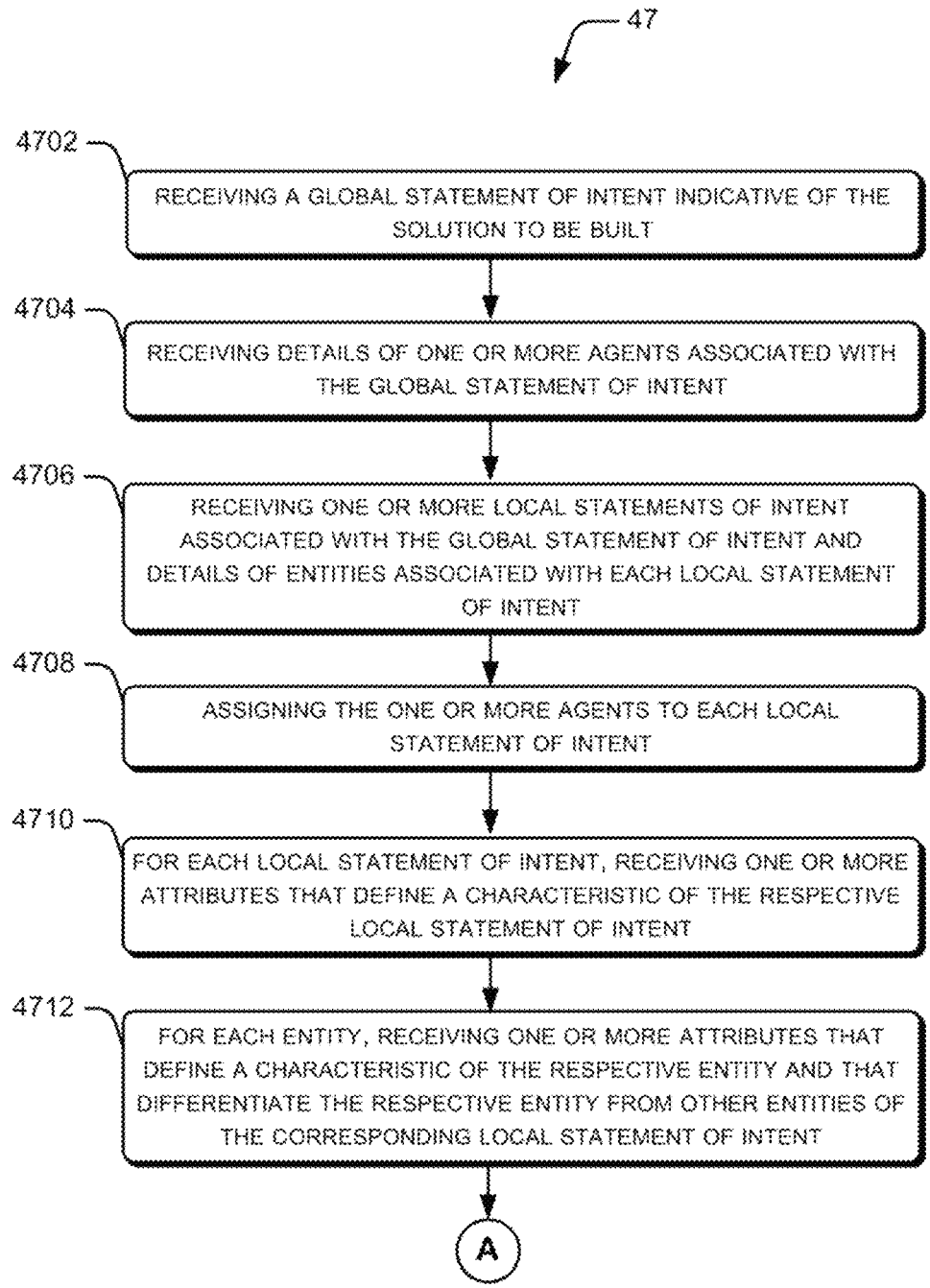
FIGS. 47a, 47b, and 47c represent a flowchart depicting a method for building a computer-implemented solution using a natural language understood by users and without using programming codes.
Figure 47B:
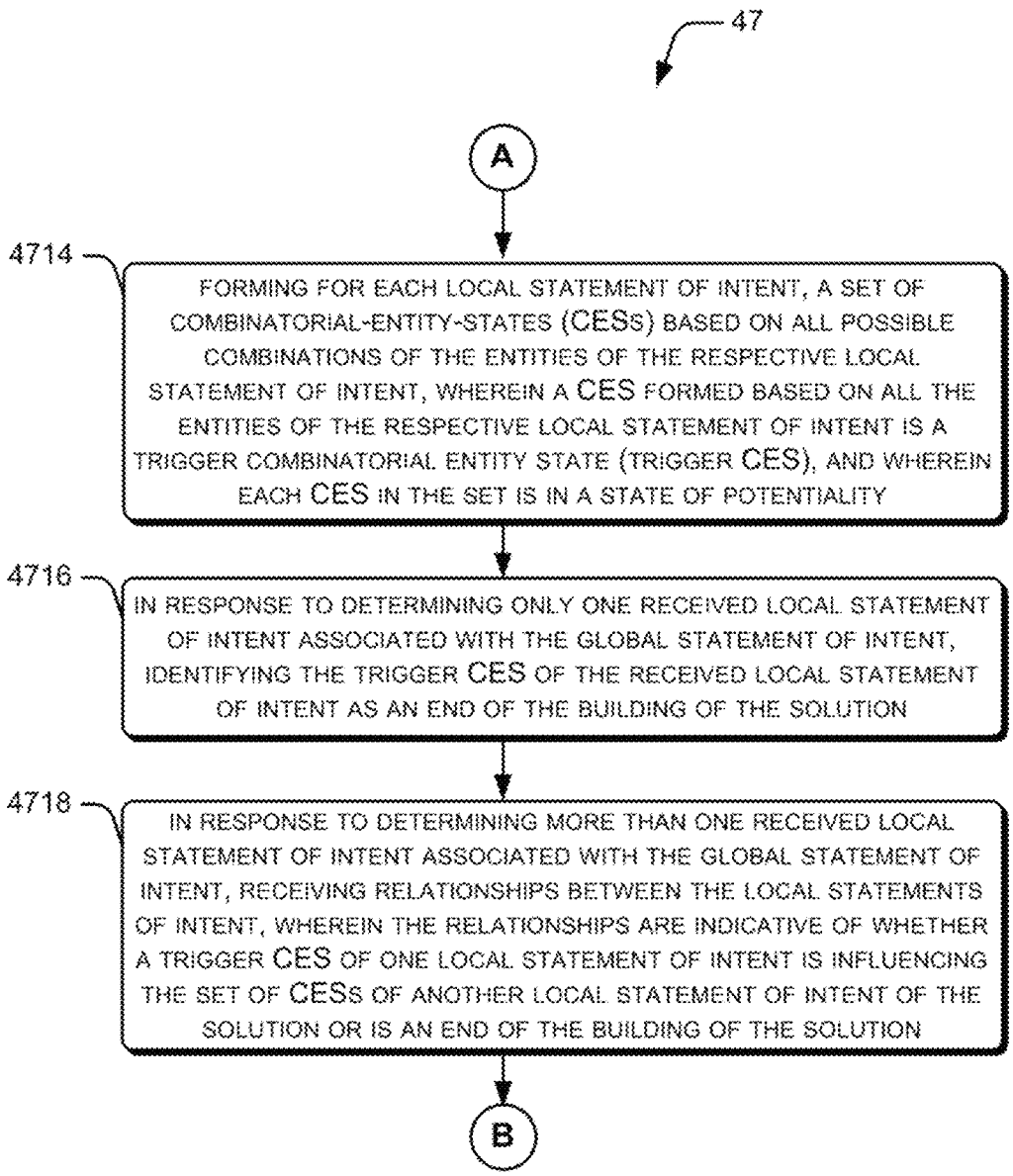
Figure 47C:
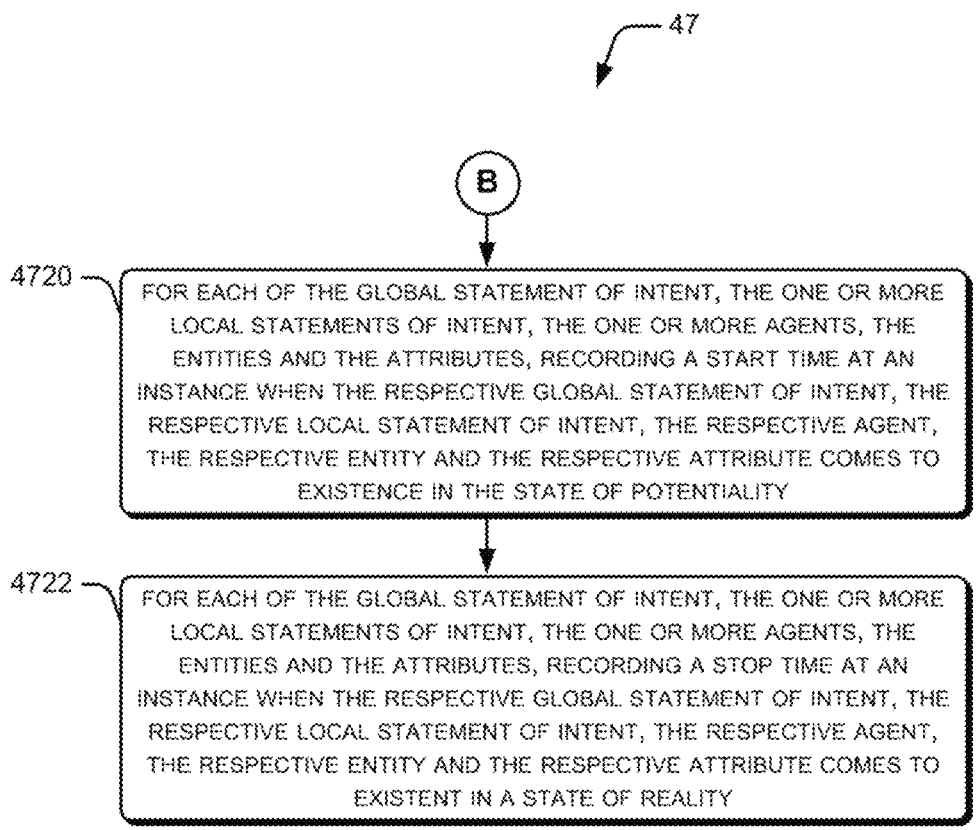

FIG. 47 represents a flowchart depicting a method 47 for building a computer-implemented solution using a natural language understood by users and without using programming codes. According to the method, at step 4702, a global statement of intent indicative of the solution to be built is received by a processor of a computing device from a user. The global statement of intent is received in a form of the natural language and is set in a state of potentiality. At step 4704, details of one or more agents associated with the global statement of intent are received by the processor from the user. An agent is a human agent or a machine agent that executes the solution. The details of the one or more agents are received in a form of the natural language and each agent is set in a state of potentiality. Further, at step 4706, one or more local statements of intent associated with the global statement of intent and details of entities associated with each local statement of intent are received by the processor from the user. Each local statement of intent and the details of each entity are received in a form of the natural language and are respectively set in a state of potentiality. Each local statement of intent is indicative of a step for building the solution and each entity participates in the step indicated by the corresponding local statement of intent. At step, 4708, the one or more agents are assigned, by the processor, to each local statement of intent. The details of the agent assigned to the local statement of intent are modifiable by the user. At step, 4710, for each local statement of intent, one or more attributes that define a characteristic of the respective local statement of intent are received by the processor from the user in a form of the natural language. Further, at step 4712, for each entity, one or more attributes that define a characteristic of the respective entity and that differentiate the respective entity from other entities of the corresponding local statement of intent are received by the processor from the user in a form of the natural language. At step 4714, for each local statement of intent, a set of combinatorial-entity-states (CESs) are formed, by the processor, based on all possible combinations of the entities of the respective local statement of intent. A CES formed based on all the entities of the respective local statement of intent is a trigger combinatorial entity state (trigger CES), and each CES in the set is in a state of potentiality. At step 4716, in response to determining only one received local statement of intent associated with the global statement of intent, the trigger CES of the received local statement of intent is identified as an end of the building of the solution. At step 4718, in response to determining more than one received local statement of intent associated with the global statement of intent, relationships between the local statements of intent are received by the processor from the user in a form of the natural language. The relationships are indicative of whether a trigger CES of one local statement of intent is influencing the set of CESs of another local statement of intent of the solution or is an end of the building of the solution. At step 4720, for each of the global statement of intent, the one or more local statements of intent, the one or more agents, the entities and the attributes, a start time is recorded, by the processor, at an instance when the respective global statement of intent, the respective local statement of intent, the respective agent, the respective entity and the respective attribute comes to existence in the state of potentiality. Further, at step 4722, for each of the global statement of intent, the one or more local statements of intent, the one or more agents, the entities and the attributes, a stop time is recorded, by the processor, at an instance when the respective global statement of intent, the respective local statement of intent, the respective agent, the respective entity and the respective attribute come to existent in a state of reality.

Figure 48:
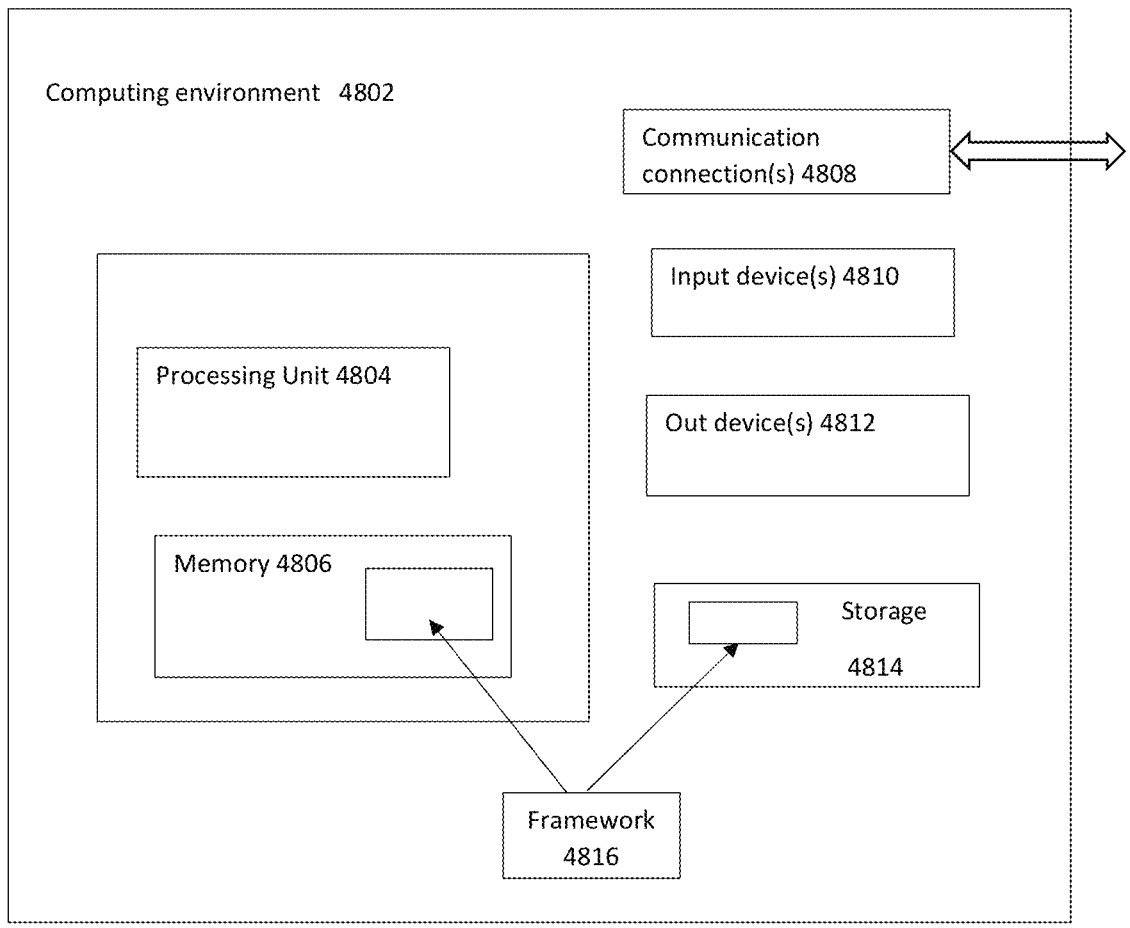
FIG. 48 represents a generalized computer network arrangement for NSL.

NSL may be implemented in or involve one or more computer systems. FIG. 48 shows a generalized example of a computing environment 4802. The computing environment 4802 is not intended to suggest any limitation as to scope of use or functionality of described embodiments.

With reference to FIG. 48, the computing environment 4802 includes at least one processing unit 4804 and memory 4806. The processing unit 4804 executes computer-executable instructions and may be a real or a virtual processor. In a multi-processing system, multiple processing units execute computer-executable instructions to increase processing power. The memory 4806 may be volatile memory (e.g., registers, cache, RAM), non-volatile memory (e.g., ROM, EEPROM, flash memory, etc.), or some combination of the two. In some embodiments, the memory 4806 stores Framework 4816 implementing described techniques.

A computing environment may have additional features. For example, the computing environment 4802 includes storage 4814, one or more input devices 4810, one or more output devices 4812, and one or more communication connections 4808. An interconnection mechanism (not shown) such as a bus, controller, or network interconnects the components of the computing environment 4802. Typically, operating system software (not shown) provides an operating environment for other software executing in the computing environment 4802, and coordinates activities of the components of the computing environment 4802.

The storage 4814 may be removable or non-removable, and includes magnetic disks, magnetic tapes or cassettes, CD-ROMs, CD-RWs, DVDs, or any other medium which may be used to store information, and which may be accessed within the computing environment 4802. In some embodiments, the storage 4814 stores instructions for the framework 4816.

The input device(s) 4810 may be a touch input device such as a keyboard, mouse, pen, trackball, touch screen, or game controller, a voice input device, a scanning device, a digital camera, or another device that provides input to the computing environment 4802. The output device(s) 4812 may be a display, printer, speaker, or another device that provides output from the computing environment 4802.

The communication connection(s) 4808 enables communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 4802, computer-readable media include memory 4806, storage 4814, communication media, and combinations of any of the above.

Having described and illustrated the principles of our disclosure with reference to the described embodiments, it will be recognized that the described embodiments may be modified in arrangement and detail without departing from such principles. In view of the many possible embodiments to which the principles of our disclosure may be applied, we claim as our disclosure all such embodiments as may come within the scope and spirit of the claims and equivalents thereto.

While the present disclosure has been related in terms of the foregoing embodiments, those skilled in the art will recognize that the disclosure is not limited to the embodiments depicted. The present disclosure may be practiced with modification and alteration within the spirit and scope of the appended claims. Thus, the description is to be regarded as illustrative instead of restrictive on the present disclosure.

As will be appreciated by those of ordinary skill in the art, the foregoing example, demonstrations, and method steps may be implemented by suitable code on a processor-based system, such as a general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skill in the art, may be stored or adapted for storage in one or more tangible machine-readable media, such as on memory chips, local or remote hard disks, optical disks or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The detailed description is presented to enable a person of ordinary skill in the art to make and use the disclosure and is provided in the context of the requirement for obtaining a patent. The present description is the best presently contemplated method for carrying out the present disclosure. Various modifications to the preferred embodiment will be readily apparent to those skilled in the art and the generic principles of the present disclosure may be applied to other embodiments, and some features of the present disclosure may be used without the corresponding use of other features. Accordingly, the present disclosure is not intended to be limited to the embodiment shown but is to be accorded the widest scope consistent with the principles and features described herein.

The present subject matter, in accordance with an example implementation, relates to a method for building a computer-implemented solution using a natural language understood by users and without using programming codes, the method comprising: receiving, by a processor of a computing device from a user, a global statement of intent indicative of the solution to be built, wherein the global statement of intent is received in a form of the natural language and is set in a state of potentiality; receiving, by the processor from the user, details of one or more agents associated with the global statement of intent, wherein an agent is a human agent or a machine agent that executes the solution, wherein the details of the one or more agents are received in a form of the natural language and each agent is set in a state of potentiality; receiving, by the processor from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assigning, by the processor, the one or more agents to each local statement of intent, wherein the details of the agent assigned to the local statement of intent are modifiable by the user; for each local statement of intent, receiving, by the processor from the user in a form of the natural language, one or more attributes that define a characteristic of the respective local statement of intent; for each entity, receiving, by the processor from the user in a form of the natural language, one or more attributes that define a characteristic of the respective entity and that differentiate the respective entity from other entities of the corresponding local statement of intent; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identifying the trigger CES of the received local statement of intent as an end of the building of the solution; in response to determining more than one received local statement of intent associated with the global statement of intent, receiving, by the processor from the user in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, recording, by the processor, a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, recording, by the processor, a stop time at an instance when the respective global statement of intent, the respective local statement of intent, the respective agent, the respective entity and the respective attribute comes to existent in a state of reality In accordance with an example implementation, the above described method comprises, for each of the global statement of intent, the one or more local statements of intent, the one or more agents, the entities and the attributes, recording, by the processor, geographical location coordinates at an instance when the respective global statement of intent, the respective local statement of intent, the respective agent, the respective entity and the respective attribute comes to existence in the state of potentiality.

In accordance with an example implementation, the above described method comprises: for each of the global statement of intent, the one or more local statements of intent, the one or more agents, the entities and the attributes, recording, by the processor, geographical location coordinates at an instance when the respective global statement of intent, the respective local statement of intent, the respective agent, the respective entity and the respective attribute comes to existence in the state of reality.

In accordance with an example implementation, the above described method comprises: for a local statement of intent, receiving, by the processor from the user in a form of the natural language, one or more sub-local statements of intent and details of entities associated with each sub-local statement of intent, wherein each sub-local statement of intent and each entity are respectively set in a state of potentiality, wherein each sub-local statement of intent is indicative of a step for building the solution, wherein each entity participates in the step indicated by the corresponding sub-local statement of intent; assigning, by the processor, the one or more agents to each sub-local statement of intent, wherein the details of the agent assigned to the local statement of intent are modifiable by the user; for each sub-local statement of intent, receiving, by the processor from the user in a form of the natural language, one or more attributes that define a characteristic of the respective sub-local statement of intent; for each entity, receiving, by the processor from the user in a form of the natural language, one or more attributes that define a characteristic of the respective entity and that differentiate the respective entity from other entities of the corresponding sub-local statement of intent; forming, by the processor, for each sub-local statement of intent, a set of CESs based on all possible combinations of the entities of the respective sub-local statement of intent, wherein a CES formed based on all the entities of the respective sub-local statement of intent is a trigger CES, and wherein each CES in the set is in a state of potentiality; and receiving, by the processor from the user in a form of the natural language, relationships between the local statements of intent and the one or more sub-local statements of intent, wherein the relationships are indicative of whether a trigger CES of one local statement of intent is influencing the set of CESs of a sub-local statement of intent, and wherein the relationships are indicative of whether a trigger CES of one sub-local statement of intent is influencing the set of CESs of a local statement of intent or is an end of the building of the solution.

In accordance with an example implementation, when the solution is executed, the above described method comprises: for a local statement of intent, receiving, by the processor from an agent in a form of the natural language, one or more sub-local statements of intent and details of entities associated with each sub-local statement of intent, wherein each sub-local statement of intent and each entity are respectively set in a state of potentiality, wherein each sub-local statement of intent is indicative of a step for building the solution, wherein each entity participates in the step indicated by the corresponding sub-local statement of intent; assigning, by the processor, the one or more agents to each sub-local statement of intent, wherein the details of the agent assigned to the sub-local statement of intent are modifiable by the agent; for each sub-local statement of intent, receiving, by the processor from an agent in a form of the natural language, one or more attributes that define a characteristic of the respective sub-local statement of intent; for each entity, receiving, by the processor from an agent in a form of the natural language, one or more attributes that define a characteristic of the respective entity and that differentiate the respective entity from other entities of the corresponding sub-local statement of intent; forming, by the processor, for each sub-local statement of intent, a set of CESs based on all possible combinations of the entities of the respective sub-local statement of intent, wherein a CES formed based on all the entities of the respective sub-local statement of intent is a trigger CES, and wherein each CES in the set is in a state of potentiality; and receiving, by the processor from an agent in a form of the natural language, relationships between the local statement of intent and the one or more sub-local statements of intent, wherein the relationships are indicative of whether a trigger CES of one sub-local statement of intent is influencing the set of CESs of another sub-local statement of intent or is influencing the set of CESs of the local statement of intent.

In accordance with an example implementation, the above described method comprises, for each entity of each local statement of intent: receiving, by the processor from the associated agent, a value against the respective entity, wherein receiving the value against the respective entity is recordation of an event to change the state of potentiality to a state of reality for the respective entity based on the received value, wherein the value is an input in a form of the natural language, a programming language, an image, biometrics, and gesture, wherein the natural language is in a form of a text or speech.

In accordance with an example implementation, at least one of the global statement of intent, the one or more local statements of intent, the one or more agents, the entities and the attributes comes to existence in the state of potentiality during execution of the solution upon fulfilment of one or more predefined conditions.

In accordance with an example implementation, the above described method comprises: receiving, by the processor from the user in a form of the natural language, user inputs to configure a user interface through which information associated with the global statement of intent, the one or more local statements of intent, the one or more agents, the entities and the attributes is received during execution of the solution, wherein the user interface is dynamically adjustable based on a display property of a display device.

In accordance with an example implementation, the above described method comprises: parsing, by the processor, the received information associated with the global statement of intent, the one or more local statements of intent, the one or more agents, the entities and the attributes; and correcting, by the processor, the parsed information based on a communication with a natural solution language grammar database to make one or more grammatical corrections in the information.

In accordance with an example implementation, the above described method comprises: parsing, by the processor, the received information associated with the global statement of intent, the one or more local statements of intent, the one or more agents, the entities and the attributes; and removing, by the processor, redundant text from the parsed information based on a communication with a natural solution language grammar database.

In accordance with an example implementation, the above described method comprises: auto-populating, by the processor, the one or more local statements of intent, or the one or more agents, or the one or more entities, or the one or more attributes, or a combination thereof based on the received global statement of intent, wherein the auto-populating is based on a communication with a natural solution language grammar database.

In accordance with an example implementation, the local statements of intent comprise two or more parallel local statements of intent, wherein: a trigger CES of one local statement of intent influences the sets of CESs of the two or more parallel local statements of intent; and trigger CESs of the two or more parallel local statements of intent influence the set of CESs of another local statement of intent or is end of the building of the solution.

In accordance with an example implementation, the local statements of intent comprise two or more alternate local statements of intent, wherein: a trigger CES of one local statement of intent influences the sets of CESs of the two or more alternate local statements of intent; and a trigger CES of one of the two or more alternate local statements of intent influence the set of CESs of another local statement of intent or is end of the building of the solution.

In accordance with an example implementation, the local statements of intent comprise a nested local statement of intent, wherein a trigger CES of the nested local statement of intent influences a set of CESs of a local statement of intent of another solution.

In accordance with an example implementation, the local statements of intent comprise a recursive local statement of intent, wherein a trigger CES of the recursive local statement of intent influences the set of CESs of another local statement of intent or is end of the building of the solution after N iterations, wherein N is more than 1.

In accordance with an example implementation, the above described method comprises: receiving, by the processor from the user in a form of a natural language, details of two or more substitute entities associated with a local statement of intent, wherein each of the two or more substitute entities is respectively set in a state of potentiality, wherein one of the two or more substitute entities participates in the step indicated by the corresponding local statement of intent and other of the two or more substitute entities are not part of a trigger CES.

In accordance with an example implementation, the above described method comprises: determining, by the processor, a number of potentiality states associated with the solution based on: $((2^{(b_1-c_1-e_1)})\times(2^{(b_2-c_2-e_2)})+(2^{(b_2-c_2-e_2)})\times(2^{(b_3-c_3-e_3)})+\ldots+(2^{(b_{K-1}-c_{K-1}-e_{K-1})})\times(2^{(b_K-c_K-e_K)})+(2^{(b_K-c_K-e_K)}))-1$, where K is the total number of local statements of intent, N is the total number of entities, attributes and agents associated with the $i^{th}$ local statement of intent, $c_1$ is the total number of entities, attributes and agents associated with the $i^{th}$ local statement of intent that are constants, $e_i$ is the number of trigger CESs that influence the $i^{th}$ local statement of intent.

In accordance with an example implementation, the above described method comprises: communicating, by the processor, with an external system using one or more natural solution language application programming interfaces (NSL APIs).

In accordance with an example implementation, the above described method comprises: generating, by the processor, one or more reports based on values of the global statement of intent, the one or more local statement of intent, the one or more entities, the one or more attributes, the one or more agents, wherein the one or more reports are generated based on one or more predefined techniques.

In accordance with an example implementation, the above described method comprises: analyzing, by the processor, values of the global statement of intent, the one or more local statement of intent, the one or more entities, the one or more attributes, the one or more agents; and drawing, by the processor, one or more logical inferences based on the analysis, wherein the one or more logical inferences are drawn based on one or more predefined models.

In accordance with an example implementation, the above described method comprises: if the agent associated with a local statement of intent is a machine agent, then: receiving, by the processor from a robotic process automation engine, inputs to add a new sub-local statement of intent to the local statement of intent and one or more new entities and attributes to the new sub-local statement of intent; receiving, by the processor from the robotic process automation engine, inputs to add one or more new entities and attributes to the local statement of intent; or receiving, by the processor from the robotic process automation engine, inputs to modify the local statement of intent or the associated entities or the associated attributes.

The present subject matter, in accordance with an example implementation, relates to a method for building a computer-implemented solution using a natural language understood by users and without using programming codes, the method comprising: providing a prompt, by a processor of a computing device, to a user to input a global statement of intent indicative of the solution to be built, wherein the global statement of intent is received in a form of the natural language and is set in a state of potentiality; providing a prompt, by the processor, to the user to input details of one or more agents associated with the global statement of intent, wherein an agent is a human agent or a machine agent that executes the solution, wherein the details of the one or more agents are received in a form of the natural language and each agent is set in a state of potentiality; providing a prompt, by the processor, to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assigning, by the processor, the one or more agents to each local statement of intent, wherein the details of the agent assigned to the local statement of intent are modifiable by the user; for each local statement of intent, providing a prompt, by the processor, to the user to input, in a form of the natural language, one or more attributes that define a characteristic of the respective local statement of intent; for each entity, providing a prompt, by the processor, to the user to input, in a form of the natural language, one or more attributes that define a characteristic of the respective entity and that differentiate the respective entity from other entities of the corresponding local statement of intent; forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identifying the trigger CES of the received local statement of intent as an end of the building of the solution; in response to determining more than one received local statement of intent associated with the global statement of intent, providing a prompt, by the processor, to the user to input, in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, recording, by the processor, a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, recording, by the processor, a stop time at an instance when the respective global statement of intent, the respective local statement of intent, the respective agent, the respective entity and the respective attribute comes to existent in a state of reality.

The present subject matter, in accordance with an example implementation, relates to a computing device for building a computer-implemented solution using a natural language understood by users and without using programming codes, the computing device comprising: a processor; and a memory coupled to the processor, the memory comprising instructions executable by the processor to: receive, from a user, a global statement of intent indicative of the solution to be built, wherein the global statement of intent is received in a form of the natural language and is set in a state of potentiality; receive, from the user, details of one or more agents associated with the global statement of intent, wherein an agent is a human agent or a machine agent that executes the solution, wherein the details of the one or more agents are received in a form of the natural language and each agent is set in a state of potentiality; receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assign the one or more agents to each local statement of intent, wherein the details of the agent assigned to the local statement of intent are modifiable by the user; for each local statement of intent, receive from the user in a form of the natural language, one or more attributes that define a characteristic of the respective local statement of intent; for each entity, receive from the user in a form of the natural language, one or more attributes that define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

The present subject matter, in accordance with an example implementation, relates to a computing device for building a computer-implemented solution using a natural language understood by users and without using programming codes, the computing device comprising: means to receive, from a user, a global statement of intent indicative of the solution to be built, wherein the global statement of intent is received in a form of the natural language and is set in a state of potentiality; means to receive, from the user, details of one or more agents associated with the global statement of intent, wherein an agent is a human agent or a machine agent that executes the solution, wherein the details of the one or more agents are received in a form of the natural language and each agent is set in a state of potentiality; means to receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; means to assign the one or more agents to each local statement of intent, wherein the details of the agent assigned to the local statement of intent are modifiable by the user; for each local statement of intent, means to receive from the user in a form of the natural language, one or more attributes that define a characteristic of the respective local statement of intent; for each entity, means to receive from the user in a form of the natural language, one or more attributes that define a characteristic of the respective entity and that differentiate the respective entity from other entities of the corresponding local statement of intent; means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, means to identify the trigger CES of the received local statement of intent as an end of the building of the solution; in response to determining more than one received local statement of intent associated with the global statement of intent, means to receive from the user in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, means to record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, means to record a stop time at an instance when the respective global statement of intent, the respective local statement of intent, the respective agent, the respective entity and the respective attribute comes to existent in a state of reality.

The present subject matter, in accordance with an example implementation, relates to a computing device for building a computer-implemented solution using a natural language understood by users and without using programming codes, the computing device comprising: a processor; and a memory coupled to the processor, the memory comprising instructions executable by the processor to perform the above-described methods.

The present subject matter, in accordance with an example implementation, relates to a computing device for building a computer-implemented solution using a natural language understood by users and without using programming codes, the computing device comprising: a processor; and a memory coupled to the processor, the memory comprising instructions executable by the processor to: provide a prompt to a user to input a global statement of intent indicative of the solution to be built, wherein the global statement of intent is received in a form of the natural language and is set in a state of potentiality; provide a prompt to the user to input details of one or more agents associated with the global statement of intent, wherein an agent is a human agent or a machine agent that executes the solution, wherein the details of the one or more agents are received in a form of the natural language and each agent is set in a state of potentiality; provide a prompt to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assign the one or more agents to each local statement of intent, wherein the details of the agent assigned to the local statement of intent are modifiable by the user; for each local statement of intent, provide a prompt to the user to input, in a form of the natural language, one or more attributes that define a characteristic of the respective local statement of intent; for each entity, provide a prompt to the user to input, in a form of the natural language, one or more attributes that define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; in response to determining more than one received local statement of intent associated with the global statement of intent, provide a prompt to the user to input, in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

The present subject matter, in accordance with an example implementation, relates to a computing device for building a computer-implemented solution using a natural language understood by users and without using programming codes, the computing device comprising: means to provide a prompt to a user to input a global statement of intent indicative of the solution to be built, wherein the global statement of intent is received in a form of the natural language and is set in a state of potentiality; means to provide a prompt to the user to input details of one or more agents associated with the global statement of intent, wherein an agent is a human agent or a machine agent that executes the solution, wherein the details of the one or more agents are received in a form of the natural language and each agent is set in a state of potentiality; means to provide a prompt to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; means to assign the one or more agents to each local statement of intent, wherein the details of the agent assigned to the local statement of intent are modifiable by the user; for each local statement of intent, means to provide a prompt to the user to input, in a form of the natural language, one or more attributes that define a characteristic of the respective local statement of intent; for each entity, means to provide a prompt to the user to input, in a form of the natural language, one or more attributes that define a characteristic of the respective entity and that differentiate the respective entity from other entities of the corresponding local statement of intent; means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, means to identify the trigger CES of the received local statement of intent as an end of the building of the solution; in response to determining more than one received local statement of intent associated with the global statement of intent, means to provide a prompt to the user to input, in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, means to record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, means to record a stop time at an instance when the respective global statement of intent, the respective local statement of intent, the respective agent, the respective entity and the respective attribute comes to existent in a state of reality.

The present subject matter, in accordance with an example implementation, relates to a computing device for building a computer-implemented solution using a natural language understood by users and without using programming codes, the computing device comprising: a processor; and a memory coupled to the processor, the memory comprising instructions executable by the processor to perform the above-described method.

The present subject matter, in accordance with an example implementation, relates to a non-transitory computer-readable medium having stored thereon instructions for building a computer-implemented solution using a natural language understood by users and without using programming codes comprising machine executable code which when executed by a processor, causes the processor to: receive, from a user, a global statement of intent indicative of the solution to be built, wherein the global statement of intent is received in a form of the natural language and is set in a state of potentiality; receive, from the user, details of one or more agents associated with the global statement of intent, wherein an agent is a human agent or a machine agent that executes the solution, wherein the details of the one or more agents are received in a form of the natural language and each agent is set in a state of potentiality; receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assign the one or more agents to each local statement of intent, wherein the details of the agent assigned to the local statement of intent are modifiable by the user; for each local statement of intent, receive from the user in a form of the natural language, one or more attributes that define a characteristic of the respective local statement of intent; for each entity, receive from the user in a form of the natural language, one or more attributes that define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

The present subject matter, in accordance with an example implementation, relates to a non-transitory computer-readable medium having stored thereon instructions for building a computer-implemented solution using a natural language understood by users and without using programming codes comprising machine executable code which when executed by a processor, causes the processor to: provide a prompt to a user to input a global statement of intent indicative of the solution to be built, wherein the global statement of intent is received in a form of the natural language and is set in a state of potentiality; provide a prompt to the user to input details of one or more agents associated with the global statement of intent, wherein an agent is a human agent or a machine agent that executes the solution, wherein the details of the one or more agents are received in a form of the natural language and each agent is set in a state of potentiality; provide a prompt to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assign the one or more agents to each local statement of intent, wherein the details of the agent assigned to the local statement of intent are modifiable by the user; for each local statement of intent, provide a prompt to the user to input, in a form of the natural language, one or more attributes that define a characteristic of the respective local statement of intent; for each entity, provide a prompt to the user to input, in a form of the natural language, one or more attributes that define a characteristic of the respective entity and that differentiate the respective entity from other entities of the corresponding local statement of intent; form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; in response to determining more than one received local statement of intent associated with the global statement of intent, provide a prompt to the user to input, in a form of the natural language, relationships between the local statements of intent, wherein the relationships are indicative of whether a trigger CES of one local statement of intent is influencing the set of CESs of another local statement of intent of the solution or is an end of the building of the solution; for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

Figure 49:
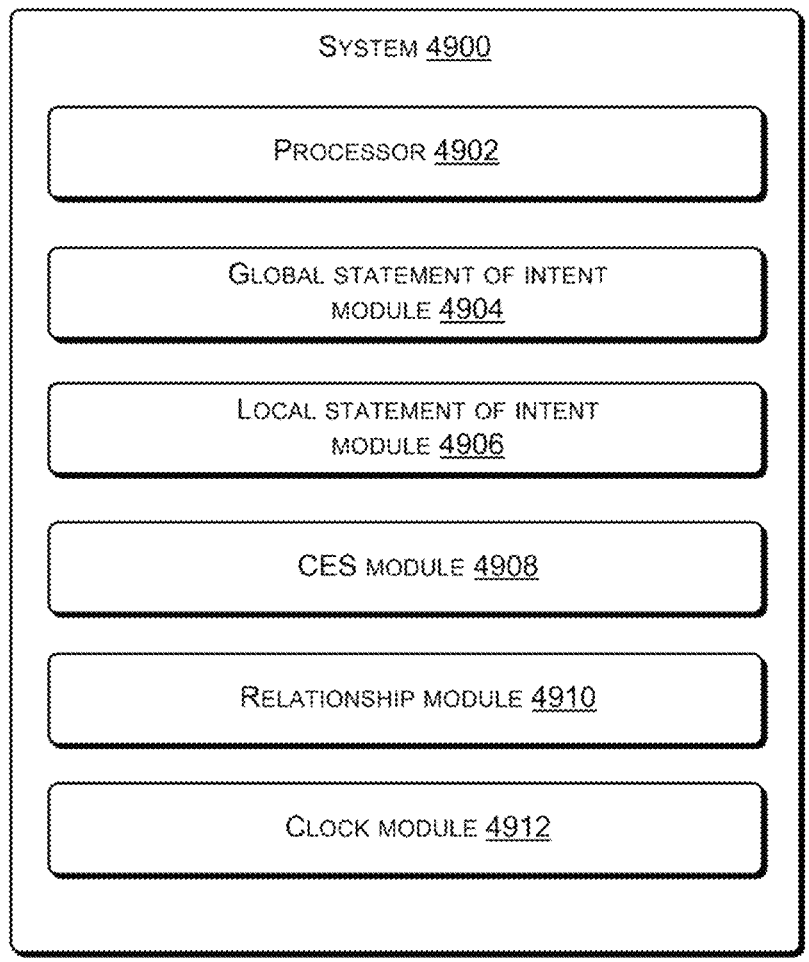
FIG. 49 represents a system for designing and deploying a computer-implemented solution.

The present subject matter, in accordance with an example implementation, relates to a system 4900 (refer to FIG. 49) for building a computer-implemented solution using a natural language understood by users and without using programming codes, the system comprising: a processor 4902; and a global statement of intent module 4904, a local statement of intent module 4906, a CES module 4908, a relationship module 4910, and a clock module 4912 coupled to the processor 4902, wherein the global statement of intent module, the local statement of intent module, the CES module, the relationship module, and the clock module are operatively connected to each other, wherein the global statement of intent module is configured to: receive, from a user, a global statement of intent indicative of the solution to be built, wherein the global statement of intent is received in a form of the natural language and is set in a state of potentiality; and receive, from the user, details of one or more agents associated with the global statement of intent, wherein an agent is a human agent or a machine agent that executes the solution, wherein the details of the one or more agents are received in a form of the natural language and each agent is set in a state of potentiality; the local statement of intent module is configured to: receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent; assign the one or more agents to each local statement of intent, wherein the details of the agent assigned to the local statement of intent are modifiable by the user; for each local statement of intent, receive from the user in a form of the natural language, one or more attributes that define a characteristic of the respective local statement of intent; for each entity, receive from the user in a form of the natural language, one or more attributes that define a characteristic of the respective entity and that differentiate the respective entity from other entities of the corresponding local statement of intent; the CES module is configured to: form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality; in response to determining only one received local statement of intent associated with the global statement of intent, identify the trigger CES of the received local statement of intent as an end of the building of the solution; the relationship module is configured to, in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent of the solution or is an end of the building of the solution; and the clock module is configured to: for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

I claim:

1. A method for building a computer-implemented solution using a natural language understood by users and without using programming codes, the method comprising:
receiving, by a processor of a computing device from a user, a global statement of intent indicative of the solution to be built, wherein the global statement of intent is received in a form of the natural language and is set in a state of potentiality;
receiving, by the processor from the user, details of one or more agents associated with the global statement of intent, wherein an agent is a human agent or a machine agent that executes the solution, wherein the details of the one or more agents are received in a form of the natural language and each agent is set in a state of potentiality;
receiving, by the processor from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;
assigning, by the processor, the one or more agents to each local statement of intent, wherein the details of the agent assigned to the local statement of intent are modifiable by the user;
for each local statement of intent, receiving, by the processor from the user in a form of the natural language, one or more attributes that define a characteristic of the respective local statement of intent;
for each entity, receiving, by the processor from the user in a form of the natural language, one or more attributes that define a characteristic of the respective entity and that differentiate the respective entity from other entities of the corresponding local statement of intent;
forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;
in response to determining only one received local statement of intent associated with the global statement of intent, identifying the trigger CES of the received local statement of intent as an end of the building of the solution;
in response to determining more than one received local statement of intent associated with the global statement of intent, receiving, by the processor from the user in a form of the natural language, relationships between the local statements of intent, wherein the relationships are indicative of whether a trigger CES of one local statement of intent is influencing the set of CESs of another local statement of intent of the solution or is an end of the building of the solution;
for each of the global statement of intent, the one or more local statements of intent, the one or more agents, the entities and the attributes, recording, by the processor, a start time at an instance when the respective global statement of intent, the respective local statement of intent, the respective agent, the respective entity and the respective attribute comes to existence in the state of potentiality; and
for each of the global statement of intent, the one or more local statements of intent, the one or more agents, the entities and the attributes, recording, by the processor, a stop time at an instance when the respective global statement of intent, the respective local statement of intent, the respective agent, the respective entity and the respective attribute comes to existent in a state of reality.

2. The method of claim 1, wherein the method further comprises:
for each of the global statement of intent, the one or more local statements of intent, the one or more agents, the entities and the attributes, recording, by the processor, geographical location coordinates at an instance when the respective global statement of intent, the respective local statement of intent, the respective agent, the respective entity and the respective attribute comes to existence in the state of potentiality.

3. The method of claim 1, wherein the method further comprises:
for each of the global statement of intent, the one or more local statements of intent, the one or more agents, the entities and the attributes, recording, by the processor, geographical location coordinates at an instance when the respective global statement of intent, the respective local statement of intent, the respective agent, the respective entity and the respective attribute comes to existence in the state of reality.

4. The method of claim 1, wherein the method further comprises:
for a local statement of intent, receiving, by the processor from the user in a form of the natural language, one or more sub-local statements of intent and details of entities associated with each sub-local statement of intent, wherein each sub-local statement of intent and each entity are respectively set in a state of potentiality, wherein each sub-local statement of intent is indicative of a step for building the solution, wherein each entity participates in the step indicated by the corresponding sub-local statement of intent;
assigning, by the processor, the one or more agents to each sub-local statement of intent, wherein the details of the agent assigned to the local statement of intent are modifiable by the user;
for each sub-local statement of intent, receiving, by the processor from the user in a form of the natural language, one or more attributes that define a characteristic of the respective sub-local statement of intent;
for each entity, receiving, by the processor from the user in a form of the natural language, one or more attributes that define a characteristic of the respective entity and that differentiate the respective entity from other entities of the corresponding sub-local statement of intent;
forming, by the processor, for each sub-local statement of intent, a set of CESs based on all possible combinations of the entities of the respective sub-local statement of intent, wherein a CES formed based on all the entities of the respective sub-local statement of intent is a trigger CES, and wherein each CES in the set is in a state of potentiality; and
receiving, by the processor from the user in a form of the natural language, relationships between the local statements of intent and the one or more sub-local statements of intent, wherein the relationships are indicative of whether a trigger CES of one local statement of intent is influencing the set of CESs of a sub-local statement of intent, and wherein the relationships are indicative of whether a trigger CES of one sub-local statement of intent is influencing the set of CESs of a local statement of intent or is an end of the building of the solution.

5. The method of claim 1, wherein, when the solution is executed, the method further comprises:
for a local statement of intent, receiving, by the processor from an agent in a form of the natural language, one or more sub-local statements of intent and details of entities associated with each sub-local statement of intent, wherein each sub-local statement of intent and each entity are respectively set in a state of potentiality, wherein each sub-local statement of intent is indicative of a step for building the solution, wherein each entity participates in the step indicated by the corresponding sub-local statement of intent;
assigning, by the processor, the one or more agents to each sub-local statement of intent, wherein the details of the agent assigned to the sub-local statement of intent are modifiable by the agent;
for each sub-local statement of intent, receiving, by the processor from an agent in a form of the natural language, one or more attributes that define a characteristic of the respective sub-local statement of intent;
for each entity, receiving, by the processor from an agent in a form of the natural language, one or more attributes that define a characteristic of the respective entity and that differentiate the respective entity from other entities of the corresponding sub-local statement of intent;
forming, by the processor, for each sub-local statement of intent, a set of CESs based on all possible combinations of the entities of the respective sub-local statement of intent, wherein a CES formed based on all the entities of the respective sub-local statement of intent is a trigger CES, and wherein each CES in the set is in a state of potentiality; and
receiving, by the processor from an agent in a form of the natural language, relationships between the local statement of intent and the one or more sub-local statements of intent, wherein the relationships are indicative of whether a trigger CES of one sub-local statement of intent is influencing the set of CESs of another sub-local statement of intent or is influencing the set of CESs of the local statement of intent.

6. The method of claim 1, further comprising, for each entity of each local statement of intent:
receiving, by the processor from the associated agent, a value against the respective entity, wherein receiving the value against the respective entity is recordation of an event to change the state of potentiality to a state of reality for the respective entity based on the received value, wherein the value is an input in a form of the natural language, a programming language, an image, bio-metrics, and gesture, wherein the natural language is in a form of a text or speech.

7. The method of claim 1, wherein at least one of the global statement of intent, the one or more local statements of intent, the one or more agents, the entities and the attributes comes to existence in the state of potentiality during execution of the solution upon fulfilment of one or more predefined conditions.

8. The method of claim 1, further comprising:
receiving, by the processor from the user in a form of the natural language, user inputs to configure a user interface through which information associated with the global statement of intent, the one or more local statements of intent, the one or more agents, the entities and the attributes is received during execution of the solution, wherein the user interface is dynamically adjustable based on a display property of a display device.

9. The method of claim 1, further comprising:
parsing, by the processor, the received information associated with the global statement of intent, the one or more local statements of intent, the one or more agents, the entities and the attributes; and
correcting, by the processor, the parsed information based on a communication with a natural solution language grammar database to make one or more grammatical corrections in the information.

10. The method of claim 1, further comprising:
parsing, by the processor, the received information associated with the global statement of intent, the one or more local statements of intent, the one or more agents, the entities and the attributes; and
removing, by the processor, redundant text from the parsed information based on a communication with a natural solution language grammar database.

11. The method of claim 1, further comprising:
auto-populating, by the processor, the one or more local statements of intent, or the one or more agents, or the one or more entities, or the one or more attributes, or a combination thereof based on the received global statement of intent, wherein the auto-populating is based on a communication with a natural solution language grammar database.

12. The method of claim 1, wherein the local statements of intent comprise two or more parallel local statements of intent, wherein:
a trigger CES of one local statement of intent influences the sets of CESs of the two or more parallel local statements of intent; and
trigger CESs of the two or more parallel local statements of intent influence the set of CESs of another local statement of intent or is end of the building of the solution.

13. The method of claim 1, wherein the local statements of intent comprise two or more alternate local statements of intent, wherein:
a trigger CES of one local statement of intent influences the sets of CESs of the two or more alternate local statements of intent; and
a trigger CES of one of the two or more alternate local statements of intent influence the set of CESs of another local statement of intent or is end of the building of the solution.

14. The method of claim 1, wherein the local statements of intent comprise a nested local statement of intent, wherein a trigger CES of the nested local statement of intent influences a set of CESs of a local statement of intent of another solution.

15. The method of claim 1, wherein the local statements of intent comprise a recursive local statement of intent, wherein a trigger CES of the recursive local statement of intent influences the set of CESs of another local statement of intent or is end of the building of the solution after N iterations, wherein N is more than 1.

16. The method of claim 1, further comprising:
receiving, by the processor from the user in a form of a natural language, details of two or more substitute entities associated with a local statement of intent, wherein each of the two or more substitute entities is respectively set in a state of potentiality, wherein one of the two or more substitute entities participates in the step indicated by the corresponding local statement of intent and other of the two or more substitute entities are not part of a trigger CES.

17. The method of claim 1, further comprising:
determining, by the processor, a number of potentiality states associated with the solution based on:
$((2^{(b_1-c_1-e_1)}) \times (2^{(b_2-c_2-e_2)}) + (2^{(b_2-c_2-e_2)}) \times (2^{(b_3-c_3-e_3)}) + \ldots + (2^{(b_{K-1}-c_{K-1}-e_{K-1})}) \times (2^{(b_K-c_K-e_K)}) + (2^{(b_K-c_K-e_K)})) - 1$, where K is the total number of local statements of intent, $b_K$ is the total number of entities, attributes and agents associated with the $K^{th}$ local statement of intent, $c_K$ is the total number of entities, attributes and agents associated with the $K^{th}$ local statement of intent that are constants, $e_K$ is the number of trigger CESs that influence the $K^{th}$ local statement of intent.

18. The method of claim 1, further comprising:
communicating, by the processor, with an external system using one or more natural solution language application programming interfaces.

19. The method of claim 1, further comprising:
generating, by the processor, one or more reports based on values of the global statement of intent, the one or more local statement of intent, the one or more entities, the one or more attributes, the one or more agents, wherein the one or more reports are generated based on one or more predefined techniques.

20. The method of claim 1, further comprising:
analyzing, by the processor, values of the global statement of intent, the one or more local statement of intent, the one or more entities, the one or more attributes, the one or more agents; and
drawing, by the processor, one or more logical inferences based on the analysis, wherein the one or more logical inferences are drawn based on one or more predefined models.

21. The method of claim 1, further comprising:
if the agent associated with a local statement of intent is a machine agent, then:
receiving, by the processor from a robotic process automation engine, inputs to add a new sub-local statement of intent to the local statement of intent and one or more new entities and attributes to the new sub-local statement of intent;
receiving, by the processor from the robotic process automation engine, inputs to add one or more new entities and attributes to the local statement of intent; or
receiving, by the processor from the robotic process automation engine, inputs to modify the local statement of intent or the associated entities or the associated attributes.

22. A method for building a computer-implemented solution using a natural language understood by users and without using programming codes, the method comprising:
providing a prompt, by a processor of a computing device, to a user to input a global statement of intent indicative of the solution to be built, wherein the global statement of intent is received in a form of the natural language and is set in a state of potentiality;
providing a prompt, by the processor, to the user to input details of one or more agents associated with the global statement of intent, wherein an agent is a human agent or a machine agent that executes the solution, wherein the details of the one or more agents are received in a form of the natural language and each agent is set in a state of potentiality;

providing a prompt, by the processor, to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

assigning, by the processor, the one or more agents to each local statement of intent, wherein the details of the agent assigned to the local statement of intent are modifiable by the user;

for each local statement of intent, providing a prompt, by the processor, to the user to input, in a form of the natural language, one or more attributes that define a characteristic of the respective local statement of intent;

for each entity, providing a prompt, by the processor, to the user to input, in a form of the natural language, one or more attributes that define a characteristic of the respective entity and that differentiate the respective entity from other entities of the corresponding local statement of intent;

forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, identifying the trigger CES of the received local statement of intent as an end of the building of the solution;

in response to determining more than one received local statement of intent associated with the global statement of intent, providing a prompt, by the processor, to the user to input, in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, recording, by the processor, a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, recording, by the processor, a stop time at an instance when the respective global statement of intent, the respective local statement of intent, the respective agent, the respective entity and the respective attribute comes to existent in a state of reality.

23. A computing device for building a computer-implemented solution using a natural language understood by users and without using programming codes, the computing device comprising:
 a processor; and
 a memory coupled to the processor, the memory comprising instructions executable by the processor to:
  receive, from a user, a global statement of intent indicative of the solution to be built, wherein the global statement of intent is received in a form of the natural language and is set in a state of potentiality;
  receive, from the user, details of one or more agents associated with the global statement of intent, wherein an agent is a human agent or a machine agent that executes the solution, wherein the details of the one or more agents are received in a form of the natural language and each agent is set in a state of potentiality;
  receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;
  assign the one or more agents to each local statement of intent, wherein the details of the agent assigned to the local statement of intent are modifiable by the user;
  for each local statement of intent, receive from the user in a form of the natural language, one or more attributes that define a characteristic of the respective local statement of intent;
  for each entity, receive from the user in a form of the natural language, one or more attributes that define a characteristic of the respective entity and that differentiate the respective entity from other entities of the corresponding local statement of intent;
  form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;
  in response to determining only one received local statement of intent associated with the global statement of intent, identify the trigger CES of the received local statement of intent as an end of the building of the solution;
  in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent of the solution or is an end of the building of the solution;
  for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

24. A computing device for building a computer-implemented solution using a natural language understood by users and without using programming codes, the computing device comprising:

means to receive, from a user, a global statement of intent indicative of the solution to be built, wherein the global statement of intent is received in a form of the natural language and is set in a state of potentiality;

means to receive, from the user, details of one or more agents associated with the global statement of intent, wherein an agent is a human agent or a machine agent that executes the solution, wherein the details of the one or more agents are received in a form of the natural language and each agent is set in a state of potentiality;

means to receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

means to assign the one or more agents to each local statement of intent, wherein the details of the agent assigned to the local statement of intent are modifiable by the user;

for each local statement of intent, means to receive from the user in a form of the natural language, one or more attributes that define a characteristic of the respective local statement of intent;

for each entity, means to receive from the user in a form of the natural language, one or more attributes that define a characteristic of the respective entity and that differentiate the respective entity from other entities of the corresponding local statement of intent;

means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, means to identify the trigger CES of the received local statement of intent as an end of the building of the solution;

in response to determining more than one received local statement of intent associated with the global statement of intent, means to receive from the user in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, means to record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, means to record a stop time at an instance when the respective global statement of intent, the respective local statement of intent, the respective agent, the respective entity and the respective attribute comes to existent in a state of reality.

25. A computing device for building a computer-implemented solution using a natural language understood by users and without using programming codes, the computing device comprising:

a processor; and a memory coupled to the processor, the memory comprising instructions executable by the processor to perform a method for building a computer-implemented solution using a natural language understood by users and without using programming codes, the method comprising:

receiving, by a processor of a computing device from a user, a global statement of intent indicative of the solution to be built, wherein the global statement of intent is received in a form of the natural language and is set in a state of potentiality;

receiving, by the processor from the user, details of one or more agents associated with the global statement of intent, wherein an agent is a human agent or a machine agent that executes the solution, wherein the details of the one or more agents are received in a form of the natural language and each agent is set in a state of potentiality;

receiving, by the processor from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

assigning, by the processor, the one or more agents to each local statement of intent, wherein the details of the agent assigned to the local statement of intent are modifiable by the user;

for each local statement of intent, receiving, by the processor from the user in a form of the natural language, one or more attributes that define a characteristic of the respective local statement of intent;

for each entity, receiving, by the processor from the user in a form of the natural language, one or more attributes that define a characteristic of the respective entity and that differentiate the respective entity from other entities of the corresponding local statement of intent;

forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, identifying the trigger CES of the received local statement of intent as an end of the building of the solution;

in response to determining more than one received local statement of intent associated with the global statement of intent, receiving, by the processor from the user in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, recording, by the processor, a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, recording, by the processor, a stop time at an instance when the respective global statement of intent, the respective local statement of intent, the respective agent, the respective entity and the respective attribute comes to existent in a state of reality.

26. A computing device for building a computer-implemented solution using a natural language understood by users and without using programming codes, the computing device comprising:

a processor; and a memory coupled to the processor, the memory comprising instructions executable by the processor to:

provide a prompt to a user to input a global statement of intent indicative of the solution to be built, wherein the global statement of intent is received in a form of the natural language and is set in a state of potentiality;

provide a prompt to the user to input details of one or more agents associated with the global statement of intent, wherein an agent is a human agent or a machine agent that executes the solution, wherein the details of the one or more agents are received in a form of the natural language and each agent is set in a state of potentiality;

provide a prompt to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

assign the one or more agents to each local statement of intent, wherein the details of the agent assigned to the local statement of intent are modifiable by the user;

for each local statement of intent, provide a prompt to the user to input, in a form of the natural language, one or more attributes that define a characteristic of the respective local statement of intent;

for each entity, provide a prompt to the user to input, in a form of the natural language, one or more attributes that define a characteristic of the respective entity and that differentiate the respective entity from other entities of the corresponding local statement of intent;

form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, identify the trigger CES of the received local statement of intent as an end of the building of the solution;

in response to determining more than one received local statement of intent associated with the global statement of intent, provide a prompt to the user to input, in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

27. A computing device for building a computer-implemented solution using a natural language understood by users and without using programming codes, the computing device comprising:

means to provide a prompt to a user to input a global statement of intent indicative of the solution to be built, wherein the global statement of intent is received in a form of the natural language and is set in a state of potentiality;

means to provide a prompt to the user to input details of one or more agents associated with the global statement of intent, wherein an agent is a human agent or a machine agent that executes the solution, wherein the details of the one or more agents are received in a form of the natural language and each agent is set in a state of potentiality;

means to provide a prompt to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

means to assign the one or more agents to each local statement of intent, wherein the details of the agent assigned to the local statement of intent are modifiable by the user;

for each local statement of intent, means to provide a prompt to the user to input, in a form of the natural language, one or more attributes that define a characteristic of the respective local statement of intent;

for each entity, means to provide a prompt to the user to input, in a form of the natural language, one or more attributes that define a characteristic of the respective entity and that differentiate the respective entity from other entities of the corresponding local statement of intent;

means to form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, means to identify the trigger CES of the received local statement of intent as an end of the building of the solution;

in response to determining more than one received local statement of intent associated with the global statement of intent, means to provide a prompt to the user to input, in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, means to record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, means to record a stop time at an instance when the respective global statement of intent, the respective local statement of intent, the respective agent, the respective entity and the respective attribute comes to existent in a state of reality.

28. A computing device for building a computer-implemented solution using a natural language understood by users and without using programming codes, the computing device comprising:

a processor; and a memory coupled to the processor, the memory comprising instructions executable by the processor to perform a method for building a computer-implemented solution using a natural language understood by users and without using programming codes, the method comprising:

providing a prompt, by a processor of a computing device, to a user to input a global statement of intent indicative of the solution to be built, wherein the global statement of intent is received in a form of the natural language and is set in a state of potentiality;

providing a prompt, by the processor, to the user to input details of one or more agents associated with the global statement of intent, wherein an agent is a human agent or a machine agent that executes the solution, wherein the details of the one or more agents are received in a form of the natural language and each agent is set in a state of potentiality;

providing a prompt, by the processor, to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

assigning, by the processor, the one or more agents to each local statement of intent, wherein the details of the agent assigned to the local statement of intent are modifiable by the user;

for each local statement of intent, providing a prompt, by the processor, to the user to input, in a form of the natural language, one or more attributes that define a characteristic of the respective local statement of intent;

for each entity, providing a prompt, by the processor, to the user to input, in a form of the natural language, one or more attributes that define a characteristic of the respective entity and that differentiate the respective entity from other entities of the corresponding local statement of intent;

forming, by the processor, for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, identifying the trigger CES of the received local statement of intent as an end of the building of the solution;

in response to determining more than one received local statement of intent associated with the global statement of intent, providing a prompt, by the processor, to the user to input, in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, recording, by the processor, a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, recording, by the processor, a stop time at an instance when the respective global statement of intent, the respective local statement of intent, the respective agent, the respective entity and the respective attribute comes to existent in a state of reality.

29. A non-transitory computer-readable medium having stored thereon instructions for building a computer-implemented solution using a natural language understood by users and without using programming codes comprising machine executable code which when executed by a processor, causes the processor to:

receive, from a user, a global statement of intent indicative of the solution to be built, wherein the global statement of intent is received in a form of the natural language and is set in a state of potentiality;

receive, from the user, details of one or more agents associated with the global statement of intent, wherein an agent is a human agent or a machine agent that executes the solution, wherein the details of the one or more agents are received in a form of the natural language and each agent is set in a state of potentiality;

receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

assign the one or more agents to each local statement of intent, wherein the details of the agent assigned to the local statement of intent are modifiable by the user;

for each local statement of intent, receive from the user in a form of the natural language, one or more attributes that define a characteristic of the respective local statement of intent;

for each entity, receive from the user in a form of the natural language, one or more attributes that define a characteristic of the respective entity and that differentiate the respective entity from other entities of the corresponding local statement of intent;

form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, identify the trigger CES of the received local statement of intent as an end of the building of the solution;

in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

30. A non-transitory computer-readable medium having stored thereon instructions for building a computer-implemented solution using a natural language understood by users and without using programming codes comprising machine executable code which when executed by a processor, causes the processor to:

provide a prompt to a user to input a global statement of intent indicative of the solution to be built, wherein the global statement of intent is received in a form of the natural language and is set in a state of potentiality;

provide a prompt to the user to input details of one or more agents associated with the global statement of intent, wherein an agent is a human agent or a machine agent that executes the solution, wherein the details of the one or more agents are received in a form of the natural language and each agent is set in a state of potentiality;

provide a prompt to the user to input one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a step for building the solution, wherein each entity participates in the step indicated by the corresponding local statement of intent;

assign the one or more agents to each local statement of intent, wherein the details of the agent assigned to the local statement of intent are modifiable by the user;

for each local statement of intent, provide a prompt to the user to input, in a form of the natural language, one or more attributes that define a characteristic of the respective local statement of intent;

for each entity, provide a prompt to the user to input, in a form of the natural language, one or more attributes that define a characteristic of the respective entity and that differentiate the respective entity from other entities of the corresponding local statement of intent;

form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;

in response to determining only one received local statement of intent associated with the global statement of intent, identify the trigger CES of the received local statement of intent as an end of the building of the solution;

in response to determining more than one received local statement of intent associated with the global statement of intent, provide a prompt to the user to input, in a form of the natural language, relationships between the local statements of intent, wherein the relationships are indicative of whether a trigger CES of one local statement of intent is influencing the set of CESs of another local statement of intent of the solution or is an end of the building of the solution;

for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

31. A system for building a computer-implemented solution using a natural language understood by users and without using programming codes, the system comprising:
a processor;
a memory coupled to the processor; and a global statement of intent module, a local statement of intent module, a CES module, a relationship module, and a clock module coupled to the processor, wherein the global statement of intent module, the local statement of intent module, the CES module, the relationship module, and the clock module are operatively connected to each other,
wherein the global statement of intent module is configured to:
receive, from a user, a global statement of intent indicative of the solution to be built, wherein the global statement of intent is received in a form of the natural language and is set in a state of potentiality; and
receive, from the user, details of one or more agents associated with the global statement of intent, wherein an agent is a human agent or a machine agent that executes the solution, wherein the details of the one or more agents are received in a form of the natural language and each agent is set in a state of potentiality;

the local statement of intent module is configured to:
receive, from the user, one or more local statements of intent associated with the global statement of intent and details of entities associated with each local statement of intent, wherein each local statement of intent and the details of each entity are received in a form of the natural language and are respectively set in a state of potentiality, wherein each local statement of intent is indicative of a stepfor building the solution, wherein each entity participates in the step indicated by the corresponding local statement of intent;
assign the one or more agents to each local statement of intent, wherein the details of the agent assigned tothe local statement of intent are modifiable by the user;
for each local statement of intent, receive from the user in a form of the natural language, one or more attributes that define a characteristic of the respective local statement of intent;
for each entity, receive from the user in a form of the natural language, one or more attributes that define a characteristic of the respective entity and that differentiate the respective entity from other entities of the corresponding local statement of intent;

the CES module is configured to:
form for each local statement of intent, a set of combinatorial-entity-states (CESs) based on all possible combinations of the entities of the respective local statement of intent, wherein a CES formed based on all the entities of the respective local statement of intent is a trigger combinatorial entity state (trigger CES), and wherein each CES in the set is in a state of potentiality;
in response to determining only one received local statement of intent associated with the global statement of intent, identify the trigger CES of the received local statement of intent as an end of the building of the solution;

the relationship module is configured to, in response to determining more than one received local statement of intent associated with the global statement of intent, receive, from the user in a form of the natural language, relationships between the local statements of intent, wherein the relationships are indicative of whether a trigger CES of one local statement of intent is influencing the set of CESs of another local statement of intent of the solution or is an end of the building of the solution; and the clock module is configured to:
for each of the global statement of intent, the one or more local statements of intent, the one or more agents, the entities and the attributes, record a start time at an instance when the respective global statement of intent, the respective local statement of intent, the respective agent, the respective entity and the respective attribute comes to existence in the state of potentiality; and
for each of the global statement of intent, the one or more local statements of intent, the one or more agents, the entities and the attributes, record a stop time at an instance when the respective global statement of intent, the respective local statement of intent, the respective agent, the respective entity and the respective attribute comes to existent in a state of reality.

* * * * *